United States Patent
Konishi et al.

(10) Patent No.: US 7,428,692 B2
(45) Date of Patent: *Sep. 23, 2008

(54) PARALLEL PRECODER CIRCUIT

(75) Inventors: Yoshiaki Konishi, Tokyo (JP); Kazuo Kubo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 196 days.

This patent is subject to a terminal disclaimer.

(21) Appl. No.: 11/349,248

(22) Filed: Feb. 8, 2006

(65) Prior Publication Data

US 2007/0053697 A1    Mar. 8, 2007

(30) Foreign Application Priority Data

Sep. 5, 2005 (JP) ............................. 2005-257136

(51) Int. Cl.
  *G11C 29/00* (2006.01)
(52) U.S. Cl. ............................. 714/772; 341/76; 341/143
(58) Field of Classification Search ................. 714/757, 714/772; 341/76
  See application file for complete search history.

(56) References Cited

U.S. PATENT DOCUMENTS

| | | | | |
|---|---|---|---|---|
| 4,486,739 | A | * | 12/1984 | Franaszek et al. ............. 341/59 |
| 4,618,955 | A | * | 10/1986 | Sharpe et al. ................ 714/761 |
| 6,456,208 | B1 | * | 9/2002 | Nazari et al. .................. 341/59 |
| 6,753,797 | B2 | * | 6/2004 | Bliss et al. ..................... 341/59 |
| 6,920,604 | B2 | * | 7/2005 | Coakeley et al. ............ 714/802 |
| 2005/0012534 | A1 | * | 1/2005 | Konczykowska et al. ... 327/202 |
| 2005/0135816 | A1 | * | 6/2005 | Han et al. ..................... 398/188 |
| 2006/0002714 | A1 | * | 1/2006 | Gill et al. ..................... 398/147 |

FOREIGN PATENT DOCUMENTS

JP   2004-140744   5/2004

OTHER PUBLICATIONS

M. Serbay, et al., "Implementation of differential precoder for high-speed optical DQPSK transmission", Electronics Letters, vol. 40, No. 20, Sep. 30, 2004, pp. 1288-1290, cover page and table of contents.

* cited by examiner

*Primary Examiner*—Mujtaba K. Chaudry
(74) *Attorney, Agent, or Firm*—Oblon, Spivak, McClelland, Maier & Neustadt, P.C.

(57) ABSTRACT

A parallel precoder circuit executes a differential encoding operation on an n-row parallel input information series, and outputs an n-row parallel output information series, where $2 \leq n$. Output sets of differential encoding operation circuits each of which having a largest column number from among differential encoding operation circuits disposed in first row to (n−1)th row become first-row to (n−1)th-row parallel outputs information series, and an output set of an nth-row delay circuit becomes nth-row parallel output information series.

36 Claims, 22 Drawing Sheets

FIG.8

| IN | | OUT |
|---|---|---|
| φn-1 | θn | φn |
| 1/4π | 0 | 1/4π |
| | 1/2π | 3/4π |
| | π | 5/4π |
| | 3/2π | 7/4π |

| IN | | OUT |
|---|---|---|
| φn-1 | θn | φn |
| 3/4π | 0 | 3/4π |
| | 1/2π | 5/4π |
| | π | 7/4π |
| | 3/2π | 1/4π |

| IN | | OUT |
|---|---|---|
| φn-1 | θn | φn |
| 5/4π | 0 | 5/4π |
| | 1/2π | 7/4π |
| | π | 1/4π |
| | 3/2π | 3/4π |

| IN | | OUT |
|---|---|---|
| φn-1 | θn | φn |
| 7/4π | 0 | 7/4π |
| | 1/2π | 1/4π |
| | π | 3/4π |
| | 3/2π | 5/4π |

FIG.9

| IN | | OUT | IN | | OUT | IN | | OUT | IN | | OUT |
|---|---|---|---|---|---|---|---|---|---|---|---|
| $(d_I,d_Q)_{n-1}$ | $(b_I,b_Q)_n$ | $(d_I,d_Q)_n$ | $(d_I,d_Q)_{n-1}$ | $(b_I,b_Q)_n$ | $(d_I,d_Q)_n$ | $(d_I,d_Q)_{n-1}$ | $(b_I,b_Q)_n$ | $(d_I,d_Q)_n$ | $(d_I,d_Q)_{n-1}$ | $(b_I,b_Q)_n$ | $(d_I,d_Q)_n$ |
| (1,1) | (1,1) | (1,1) | (0,1) | (1,1) | (0,1) | (0,0) | (1,1) | (0,0) | (1,0) | (1,1) | (1,0) |
| | (0,1) | (0,1) | | (0,1) | (0,0) | | (0,1) | (1,0) | | (0,1) | (1,1) |
| | (0,0) | (0,0) | | (0,0) | (1,0) | | (0,0) | (1,1) | | (0,0) | (0,1) |
| | (1,0) | (1,0) | | (1,0) | (1,1) | | (1,0) | (0,1) | | (1,0) | (0,0) |

FIRST SECOND THIRD FOURTH FIFTH SIXTH SEVENTH
COLUMN COLUMN COLUMN COLUMN COLUMN COLUMN COLUMN

FIG.23

| IN | | OUT | IN | | OUT | IN | | OUT | IN | | OUT |
|---|---|---|---|---|---|---|---|---|---|---|---|
| φn-1 | θn | φn | φn-1 | θn | φn | φn-1 | θn | φn | φn-1 | θn | φn |
| 0 | 0 | 0 | 1/2π | 0 | 1/2π | π | 0 | π | 3/2π | 0 | 3/2π |
|  | 1/2π | 1/2π |  | 1/2π | π |  | 1/2π | 3/2π |  | 1/2π | 0 |
|  | π | π |  | π | 3/2π |  | π | 0 |  | π | 1/2π |
|  | 3/2π | 3/2π |  | 3/2π | 0 |  | 3/2π | 1/2π |  | 3/2π | π |

FIG.24

| IN $(d_I,d_Q)_{n-1}$ | $(b_I,b_Q)_n$ | OUT $(d_I,d_Q)_n$ |
|---|---|---|
| (0, 0) | (0, 0) | (0, 0) |
|        | (0, 1) | (0, 1) |
|        | (1, 0) | (1, 0) |
|        | (1, 1) | (1, 1) |

| IN $(d_I,d_Q)_{n-1}$ | $(b_I,b_Q)_n$ | OUT $(d_I,d_Q)_n$ |
|---|---|---|
| (0, 1) | (0, 0) | (0, 1) |
|        | (0, 1) | (1, 0) |
|        | (1, 0) | (1, 1) |
|        | (1, 1) | (0, 0) |

| IN $(d_I,d_Q)_{n-1}$ | $(b_I,b_Q)_n$ | OUT $(d_I,d_Q)_n$ |
|---|---|---|
| (1, 0) | (0, 0) | (1, 0) |
|        | (0, 1) | (1, 1) |
|        | (1, 0) | (0, 0) |
|        | (1, 1) | (0, 1) |

| IN $(d_I,d_Q)_{n-1}$ | $(b_I,b_Q)_n$ | OUT $(d_I,d_Q)_n$ |
|---|---|---|
| (1, 1) | (0, 0) | (1, 1) |
|        | (0, 1) | (0, 0) |
|        | (1, 0) | (0, 1) |
|        | (1, 1) | (1, 0) |

PARALLEL PRECODER CIRCUIT

BACKGROUND OF THE INVENTION

1. Field of the Invention

The present invention relates to a parallel precoder circuit that processes parallel input information series, and outputs parallel output information series, and more particularly, to a parallel precoder circuit that is applied to a differential quadrature phase shift keying (DQPSK) system.

2. Description of the Related Art

In the optical communication system, an optical duobinary modulation system and a differential phase shift keying (DPSK) system are investigated as a technique of increasing a relay distance and increasing a transmission speed. On the other hand, in recent years, a multiple-value technique using a differential quadrature phase shift keying (DQPSK) system calls attention.

Circuits of a transmission and reception system of the optical communication system using the DQPSK system have a precoder, an encoder, and a decoder. The precoder performs differential encoding operations of an input set of 2-bit information series including an in-phase component signal and a quadrature-phase component signal, and one-bit delay feedback information series obtained by delaying the own output information series by one bit, and outputs the operated result. The encoder executes a base band modulation to information series as the output of the precoder, thereby obtaining and outputting a DQPSK signal. The decoder modulates the DQPSK signal output from the encoder, and demodulates the signal, thereby restoring the input set of the information series input to the precoder.

In the optical communication system, a distributed feedback (DFB) laser and a Mac-Zehnder modulator achieve the function of the encoder, and a photodetector achieves the function of the decoder in many cases. In other words, individual optical elements achieve the functions of the encoder and the decoder in many cases. On the other hand, a logical circuit is usually used for the precoder.

A transmission speed F [Hz] in the optical communication is an ultra-high speed of 10 Gb/s and 40 Gb/s. Therefore, when a serial precoder circuit that processes a signal as serial data according to the transmission speed F is used, the logical circuit is required to operate at an ultra-high speed.

When the transmission speed F becomes an ultra-high speed, a clock unit time per one bit becomes short. Therefore, timing adjustment of a circuit that achieves a one-bit delay becomes difficult.

To solve this problem, various techniques are conventionally considered. For example, a technique concerning a serial precoder circuit that operates at a high speed without structuring a feedback route within a DQPSK precoder by using a toggle flip-flop (T-FF) circuit is disclosed in M. Serbay, C. Wree and W. Rosenkranz, "Implementation of differential precoder for high-speed optical DQPSK transmission," Electric Lett., vol. 40, no. 20, Sep. 2004.

The serial precoder circuit described in the above literature achieves the serial precoder circuit without structuring a feedback route within a DQPSK precoder. Therefore, a circuit that delays one bit is not necessary. Consequently, the difficulty of adjusting the timing of a circuit that achieves a one-bit delay cannot be avoided.

However, the serial precoder circuit described in the above literature does not solve strict requirement for the operation speed of logical circuits such as the T-FF circuit, a delay flip-flop circuit (D-FF) circuit, an inverting circuit, and AND circuit, an OR circuit, and an exclusive OR (EXOR) circuit.

Therefore, it is difficult to achieve the serial precoder circuit according to the conventional technique described in the Nonpatent literature 1 by using a general-purpose application specific integrated circuit (ASIC), such as a framer, and a field-programmable gate array (FPGA).

In general, the requirement for the operation speed of the logical circuit can be lowered by achieving the function of the precoder, by serial-parallel converting the input information series, and processing the data with a parallel precoder circuit having plural serial precoders developed in parallel.

For example, in the case of the parallel precoder circuit that has a serial precoder circuit simply developed to x ($2 \leq x$, where x is a positive integer) parallel precoders, parallel input signal of information series (a set of an in-phase component signal and a quadrature-phase component signal) transmitted in advance in the serial transfer, that is, a parallel input signal that is old in time series, is input to the serial precoder circuit. Output information series obtained from the serial precoder circuit are connected in cascade as a one-bit delayed feedback signal of the serial precoder circuit that processes the output information series adjacent in the parallel signals. In this configuration, a feedback route that passes through x serial precoder circuits is generated. Therefore, even when the serial precoder circuit is developed in parallel, the operation speed required for the serial precoder circuit cannot be mitigated.

Assume that a circuit is configured to directly generate a parallel output signal from a parallel input signal, without using the output information series of the serial precoder circuit to which a parallel input signal old in time series is input as a one-bit delayed feedback signal of the last information series. In this case, a delay in the feedback route can be decreased. However, a scale of the circuits increases enormously.

SUMMARY OF THE INVENTION

It is an object of the present invention to at least solve the problems in the conventional technology.

A parallel precoder circuit according to one aspect of the present invention executes a differential encoding operation on n-row parallel input information series having 2-bit information series as one set, and outputs n-row parallel output information series, where n is an integer equal to or larger than 2. The parallel precoder circuit includes an nth-row delay circuit that delays an output set of a differential encoding operation circuit having a largest column number from among differential encoding operation circuits disposed in nth row; a zeroth-column differential encoding operation circuit that executes a differential encoding operation with an output set of the nth-row delay circuit as one input set and a first-row parallel input information series as other input set; a (2k)th-row first-column differential encoding operation circuit that executes a differential encoding operation with (2k)th-row parallel input information series as one input set, and an output set of the zeroth-column differential encoding operation circuit as other input set when k is 1, or (2k−1)th-row parallel input information series as the other input set when k is larger than 1, where k is an integer equal to or larger than 1 and equal to or smaller than n/2; (2k)th-row mth-column differential encoding operation circuit that executes a differential encoding operation with an output set of a (2k)th-row (m−1)th-column differential encoding operation circuit as one input set when $2k-2^{(m-1)}$ is equal to or larger than 1, and an output set of a $(2k-2^{(m-1)})$th-row (m−1)th-column differential encoding operation circuit as other input set when a differential encoding operation circuit is disposed in $(2k-2^{(m-1)})$th-row $(m-1)$th-column, or an output set of a differential encoding operation circuit having a largest column number from among differential encoding operation circuits disposed in $(2k-2^{(m-1)})$th row as the other input set when no differential encoding operation circuit is disposed in the $(2k-2^{(m-1)})$th-row $(m-1)$th-column, where m is an integer equal to or larger than 2 and equal to or smaller than h−1, and h is a smallest integer equal to or larger than $(\log_2 n)+1$; and a $(2k-1)$th-row hth-column differential encoding operation circuit that executes a differential encoding operation with $(2k-1)$th-row parallel input information series as one input set, and an output set of a differential encoding operation circuit having a largest column number from among differential encoding operation circuits disposed in $(2k-2)$th row as other input set. Output sets of differential encoding operation circuits each of which having a largest column number from among differential encoding operation circuits disposed in first row to $(n-1)$th row become first-row to $(n-1)$th-row parallel outputs information series, respectively, and the output set of the nth-row delay circuit becomes nth-row parallel output information series.

A parallel precoder circuit according to another aspect of the present invention executes a differential encoding operation on n-row parallel input information series having 2-bit information series as one set, and outputs n-row parallel output information series, where n is an integer equal to or larger than 2. The parallel precoder circuit includes an nth-row delay circuit that delays an output set of a differential encoding operation circuit having a largest column number from among differential encoding operation circuits disposed in nth row; a zeroth-column differential encoding operation circuit that executes a differential encoding operation with an output set of the nth-row delay circuit as one input set and a first-row parallel input information series as other input set; a kth-row first-column differential encoding operation circuit that executes a differential encoding operation with kth-row parallel input information series as one input set, and an output set of the zeroth-column differential encoding operation circuit as other input set when k is 2, or $(k-1)$th-row parallel input information series as the other input set when k is larger than 2, where k is an integer equal to or larger than 2 and equal to or smaller than n; and a kth-row mth-column differential encoding operation circuit that executes a differential encoding operation with an output set of a kth-row $(m-1)$th-column differential encoding operation circuit and an output set of a $(k-2^{(m-1)})$th-row $(m-1)$th-column differential encoding operation circuit as input sets when $k-2^{(m-1)}$ is equal to or larger than 1, and executes the differential encoding operation with an output set of a kth-row $(m-1)$th-column differential encoding operation circuit and an output set of a differential encoding operation circuit having a largest column number from among differential encoding operation circuits disposed in $(k-2^{(m-1)})$th row as the input sets when no differential encoding operation circuit is disposed in $(k-2^{(m-1)})$th-row $(m-1)$th-column, where m is an integer equal to or larger than 2 and equal to or smaller than h, and h is a smallest integer equal to or larger than $\log_2 n$. Output sets of differential encoding operation circuits each of which having a largest column number from among differential encoding operation circuits disposed in first row to $(n-1)$th row become first-row to $(n-1)$th-row parallel outputs information series, respectively, and the output set of the nth-row delay circuit becomes nth-row parallel output information series.

A parallel precoder circuit according to still another aspect of the present invention executes a differential encoding operation on n-row parallel input information series having 2-bit information series as one set, and outputs n-row parallel output information series, where n is an integer equal to or larger than 2. the parallel precoder circuit includes an nth-row delay circuit that delays an output set of a differential encoding operation circuit having a largest column number from among differential encoding operation circuits disposed in nth row; a zeroth-column differential encoding operation circuit that executes a differential encoding operation with an output set of the nth-row delay circuit as one input set and a first-row parallel input information series as other input set; a $(2k)$th-row first-column differential encoding operation circuit that executes a differential encoding operation with $(2k)$th-row parallel input information series as one input set, and an output set of the zeroth-column differential encoding operation circuit as other input set when k is 1, or $(2k-1)$th-row parallel input information series as the other input set when k is larger than 1, where k is an integer equal to or larger than 1 and equal to or smaller than n/2; a $((2^m)\times k)$th-row mth-column differential encoding operation circuit in a that executes a differential encoding operation with an output set of a $((2^m)\times k)$th-row $(m-1)$th-column differential encoding operation circuit and an output set of a $((2^m)\times k - 2^{(m-1)})$th-row $(m-1)$th-column differential encoding operation circuit as input sets when $(2^m)\times k - 2^{(m-1)}$ is equal to or larger than 1 and when $(2^m)\times k$ is equal to or smaller than n, where m is an integer equal to or larger than 2 and equal to or smaller than hh, and hh is a smallest integer equal to or larger than $\log_2 n$ satisfying $h = 2 \times hh - 1$, where h indicates a last column where a differential encoding operation circuit is disposed; and a $((2^{hh} - (2kk-1) \times 2^{(2hh-m-1)}))$th-row mth-column differential encoding operation circuit that executes a differential encoding operation with an output set of a differential encoding operation circuit having a largest column number from among differential encoding operation circuits disposed in $((2^{hh} - (2kk-1) \times 2^{(2hh-m-1)}))$th row and an output set of a differential encoding operation circuit having a largest column number from among differential encoding operation circuits disposed in $((2^{hh} - 2kk \times 2^{(2hh-m-1)}))$th when m is equal to or larger than hh and equal to or smaller than $2 \times hh - 1$, where kk is an integer equal to or larger than 1. Output sets of differential encoding operation circuits each of which having a largest column number from among differential encoding operation circuits disposed in first row to $(n-1)$th row become first-row to $(n-1)$th-row parallel outputs information series, respectively, and the output set of the nth-row delay circuit becomes nth-row parallel output information series.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is an example of input and output relationships of the differential encoding operation based on a phase difference;

FIG. 9 depicts phases shown in FIG. 8 expressed in binary data;

FIG. 23 is an example of input and output relationships of a differential encoding operation based on a phase difference;

FIG. 24 is a table of phases shown in FIG. 23 expressed in binary data; and

DETAILED DESCRIPTION OF THE PREFERRED EMBODIMENTS

Exemplary embodiments of the present invention are explained in detail below with reference to the accompanying drawings. Note that the present invention is not limited to the embodiments.

A parallel precoder circuit according to a first embodiment of the present invention is explained below with reference to FIG. 1 to FIG. 14. The parallel precoder circuit according to the first embodiment of the present invention is applied to the DQPSK system. The parallel precoder circuit calculates n-set ($2 \leq n$, where n is an integer) parallel output information series $DO_1$ $(d_I, d_Q)$ to $DO_n$ $(d_I, d_Q)$ using 2-bit information series including a signal $d_I$ of an in-phase component (an I system) and a signal $d_Q$ of a quadrature-phase component (a Q system) as one set, from n-set parallel input information series $B_1$ $(b_I, b_Q)$ to $B_n$ $(b_I, b_Q)$ using 2-bit information series including a signal $b_I$ of the I system and a signal $b_Q$ of the Q system as one set. The parallel input information series $B_I$ $(b_I, b_Q)$ to $B_n$ $(b_I, b_Q)$ are hereinafter also simply referred to as parallel input information series BI to Bn, and the parallel output information series $DO_1$ $(d_I, d_Q)$ to $DO_n$ $(d_I, d_Q)$ are hereinafter also simply referred to as parallel output information series $DO_1$ to $DO_n$. The 2-bit information series including signals of the I system and the Q system are also referred to as a set of signals.

The parallel precoder circuit according to the first embodiment includes differential encoding operation (hereinafter referred to as SP) circuits $1a$ $((1a\text{-}(i,j))$ that perform a differential encoding operation derived from a differential encoding definition described later based on two sets of input signals, and delay circuits $1c$ ($1c\text{-}1$ to $1c\text{-}n$) that are configured by flip-flops and output one set of input signals by delaying the signals by a unit time. The unit time is an inverse number of the operation speed of the parallel precoder circuit. When a transmission speed is F [Hz], the unit time becomes "n/F" [sec]. The SP circuits $1a$ and the delay circuits $1c$ are connected in a net configuration described later.

Figure 1:
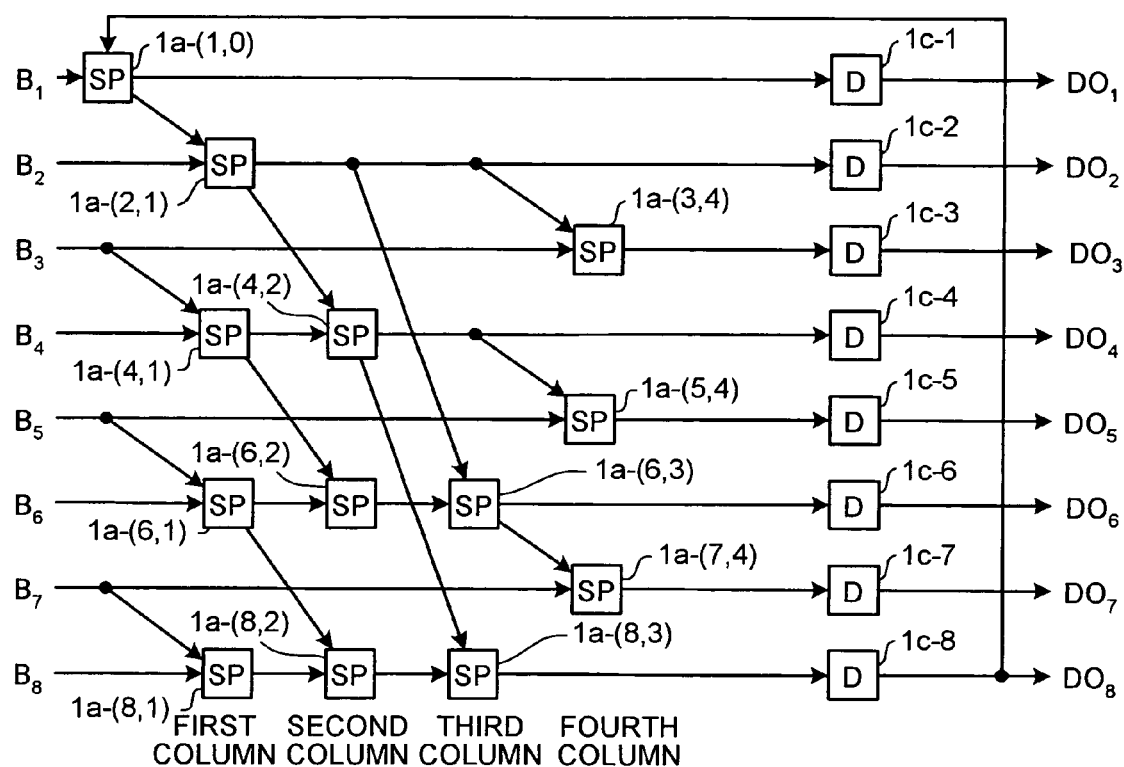
FIG. 1 is a configuration example of a parallel precoder circuit according to a first embodiment of the present invention.

Each of the SP circuits $1a\text{-}(i,j)$ is disposed in an ith row and a jth column. The SP circuit in ith row is an SP circuit disposed in a signal route that connects between parallel input information series $B_i$ and a delay circuit $1c\text{-}i$. An SP circuit that is input with an output of the delay circuit $1c\text{-}n$ and parallel input information series $B_1$ is defined as an SP circuit in the zeroth column. A jth SP circuit from the parallel input information series $B_1$ in an even row ($2 \leq i$, where i is an even number) is defined as the SP circuit in the jth column. An SP circuit that is disposed at a pre-stage of the delay circuit $1c\text{-}i$ in an odd row other than one row is an SP circuit disposed in the last column. In the first embodiment, a last column h is a smallest integer equal to or above $(\log_2 n)+1$. For example, when the number of bits n is "7", the last column becomes FIG. 1 is a configuration diagram of the parallel precoder circuit according to the first embodiment when "n=8". In FIG. 1, the parallel precoder circuit includes encoding (SP) circuits $1a$ ($1a\text{-}(1,0)$, $1a\text{-}(2,1)$, $1a\text{-}(4,1)$, $1a\text{-}(6,1)$, $1a\text{-}(8,1)$, $1a\text{-}(4,2)$, $1a\text{-}(6,2)$, $1a\text{-}(6,3)$, $1a\text{-}(8,2)$, $1a\text{-}(8,3)$, $1a\text{-}(3,4)$, $1a\text{-}(5,4)$, and $1a\text{-}(7,4)$), and delay circuits (Ds in FIG. 1) $1c$ ($1c\text{-}i$ to $1c\text{-}8$).

In FIG. 1, the SP circuit $1a\text{-}(1,0)$ is disposed in the first row and the zeroth column, the SP circuit $1a\text{-}(2,1)$ is disposed in the second row and the first column, the SP circuit $1a\text{-}(4,1)$ is disposed in the fourth row and the first column, the SP circuit $1a\text{-}(6,1)$ is disposed in the sixth row and the first column, the SP circuit $1a\text{-}(8,1)$ is disposed in the eighth row and the first column, the SP circuit $1a\text{-}(4,2)$ is disposed in the fourth row and the second column, the SP circuit $1a\text{-}(6,2)$ is disposed in the sixth row and the second column, the SP circuit $1a\text{-}(6,3)$ is disposed in the sixth row and the third column, the SP circuit $1a\text{-}(8,2)$ is disposed in the eighth row and the second column, the SP circuit $1a\text{-}(8,3)$ is disposed in the eighth row and the third column, the SP circuit $1a\text{-}(3,4)$ is disposed in the third row and the fourth column, the SP circuit $1a\text{-}(5,4)$ is disposed in the fifth row and the fourth column, and the SP circuit $1a\text{-}(7,4)$ is disposed in the seventh row and the fourth column. The fourth column is the last column.

Parallel input information series $B_{2k}$ are connected to one input set and parallel input information series $B_{2k-1}$ are connected to the other input respectively of an SP circuit in an even row and the first column, that is the SP circuit $1a\text{-}(2k,1)$ in the (2k)th ((2k)th row,1≦k≦n, where k is an integer) row and the first column. However, instead of the parallel input information series $B_1$, the output set of the SP circuit $1a$-$(1,0)$ in the first row and the zeroth column is connected to the other input set of the SP circuit $1a$-$(2,1)$ in the second row and the first column.

The output set of the SP circuit $1a$-$(2k-2^{\wedge}(m-1),m-1)$ is connected to one input set, and the output set of the SP circuit $1a$-$(2k,m-1)$ is connected to the other input respectively of the SP circuit $1a$-$(2k,m)$ in the $(2k)$th row and the mth $(1 \leq m \leq h-1)$ column. However, when no SP circuit is disposed in the $(2k-2^{\wedge}(m-1))$th row and the $(m-1)$th column, the output set of the SP circuit in the jth column having a largest column number j among SP circuits disposed in the $(2k-2^{\wedge}(m-1))$th row is connected to one input set of the SP circuit $1a$-$(2k,m)$. The operator "^" denotes power.

In FIG. 1, the output set of the SP circuit $1a$-$(2,1)$ is connected to one input set, and the output set of the SP circuit $1a$-$(6,2)$ is connected to the other input set respectively of the SP circuit $1a$-$(6,3)$ of k=3 and m=3.

When $2k-2^{\wedge}(m-1)$ is smaller than 1, no SP circuit is disposed. In FIG. 1, no SP circuit is disposed at the position of k=2 and m=3, that is, in the fourth row and the third column.

The output set of the parallel input information series $B_{2k-1}$ is connected to one input set of the SP circuit $1a$-$(2k-1,h)$ in the $(2k-1)$th row and the hth column disposed in the last column. The output set of the SP circuit in the jth column having a largest column number j among SP circuits disposed in the $(2k-2)$th row is connected to the other input set of the SP circuit $1a$-$(2k-1,h)$. However, no SP circuit is disposed in the first row in the last column. In FIG. 1, the last column is "4". Therefore, the parallel input information series $B_5$ are connected to one input set, and the output set of the SP circuit $1a$-$(4,2)$ is connected to the other input set respectively of the SP circuit $1a$-$(5,4)$.

The output set of the SP circuit in the jth column having a largest column number j among SP circuits disposed in the $(2k)$th row is connected to the input set of the delay circuit $1c$-$2k$ in the $(2k)$th row (the even row). In FIG. 1, the output set of the SP circuit $1a$-$(4,2)$ is connected to the input set of the delay circuit $1c$-$4$.

The output set of the SP circuit $1a$-$(2k-1,h)$ disposed in the last column, that is, in the $(2k-1)$th row in the hth column, is connected to the input set of the delay circuit $1c$-$(2k,1)$ in the $(2k-1)$th row (the odd row). However, the output set of the SP circuit $1a$-$(1,0)$ is connected to the input set of the delay circuit $1c$-$1$ in the first row. The output set of the delay circuit $1c$-$i$ becomes a parallel output $DO_i$.

Figure 2:
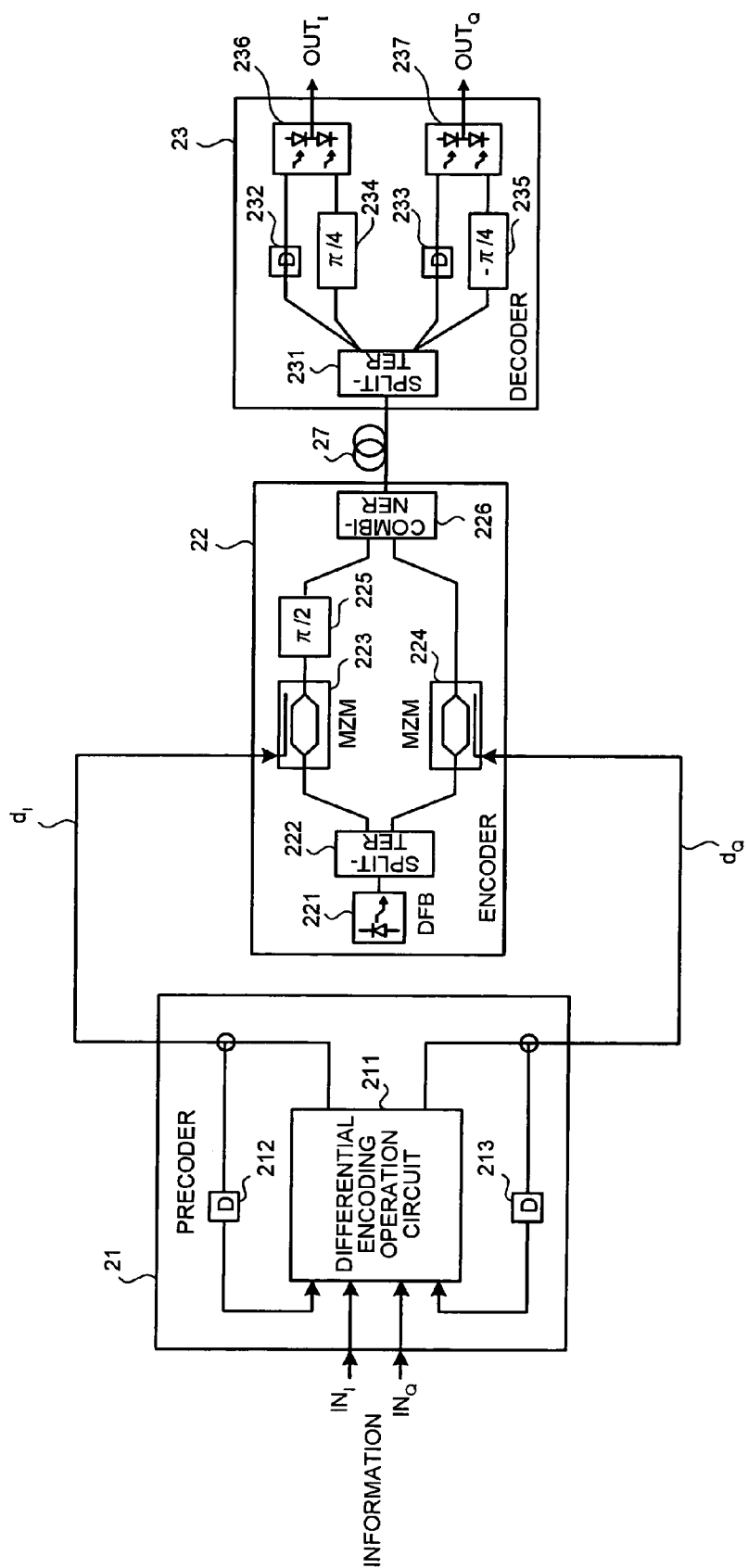
FIG. 2 is a configuration diagram of a general optical DQPSK transmission and reception system.

FIG. 2 is a block diagram of a configuration of circuits of a general optical DQPSK transmission and reception system. In FIG. 2, an optical DQPSK transmission and reception system 20 includes a precoder 21, an encoder 22, and a decoder 23. The precoder 21 and the encoder 22 are transmission systems, and the decoder 23 is a reception system.

The precoder 21 is a serial precoder circuit, and includes a differential encoding operation (SP) circuit 211 that perform a differential encoding operation derived from a differential encoding definition described later, and delay circuits (D in FIG. 2) 212 and 213. Input information series ($IN_I,IN_Q$) are connected to one input set, and outputs of the delay circuits 212 and 213 are connected to the other input set respectively of the SP circuit 21. In other words, the SP circuit 211 and the delay circuits 212 and 213 configure a feedback loop.

The delay circuits 212 and 213 include flip-flops that operate synchronously with the clock, and delay-adjusted delay lines. The delay circuit 212 and 213 delay the outputs $d_I$, and $d_Q$ of the SP circuit 211 by one clock unit time. For example, when a transmission speed of a transmission path 27 is F [Hz], one clock unit time becomes 1/F [sec].

The encoder 22 includes a distributed feedback (DFB) laser 221, a splitter 222, Mach-Zehnder modulators 223 and 224, a phase converter 225, and a combiner 226. The splitter 222 distributes light emitted by the DFB laser 221, and inputs the distributed light to the Mach-Zehnder modulators 223 and 224. The Mach-Zehnder modulators 223 and 224 modulate the distributed light based on the outputs of the precoder 21. That is, based on the output $d_I$ and $d_Q$ of the SP circuit 211. The combiner 226 multiplexes and outputs the output of the Mach-Zehnder modulators 223 shifted by (½) π by the phase converter 225, and the output of the Mach-Zehnder modulators 224. In other words, the encoder 22 generates $$\phi I = (\sqrt{E/T}) \cos(2\pi fct)$$

from the output $d_I$ of the SP circuit 211, generates $$\phi I = -(\sqrt{E/T}) \sin(2\pi fct)$$

from the output $d_Q$ of the SP circuit 211, multiplexes both outputs and generates a signal of $\phi I + \phi_Q$.

The decoder circuit 23 includes a splitter 231, delay circuits 223 and 233, phase converters 234 and 235, and wave detectors 236 and 237. The splitter 231 distributes a signal received by the encoder 22, and inputs the distributed signals to the delay circuits 232 and 235 and the phase converters 234 and 235. The wave detector 236 detects an output signal $OUT_I$ based on a signal one clock delayed by the delay circuit 232 and a signal (¼)π shifted by the phase converter 234. The wave detector 237 detects an output signal $OUT_Q$ based on a signal one clock delayed by the delay circuit 233 and a signal (−¼)π shifted by the phase converter 235. In other words, after passing through the encoder 23, the input $IN_I$ and $IN_Q$ of the precoder 21 are restored as the output signals $OUT_I$ and $OUT_Q$. There are various other configurations of the encoder 22 and the decoder 23 than those shown in FIG. 2. However, the processing that the precoder 21 should execute does not depend on the configurations of the encoder 22 and the decoder 23.

In FIG. 2, the precoder 21 is input with the input information series ($IN_I,IN_Q$), and outputs the output information series ($d_I,d_Q$). In the following, IN represents the input information series ($IN_I,IN_Q$), DO represents the output information series ($d_I,d_Q$), and "*" represents the operator of the differential encoding operation that the SP circuit 211 performs.

Assume that $IN_1, IN_2, IN_3, IN_4, IN_5, IN_6, IN_7$, and $IN_8$ are input as the input information series IN in a unit time cycle starting from time t1. The output information series DO can be expressed as follows $$DO_1 = IN_1 * DDO \tag{3-1}$$

$$DO_2 = IN_2 * DO_1 \tag{3-2}$$

$$DO_3 = IN_3 * DO_2 \tag{3-3}$$

$$DO_4 = IN_4 * DO_3 \tag{3-4}$$

$$DO_5 = IN_5 * DO_4 \tag{3-5}$$

$$DO_6 = IN_6 * DO_5 \tag{3-6}$$

$$DO_7 = IN_7 * DO_6 \quad (3\text{-}7)$$

$$DO_8 = IN_8 * DO_7 \quad (3\text{-}8)$$

DDO represents output information series before time t1. From Equation (3-1) to Equation (3-8), the following Equations are obtained.

$$DO_1 = IN_1 * DDO \quad (4\text{-}1)$$

$$DO_2 = IN_2 * (IN_1 * DDO) \quad (4\text{-}2)$$

$$DO_3 = IN_3 * (IN_2 * (IN_1 * DDO)) \quad (4\text{-}3)$$

$$DO_4 = IN_4 * (IN_3 * (IN_2 * DDO))) \quad (4\text{-}4)$$

$$DO_5 = IN_5 * (IN_4 * (IN_3 * (IN_2 * (IN_1 * DDO)))) \quad (4\text{-}5)$$

$$DO_6 = IN_6 * (IN_5 * (IN_4 * (IN_3 * (IN_2 * (IN_1 * DDO) \quad (4\text{-}6)$$

$$DO_7 = IN_7 * (IN_6 * (IN_5 * (IN_4 * (IN_3 * (IN_2 * (IN_1 * DDO)))))) \quad (4\text{-}7)$$

$$DO_8 = IN_8 * (IN_7 * (IN_6 * (IN_5 * (IN_4 * (IN_3 * (IN_2 * (IN_1 * DDO)))))) \quad (4\text{-}8)$$

Figure 3:
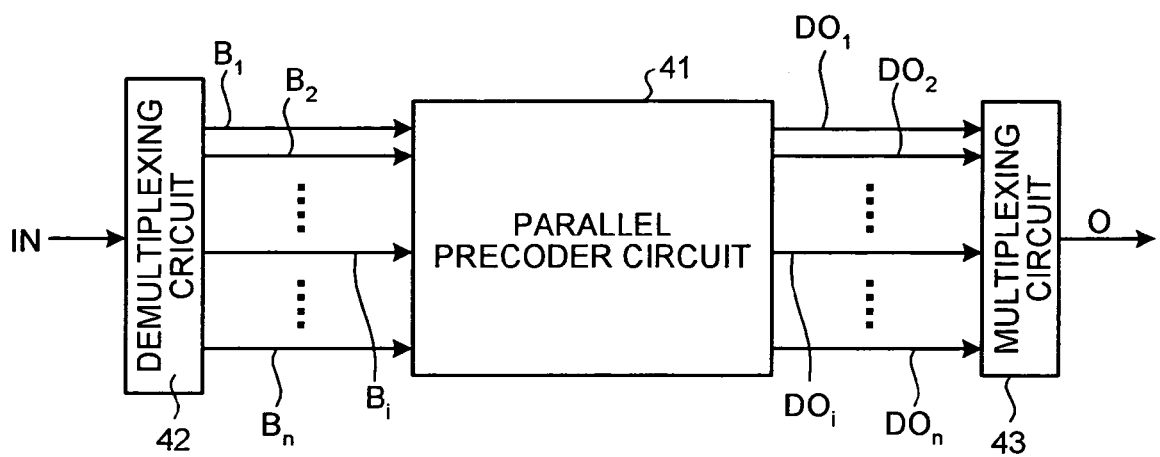
FIG. 3 is a block diagram of a parallel precoder circuit that configures a precoder shown in FIG. 2.

The precoder 21 shown in FIG. 2 that is configured by a parallel precoder circuit is explained next. FIG. 3 is a block diagram of the configuration of the precoder 21 that is configured by the parallel precoder circuit. In FIG. 3, the precoder 21 includes a demultiplexing circuit 42 at a pre-stage of a parallel precoder circuit 41, and a multiplexing circuit 43 at a post-stage of the parallel precoder circuit 41. When an output of a processing circuit, such as a framer (not shown), disposed at the pre-stage of the parallel precoder circuit 41 and an input of an encoder (not shown) disposed at the post-stage of the parallel precoder circuit 41 are parallelized, the demultiplexing circuit 42 and the multiplexing circuit 43 do not need to be disposed.

The demultiplexing circuit 42 generates n-set parallel input information series $B_1$ to $B_n$ by serial-parallel converting the input information series IN. The parallel precoder circuit 41 calculates the parallel output information series $DO_1$ to $DO_n$ from the parallel input information series $B_1$ to $B_n$. The multiplexing circuit 43 outputs serial output information series O by parallel-serial converting the parallel output information series $DO_1$ to $DO_n$ calculated by the parallel precoder circuit 41.

The parallel input information series $B_1$ to $B_n$ are the data transmitted in time series in the order of the parallel input information series $B_1$, the parallel input information series $B_2, \ldots$, and the parallel input information series $B_n$, when the parallel input information series are serially transmitted. The parallel output information series $DO_1$ to $DO_n$ are the data transmitted in time series in the order of the parallel output information series $O_1$, the parallel output information series $O_2$, and the parallel output information series $O_n$, when the parallel output information series are serially transmitted.

The input information series IN and the output information series O are input and output respectively, synchronously with a clock of the transmission speed F [Hz], that is, a clock of I/F [sec] cycle. In other words, the parallel precoder circuit 41 operates in an operation clock T=F/n [Hz].

Figure 4:
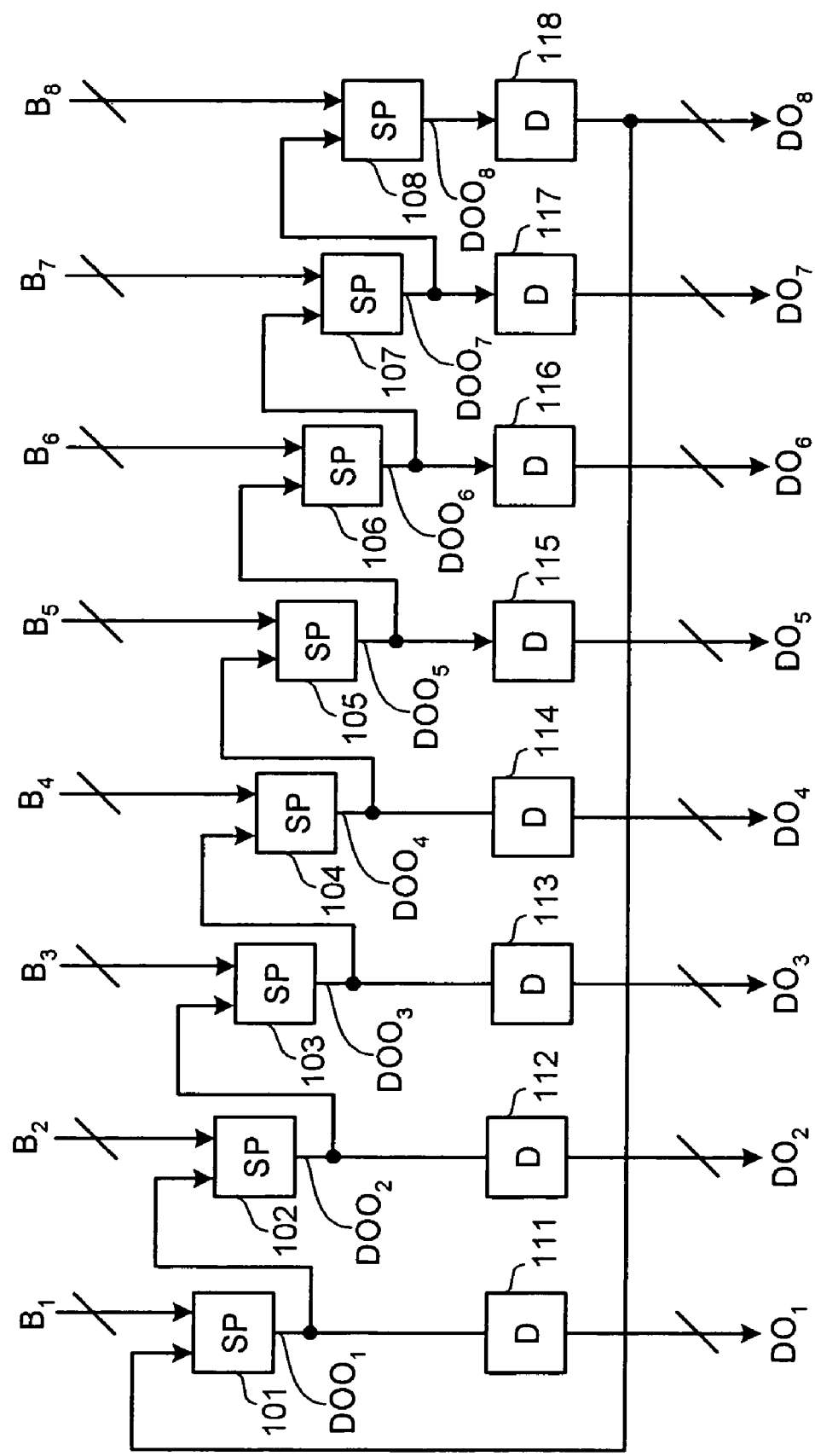
FIG. 4 is a configuration diagram of a parallel precoder circuit having a serial precoder circuit simply developed in parallel.

FIG. 4 is a block diagram of the configuration of the parallel precoder circuit that has the serial precoder circuit simply developed into eight parallel circuits. In FIG. 4, the parallel precoder circuit includes differential encoding operation. (SP) circuits 101 to 108 that perform differential encoding operations, and delay circuits that delay the output sets of the SP circuits 101 to 108 by the operation clock T.

The parallel input information series $B_1$ are connected to one input set of the SP circuit 101, and the output set of the delay circuit 118, that is, the output information series $DO_8$, are connected to the other input set of the SP circuit 101. The parallel information series $B_2$ to $B_8$ are connected to one input set of the SP circuits 102 to 108, and the output sets of the SP circuits 101 to 107 are connected to the other input set of the SP circuits 102 to 108. In other words, the parallel precoder circuit shown in FIG. 4 uses the output information series of the SP circuit to which the parallel input information series old in time series is input, as the signal one-bit adjacent to the last information series. Therefore, the operation speed of the delay circuits 110 to 118 becomes F/8 [Hz]. However, because a feedback route that passes through the delay circuit 118 and the SP circuits 101 to 108 is generated, the operation speed required for the SP circuits 101 to 108 becomes the same as that when the precoder is configured by the serial precoder circuit.

When $DOO_1$ to $DOO_8$ represent the output sets of the SP circuits 101 to 108, and also when "*" represents the operator of the differential encoding operation achieved by the SP circuits 101 to 108, the parallel output information series $DO_1$ to $DO_8$ of the parallel precoder circuit can be expressed as follows.

$$DO_1 = B_1 * DO_8 \quad (5\text{-}1)$$

$$DO_2 = B_2 * DOO_1 \quad (5\text{-}2)$$

$$DO_3 = B_3 * DOO_2 \quad (5\text{-}3)$$

$$DO_4 = B_4 * DOO_3 \quad (5\text{-}4)$$

$$DO_5 = B_5 * DOO_4 \quad (5\text{-}5)$$

$$DO_6 = B_6 * DOO_5 \quad (5\text{-}6)$$

$$DO_7 = B_7 * DOO_6 \quad (5\text{-}7)$$

$$DO_8 = B_8 * DOO_7 \quad (5\text{-}8)$$

The output sets $DOO_1$ to $DOO_7$ of the SP circuits 101 to 108 in Equation (5-1) to Equation (5-8) are equivalent to the parallel output information series $DO_1$ to $DO_7$. Therefore, Equation (5-1) to Equation (5-8) can be expressed as $$DO_1 = B_1 * DO_8 \quad (6\text{-}1)$$

$$DO_2 = B_2 * (B_1 * DO_8) \quad (6\text{-}2)$$

$$DO_3 = B_3 * (B_2 * (B_1 * DO_8)) \quad (6\text{-}3)$$

$$DO_4 = B_4 * (B_3 * (B_2 * (B_1 * DO_8))) \quad (6\text{-}4)$$

$$DO_5 = B_5 * (B_4 * (B_3 * (B_2 * (B_1 * DO_8)))) \quad (6\text{-}5)$$

$$DO_6 = B_6 * (B_5 * (B_4 * (B_3 * (B_2 * (B_1 * DO_8))))) \quad (6\text{-}6)$$

$$DO_7 = B_7 * (B_6 * (B_5 * (B_4 * (B_3 * (B_2 * (B_1 * DO_8)))))) \quad (6\text{-}7)$$

$$DO_8 = B_8 * (B_7 * (B_6 * (B_5 * (B_4 * (B_3 * (B_2 * (B_1 * DO_8)))))) \quad (6\text{-}8)$$

The parallel output information series $DO_8$ at the right side of Equation (6-1) to Equation (6-8) show the parallel output information series before the parallel input information series $B_1$. The parallel input information series $B_1$ to $B_8$ are the signals obtained by converting the input information series $IN_1$ to $IN_8$ into parallel data by the demultiplexing circuit 42. The parallel input information series $B_1$ corresponds to the input information series $IN_1$. The parallel input information series $B_2$ corresponds to the input information series $IN_2$. The parallel input information series $B_3$ corresponds to the input information series $IN_3$. The parallel input information series $B_4$ corresponds to the input information series $IN_4$. The parallel input information series $B_5$ corresponds to the input information series $IN_5$. The parallel input information series $B_6$ corresponds to the input information series $IN_6$. The parallel input information series $B_7$ corresponds to the input information series $IN_7$. The parallel input information series $B_8$ corresponds to the input information series $IN_8$. Therefore, Equation (6-1) to Equation (6-8) is equivalent to Equation (4-1) to Equation (4-8), respectively. In other words, the serial precoder circuit is equivalent to the parallel precoder circuit shown in FIG. 4.

The parallel precoder circuit according to the first embodiment of the present invention shown in FIG. 1 satisfies Equation (6-1) to Equation (6-8), and this is explained below.

The SP circuit 1$a$-(2k,1) in the first column outputs a result of the differential encoding operation of parallel input information series $B_2k$ and parallel input information series $B_{2k-1}$. The SP circuit 1$a$-(2k,2) in the second column outputs a result of the differential encoding operation of the output sets of the SP circuit 1$a$-(2k−2,1) and the SP circuit 1$a$-(2k−1) therefore, the output of the SP circuit 1$a$-(2k,2) is equal to a result of the differential encoding operation of the input four sets of the parallel input information series $B_{2k}$ to $B_{2k-3}$.

In the parallel precoder circuit shown in FIG. 1, when the output of the SP circuit 1$a$-(1,0) in the first row and the zeroth column is $BB_1$ and when the operator of the differential encoding operation is "*", an output SPO 1$a$-(2,1) of the SP circuit 1$a$-(2,1) in the second row and the first column can be given by $$SPO1a\text{-}(2,1)=BB_1{}^*B_2 \qquad (7\text{-}1)$$

An output SPO 1$a$-(4,1) of the SP circuit 1$a$-(4,1) in the fourth row and the first column can be given by $$SPO1a\text{-}(4,1)=B_3{}^*B_4 \qquad (7\text{-}2)$$

An output SPO 1$a$-(6,1) of the SP circuit 1$a$-(6,1) in the sixth row and the first column can be given by $$SPO1a\text{-}(6,1)=B_5{}^*B_6 \qquad (7\text{-}3)$$

An output SPO 1$a$-(8,1) of the SP circuit 1$a$-(8,1) in the eighth row and the first column can be given by $$SPO1a\text{-}(8,1)=B_7{}^*B_8 \qquad (7\text{-}4)$$

Equation (7-1) to Equation (7-4) is hereinafter also referred to as Equations (7).

An output SPO 1$a$-(4,2) of the SP circuit 1$a$-(4,2) in the fourth row and the second column can be given by $$SPO1a\text{-}(4,2)=SPO1a\text{-}(2,1)*SPO1a\text{-}(4,1) \qquad (8\text{-}1)$$

An output SPO 1$a$-(6,2) of the SP circuit 1$a$-(6,2) in the sixth row and the second column can be given by $$SPO1a\text{-}(6,2)=SPO1a\text{-}(4,1)*SPO1a\text{-}(6,1) \qquad (8\text{-}2)$$

An output SPO 1$a$-(8,2) of the SP circuit 1$a$-(8,2) in the eighth row and the second column can be given by $$SPO1a\text{-}(8,2)=SPO1a\text{-}(6,1)*SPO1a\text{-}(8,1) \qquad (8\text{-}3)$$

Based on Equations (17-1) and (17-2), Equation (8-1) to Equation (8-3) become $$SPO1a\text{-}(4,2)=(BB_1{}^*B_2)*(B_3{}^*B_4) \qquad (9\text{-}1)$$

$$SPO1a\text{-}(6,2)=(B_3{}^*B_4)*(B_5{}^*B_6) \qquad (9\text{-}2)$$

$$SPO1a\text{-}(8,2)=(B_5{}^*B_6)*(B_7{}^*B_8) \qquad (9\text{-}3)$$

Equation (9-1) to Equation (9-3) is hereinafter also referred to as Equations (9).

The SP circuit 1$a$-(2k,3) in the third column outputs a result of the differential encoding operation of the parallel input information series $B_{2k}$ and the parallel input information series $B_{2k-4}$. The output set of the SP circuit 1$a$-(2k,3) is equal to a result of the differential encoding operation of the parallel input information series $B_{2k}$ to $B_{2k-7}$ (corresponding to the output set of the SP circuit 1$a$-(8,3) in FIG. 1). When 2k−7 is equal to or smaller than 0 (corresponding to the output set of the SP circuit 1$a$-(6,3) in FIG. 1), the output of the SP circuit 1$a$-(2k,3) is equal to a result of the differential encoding operation of the parallel input information series $B_1$ to $B_{2k-7}$.

In FIG. 1, the output SPO1$a$-(6,3) of the SP circuit 1$a$-(6,3) in the sixth row and the third column can be given by $$SPO1a\text{-}(6,3)=SPO1a\text{-}(2,1)*SPO1a\text{-}(6,2) \qquad (10\text{-}1)$$

The output SPO 1$a$-(8,3) of the SP circuit 1$a$-(8,3) in the eighth row and the third column can be given by $$SPO1a\text{-}(8,3)=SPO1a\text{-}(4,2)*SPO1a\text{-}(8,2) \qquad (10\text{-}2)$$

Based on Equations (7) and Equations (9), Equation (10-1) and Equation (10-2) become $$SPO1a\text{-}(6,3)=(BB_1{}^*B_2)*((B_3{}^*B_4)*(B_5{}^*B_6)) \qquad (11\text{-}1)$$

$$SPO1a\text{-}(8,3)=((BB_1{}^*B_2)*(B_3{}^*B_4))*((B_5{}^*B_6)*(B_7{}^*B_8)) \qquad (11\text{-}2)$$

Equation (11-1) and Equation (11-2) are hereinafter also referred to as Equations (11).

In FIG. 1, the output SPO 1$a$-(3,4) of the SP circuit 1$a$-(3,4) in the third row and the fourth column can be given by $$SPO1a\text{-}(3,4)=SPO1a\text{-}(2,1)*B_3 \qquad (12\text{-}1)$$

The output SPO 1$a$-(5,4) of the SP circuit 1$a$-(5,4) in the fifth row and the fourth column can be given by $$SPO1a\text{-}(5,4)=SPO1a\text{-}(4,2)*B_5 \qquad (12\text{-}2)$$

The output SPO 1$a$-(7,4) of the SP circuit 1$a$-(7,4) in the seventh row and the fourth column can be given by $$SPO1a\text{-}(7,4)=SPO1a\text{-}(6,3)*B_7 \qquad (12\text{-}3)$$

Based on Equations (7), Equations (9), and Equations (11), Equation (12-1) to Equation (12-3) become $$SPO1a\text{-}(3,4)=(BB_1{}^*B_2)*B_3 \qquad (13\text{-}1)$$

$$SPO1a\text{-}(5,4)=((BB_1{}^*B_2)*(B_3{}^*B_4))*B_5 \qquad (13\text{-}2)$$

$$SPO1a\text{-}(7,4)=((BB_1{}^*B_2)*((B_3{}^*B_4)*(B_5{}^*B_6)))*B_7 \qquad (13\text{-}3)$$

Equation (13-1) to Equation (13-3) is hereinafter also referred to as Equations (13).

The outputs SPO 1$a$-(2,1), 1$a$-(4,2), 1$a$-(6,3), and 1$a$-(8,3) of the SP circuits 1$a$-(2,1), 1$a$-(4,2), 1$a$-(6,3), and 1$a$-(8,3) in the (2k)th row are input to the delay circuits 1$c$-2, 1$c$-4, 1$c$-6, and 1$c$-8, and are delayed by one clock, thereby becoming the parallel output information series $DO_2$, $DO_4$, $DO_6$, and $DO_8$.

The SP circuit $1a$-$(2k-1,4)$ differentially encodes parallel input information series $B_{2k-1}$ and the input to the delay circuit $1c$-$2(k-1)$, and outputs a result of the differential encoding operation to a delay circuit $1c$-$(2k,1)$ in the odd row. The delay circuit $1c$-$(2k,1)$ delays the data by one clock, and outputs parallel output series DO3, DO5, and DO7.

The SP circuit $1a$-$(1,0)$ outputs $BB_1$ as a result of differentially encoding the parallel output information series DDO before the parallel input information series $B_1$ and the parallel input information series $B_1$. The output $BB_1$ can be expressed as $$BB_1 = B_1 * DDO \quad (14)$$

The delay circuit $1c$-$1$ delays the output $BB_1$ of the SP circuit $1a$-$(1,0)$ by one clock, and outputs the parallel output series $DO_1$.

Therefore, the parallel output information series $DO_1$ of the parallel precoder circuit shown in FIG. 1 can be given by $$DO_1 = B_1 * DDO \quad (15\text{-}1)$$

From Equation (7-1) and Equation (14), the parallel output information series $DO_2$ can be given by $$DO_2 = (B_1 * DDO) * B_2 \quad (15\text{-}2)$$

From Equation (13-1) and Equation (14), the parallel output information series $DO_3$ can be given by $$DO_3 = ((B_1 * DDO) * B_2) * B_3 \quad (15\text{-}3)$$

From Equation (9-1) and Equation (14), the parallel output information series $DO_4$ can be given by $$DO_4 = ((B_1 * DDO) * B_2) * (B_3 * B_4) \quad (15\text{-}4)$$

From Equation (13-2) and Equation (14), the parallel output information series $DO_5$ can be given by $$DO_3 = ((B_1 * DDO) * B_2) * (B_3 * B_4)) * B_5 \quad (15\text{-}5)$$

From Equation (13-2) and Equation (14), the parallel output information series $DO_6$ can be given by $$DO_6 = ((B_1 * DDO) * B_2) * ((B_3 * B_4) * (B_5 * B_6)) \quad (15\text{-}6)$$

From Equation (13-3) and Equation (14), the parallel output information series $DO_7$ can be given by $$DO_7 = ((B_1 * DDO) * B_2) * ((B_3 * B_4) * (B_5 * B_6))) * B_7 \quad (15,7)$$

From Equation (11-2) and Equation (14), the parallel output information series $DO_8$ can be given by $$DO_7 = ((B_1 * DDO) * B_2) * (B_3 * B_4)) * ((B_5 * B_6) * (B_7 * B_8)) \quad (15\text{-}8)$$

The order of differential encoding operations in Equation (15-1) to Equation (15-8) that show the outputs of the parallel output information series $DO_1$ to $DO_8$ of the parallel precoder circuit shown in FIG. 1 is different from the order of differential encoding operations in Equation (6-1) to Equation (6-8) that show the outputs of the parallel output information series $DO_1$ to $DO_8$ of the parallel precoder circuit shown in FIG. 4.

Figure 5:
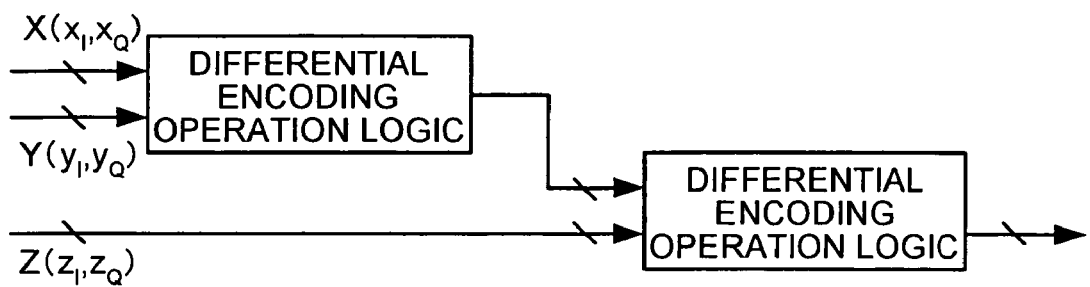
FIG. 5 is an explanatory diagram of a conversion of a circuit configuration when an associative law is established in a differential encoding operation.
Figure 6:
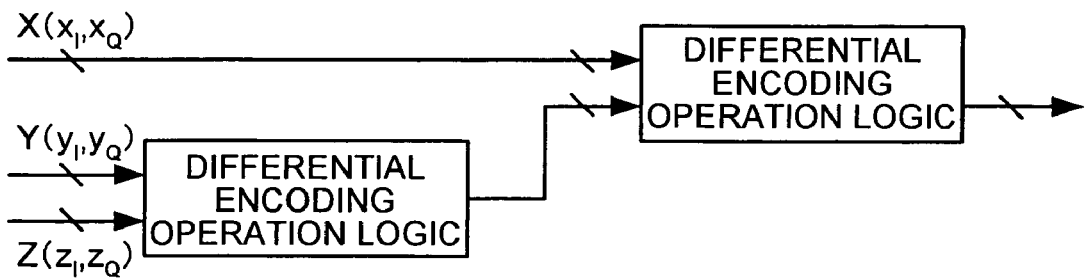
FIG. 6 is an explanatory diagram of a conversion of the circuit configuration when the associative law is established in the differential encoding operation.

Therefore, when an associative law is established in the differential encoding operation, a circuit configuration that achieves "$(X(X_I, X_Q) * Y(Y_I, Y_Q)) * Z(Z_I, Z_Q)$" as shown in FIG. 5 can be substituted by a circuit configuration that achieves "$X(X_I, X_Q) * (Y(Y_I, Y_Q) * Z(Z_I, Z_Q))$" as shown in FIG. 6.

First, logical Equations of the differential encoding operation that the SP circuit $1a$ shown in FIG. 1, the SP circuit 211 shown in FIG. 2, and the SP circuits 101 to 108 shown in FIG. 4 perform are explained. In the differential encoding, θn represents an information source of differential encoding at time nT, and $\Phi_n$ represents transmission phase information. The information source $\theta_n$ can be given by $$\theta_n = \text{mod}((\Phi_n \Phi_{n-1}), 2\pi) \quad (16)$$

In other words, the information source $\Phi_n$ becomes a remainder of a division of a subtraction of transmission phase information $\Phi_{n-1}$ one clock before from the transmission phase information $\Phi_n$ by $2\pi$.

From Equations (16-1) and (16-2), the transmission phase information $\Phi_n$, can be given by $$\Phi_n = \text{mod}((\theta_n \Phi_{n-1}), 2\pi) \quad (17)$$

Figure 7:
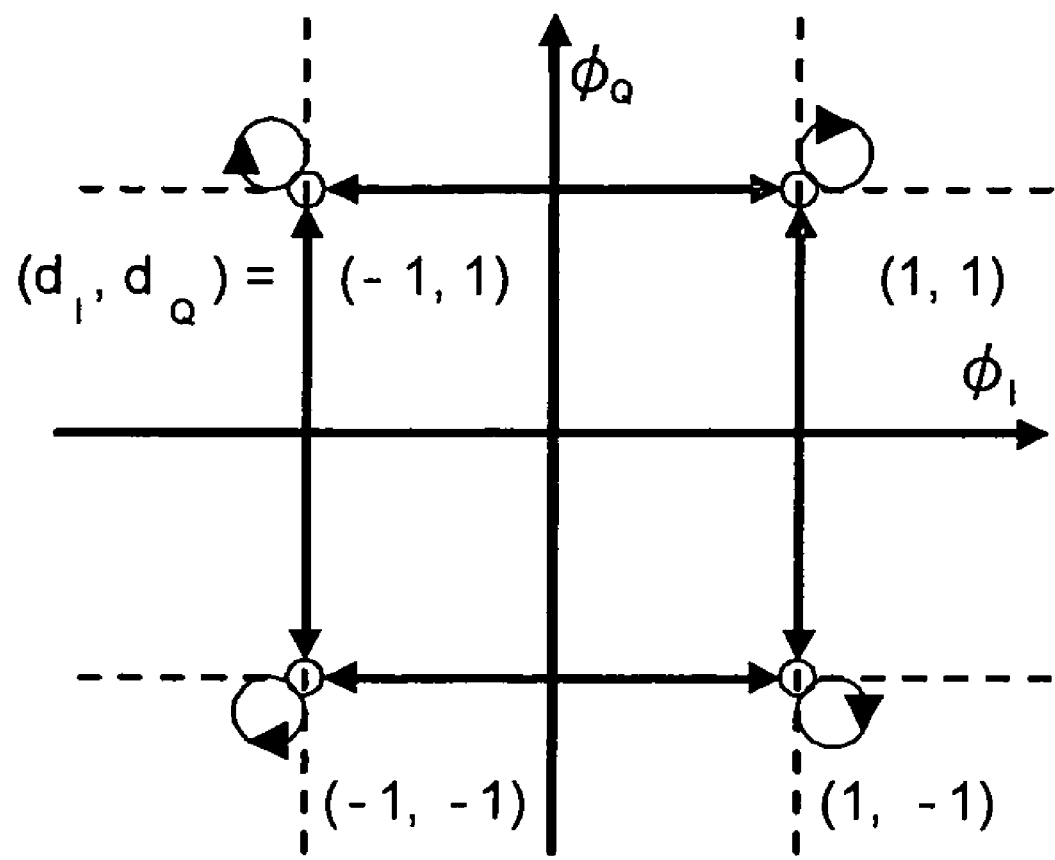
FIG. 7 is a signal space diagram of the DQPSK system.

While logical Equations of the differential encoding operation are derived from Equation (17), the logical Equations are different depending on the information series and phases allocated to four signal points (1,1), (1,1), (1,1), and (1,1) in a signal space diagram shown in FIG. 7.

FIG. 8 is an example of input and output relationships of the differential encoding operation based on a phase difference. In FIG. 8, a phase $(\frac{1}{4})\pi$ is allocated to the signal point (1,1), a phase $(3,4)\pi$ is allocated to the signal point (1,1), a phase $(5,4)\pi$ is allocated to the signal point (1,1), and a phase $(7,4)\pi$ is allocated to the signal point (1,1), in the signal space diagram shown in FIG. 7.

In FIG. 8, when the transmission phase information $\Phi_{n-1}$ one T before is "$(\frac{1}{4})\pi$" and also when the information source $\theta_n$ is "0", the transmission phase information $101_n$ becomes "$(\frac{1}{4})\pi$". When the information source $\theta_n$ is "$(\frac{1}{2})\pi$", the transmission phase information $\Phi_n$ becomes "$(3,4)\pi$". When the information source $\theta_n$ is "$\pi$", the transmission phase information $\Phi_n$ becomes "$(5,4)\pi$". When the information source $\theta_n$ is "$(\frac{3}{2})\pi$", the transmission phase information $\Phi_n$ becomes "$(7,4)\pi$".

When the transmission phase information $\Phi_{n-1}$ one T before is "$(3,4)\pi$" and also when the information source $\theta_n$ is "0", the transmission phase information $\Phi_n$ becomes "$(3,4)\pi$". When the information source $\theta_n$ is "$(\frac{1}{2})\pi$", the transmission phase information $\Phi_n$ becomes "$(5,4)\pi$". When the information source $\theta_n$ is "$\pi$", the transmission phase information $\Phi$ becomes "$(7,4)\pi$". When the information source $\theta_n$ is "$(\frac{3}{2})\pi$", the transmission phase information on becomes "$(\frac{1}{4})\pi$".

When the transmission phase information $\Phi_{n-1}$ one T before is "$(5,4)\pi$" and also when the information source $\theta_n$ is "0", the transmission phase information $\Phi_n$ becomes "$(5,4)\pi$". When the information source $\theta_n$ is "$(\frac{1}{2})\pi$", the transmission phase information $\Phi_n$ becomes "$(7,4)\pi$". When the information source $\theta_n$ is "$\pi$", the transmission phase information $\Phi$ becomes "$(\frac{1}{4})\pi$". When the information source $\theta_n$ is "$(\frac{3}{2})\pi$", the transmission phase information $\Phi_n$ becomes "$(3,4)\pi$".

When the transmission phase information $\Phi_{n-1}$ one T before is "$(7,4)\pi$" and also when the information source $\theta_n$ is "0", the transmission phase information $\Phi_n$ becomes "$(7,4)\pi$". When the information source $\theta_n$ is "$(\frac{1}{2})\pi$", the transmission phase information $\Phi_n$ becomes "$(\frac{1}{4})\pi$". When the information source $\theta_n$ is "$\pi$", the transmission phase information $\Phi$ becomes "$(3,4)\pi$". When the information source $\theta_n$ is "$(\frac{3}{2})\pi$", the transmission phase information $\Phi_n$ becomes "$(5,4)\pi$".

FIG. 9 depicts binary data of the phases shown in FIG. 8, that is, information series of the phases. In FIG. 9, (1,1) is allocated to $(\frac{1}{4})\pi$ of the transmission phase information $\Phi_n$ and $\Phi_{n-1}$ (0,1) is allocated to $(3,4)\pi$ of the transmission phase information $\Phi_n$ and $\Phi_{n-1}$ (0,0) is allocated to $(5,4)\pi$ of the transmission phase information $\Phi_n$ and $\Phi_{n-1}$ (1,0) is allocated to $(7,4)\pi$ of the transmission phase information $\Phi_n$ and $\Phi_{n-1}$ (1,1) is allocated to (0) of the information source $\theta_n$. (0,1) is allocated to $(\tfrac{1}{2})\pi$ of the information source $\theta_n$. (0,0) is allocated to $\pi$ of the information source $\theta_n$. (1,0) is allocated to $(\tfrac{3}{2})\pi$ of the information source $\theta_n$. The transmission phase information $\Phi_n$ corresponds to the information series DO $(d_I, d_Q)$. The transmission phase information $\Phi_{n-1}$ corresponds to the information series DO $(d_I, d_Q)_{n-1}$. The information source $\theta_n$ corresponds to the information series B $(b_I, b_Q)$.

From the input and output relationships shown in FIG. 9, logical Equations of a main addition standard type differential encoding operation become $$DO(n) = B(n) * DO(n-1),$$

and the logical Equations can be given by $$d_I(n) = d_I(n-1) \cdot d_Q(n-1) \cdot b_I(n) \cdot b_Q(n) + \qquad (16\text{-}1)$$
$$d_I(n-1) \cdot d_Q(n-1) \cdot b_I(n) \cdot \overline{b_Q(n)} +$$
$$\overline{d_I(n-1)} \cdot d_Q(n-1) \cdot \overline{b_I(n)} \cdot \overline{b_Q(n)} +$$
$$\overline{d_I(n-1)} \cdot d_Q(n-1) \cdot b_I(n) \cdot \overline{b_Q(n)} +$$
$$\overline{d_I(n-1)} \cdot \overline{d_Q(n-1)} \cdot \overline{b_I(n)} \cdot b_Q(n) +$$
$$\overline{d_I(n-1)} \cdot \overline{d_Q(n-1)} \cdot b_I(n) \cdot \overline{b_Q(n)} +$$
$$d_I(n-1) \cdot \overline{d_Q(n-1)} \cdot \overline{b_I(n)} \cdot b_Q(n) +$$
$$d_I(n-1) \cdot \overline{d_Q(n-1)} \cdot \overline{b_I(n)} \cdot b_Q(n)$$

$$d_Q(n) = d_I(n-1) \cdot d_Q(n-1) \cdot b_I(n) \cdot b_Q(n) + \qquad (16\text{-}2)$$
$$d_I(n-1) \cdot d_Q(n-1) \cdot \overline{b_I(n)} \cdot b_Q(n) +$$
$$\overline{d_I(n-1)} \cdot d_Q(n-1) \cdot b_I(n) \cdot b_Q(n) +$$
$$\overline{d_I(n-1)} \cdot d_Q(n-1) \cdot b_I(n) \cdot \overline{b_Q(n)} +$$
$$\overline{d_I(n-1)} \cdot \overline{d_Q(n-1)} \cdot b_I(n) \cdot b_Q(n) +$$
$$\overline{d_I(n-1)} \cdot \overline{d_Q(n-1)} \cdot b_I(n) \cdot \overline{b_Q(n)} +$$
$$d_I(n-1) \cdot \overline{d_Q(n-1)} \cdot \overline{b_I(n)} \cdot b_Q(n) +$$
$$d_I(n-1) \cdot \overline{d_Q(n-1)} \cdot \overline{b_I(n)} \cdot \overline{b_Q(n)}$$

Based on the theorem and the rule of the Boolean constant, the terms of Equation (16-1) and Equation (16-2) can be modified into Equation (17-1) and Equation (17-2), Equation (18-1) and Equation (18-2), Equation (19-1) and Equation (19-2), or Equation (20-1) and Equation (20-2), as follows $$d_I(n) = b_I(n) \cdot d_I(n-1) \cdot d_Q(n-1) + \overline{b_Q(n)} \cdot \overline{d_I(n-1)} \cdot d_Q(n-1) + \qquad (17\text{-}1)$$
$$\overline{b_I(n)} \cdot \overline{d_I(n-1)} \cdot \overline{d_Q(n-1)} + b_Q(n) \cdot d_I(n-1) \cdot \overline{d_Q(n-1)}$$

$$d_Q(n) = b_Q(n) \cdot d_I(n-1) \cdot d_Q(n-1) + b_I(n) \cdot \overline{d_I(n-1)} \cdot d_Q(n-1) + \qquad (17\text{-}2)$$
$$\overline{b_Q(n)} \cdot \overline{d_I(n-1)} \cdot \overline{d_Q(n-1)} + \overline{b_I(n)} \cdot d_I(n-1) \cdot \overline{d_Q(n-1)}$$

$$d_I(n) = b_I(n) \cdot b_Q(n) \cdot d_I(n-1) + b_I(n) \cdot \overline{b_Q(n)} \cdot d_Q(n-1) + \qquad (18\text{-}1)$$
$$\overline{b_I(n)} \cdot \overline{b_Q(n)} \cdot \overline{d_I(n-1)} + \overline{b_I(n)} \cdot b_Q(n) \cdot \overline{d_Q(n-1)}$$

$$d_Q(n) = b_I(n) \cdot b_Q(n) \cdot d_Q(n-1) + \overline{b_I(n)} \cdot b_Q(n) \cdot d_I(n-1) + \qquad (18\text{-}2)$$
$$\overline{b_I(n)} \cdot \overline{b_Q(n)} \cdot \overline{d_I(n-1)} + b_I(n) \cdot \overline{b_Q(n)} \cdot \overline{d_Q(n-1)}$$

$$d_I(n) = (\overline{d_I(n-1)} \oplus b_I(n)) \cdot (\overline{d_I(n-1)} \oplus b_Q(n)) + \qquad (19\text{-}1)$$
$$(\overline{d_Q(n-1)} \oplus b_I(n)) \cdot (d_Q(n-1) \oplus b_Q(n))$$

$$d_Q(n) = (\overline{d_Q(n-1)} \oplus b_I(n)) \cdot (\overline{d_Q(n-1)} \oplus b_Q(n)) + \qquad (19\text{-}2)$$
$$(d_I(n-1) \oplus b_I(n)) \cdot (\overline{d_I(n-1)} \oplus b_Q(n))$$

$$d_I(n) = (d_I(n-1) \oplus \overline{b_I(n)}) \cdot (d_Q(n-1) \oplus \overline{b_I(n)}) + \qquad (20\text{-}1)$$
$$(d_I(n-1) \oplus \overline{b_Q(n)}) \cdot (d_Q(n-1) \oplus b_Q(n))$$

-continued
$$d_Q(n) = (d_I(n-1) \oplus \overline{b_Q(n)}) \cdot (d_Q(n-1) \oplus \overline{b_Q(n)}) + \qquad (20\text{-}2)$$
$$(d_I(n-1) \oplus b_I(n)) \cdot (\overline{d_Q(n-1)} \oplus b_I(n))$$

Figure 10:
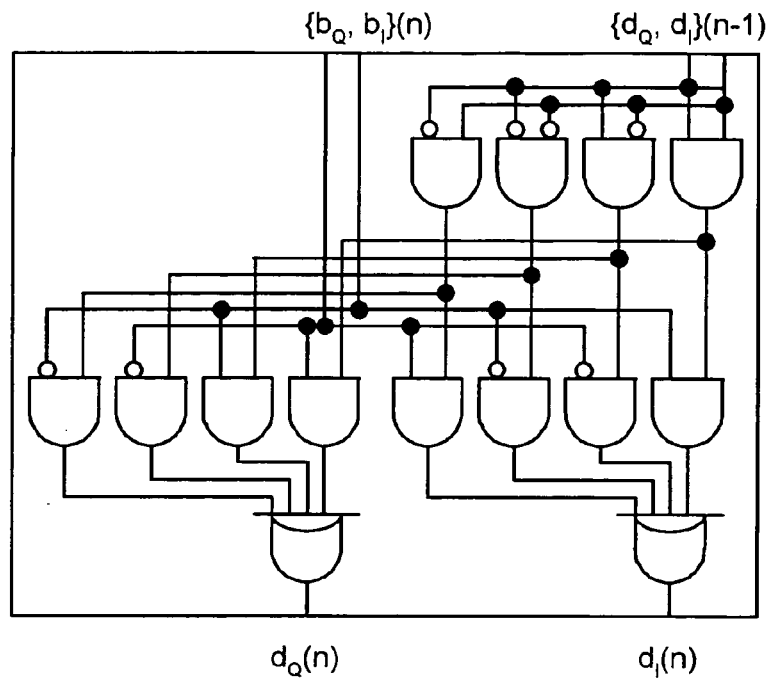
FIG. 10 is a logical circuit diagram that depicts a configuration example of a differential encoding operation circuit shown in FIG. 1.
Figure 11:
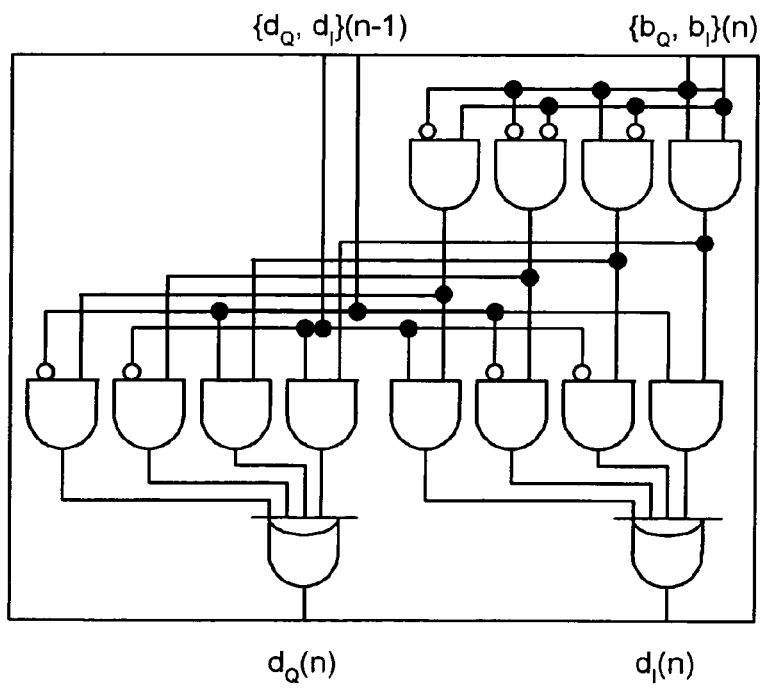
FIG. 11 is a logical circuit diagram that depicts a configuration example of a differential encoding operation circuit shown in FIG. 1.
Figure 12:
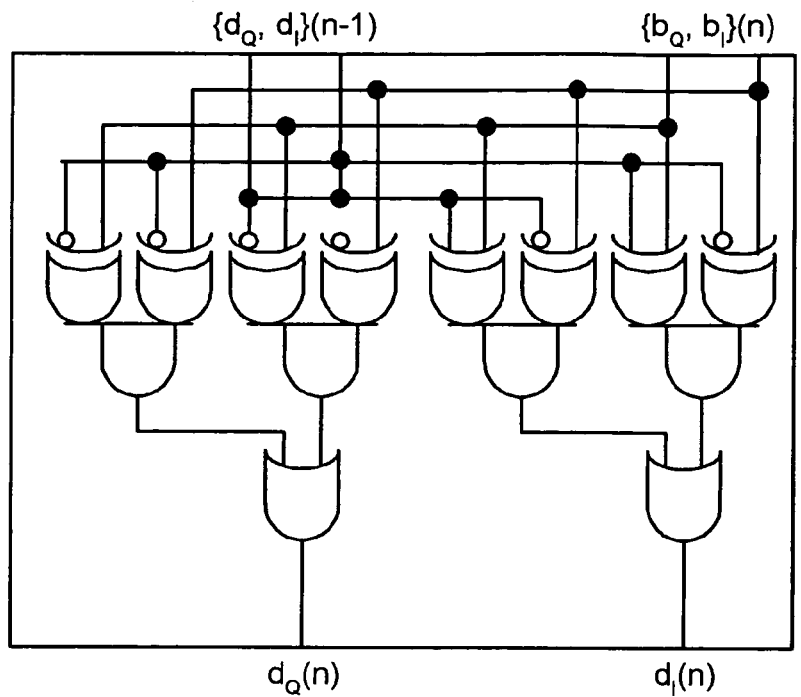
FIG. 12 is a logical circuit diagram that depicts a configuration example of a differential encoding operation circuit shown in FIG. 1.
Figure 13:
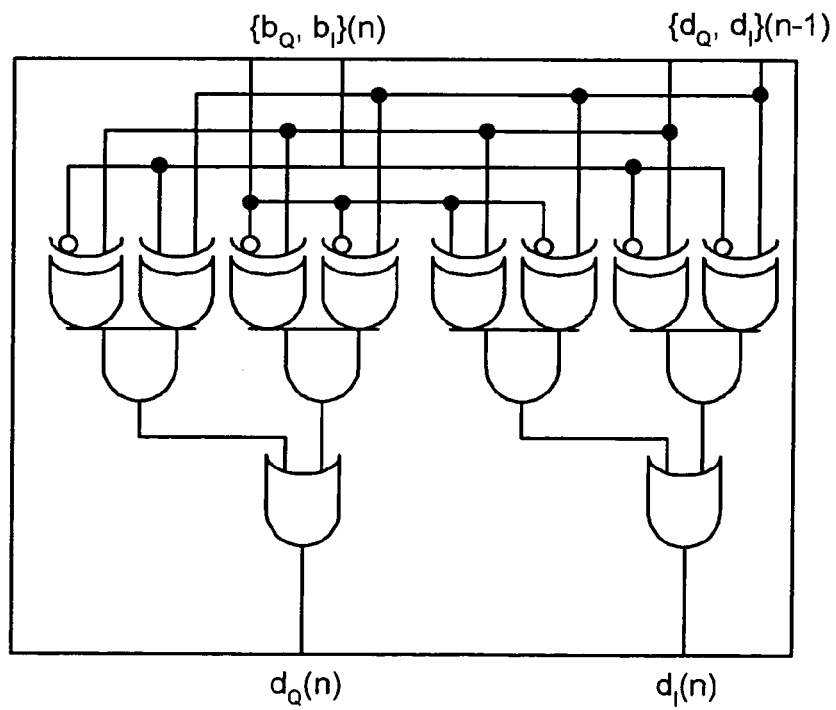
FIG. 13 is a logical circuit diagram that depicts a configuration example of a differential encoding operation circuit shown in FIG. 1.

When Equation (17-1) and Equation (17-2) are used as the logical Equations of the differential encoding operation performed by the SP circuit 1a, the SP circuit 211 and the SP circuits 101 to 108, a circuit configuration as shown in FIG. 10 is obtained. When Equation (18-1) and Equation (18-2) are used as the logical Equations of these SP circuits, a circuit configuration as shown in FIG. 11 is obtained. When Equation (19-1) and Equation (19-2) are used as the logical Equations of these SP circuits, a circuit configuration as shown in FIG. 12 is obtained. When Equation (20-1) and Equation (20-2) are used as the logical Equations of these SP circuits, a circuit configuration as shown in FIG. 13 is obtained.

It is explained below that an associative law is established in the differential encoding operation performed using Equation (17-1) and Equation (17-2), or Equation (18-1) and Equation (18-2). When "$X(X_I, X_Q) * Y(Y_I, Y_Q) * Z(Z_I, Z_Q)$" as shown in FIG. 5 is expressed by Equation (21), Equation (21) can be given by Equation (22) based on Equation (18-1) and Equation (18-2). In Equation (22), $t_I$ is expressed by Equation (23) based on Equation (17-1) and Equation (17-2). In Equation (22), $t_Q$ is expressed by Equation (24) based on Equation (17-1) and Equation (17-2).

$$\begin{pmatrix} t_I \\ t_Q \end{pmatrix} = \left( \begin{pmatrix} z_I \\ z_Q \end{pmatrix} * \begin{pmatrix} y_I \\ y_Q \end{pmatrix} \right) * \begin{pmatrix} x_I \\ x_Q \end{pmatrix} \qquad (21)$$

$$\begin{pmatrix} t_I \\ t_Q \end{pmatrix} = \begin{pmatrix} z_I \cdot z_Q \cdot y_I + z_I \cdot \overline{z_Q} \cdot y_Q + \overline{z_I} \cdot \overline{z_Q} \cdot \overline{y_I} + \overline{z_I} \cdot z_Q \cdot \overline{y_Q} \\ z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q} \end{pmatrix} * \begin{pmatrix} x_I \\ x_Q \end{pmatrix} \qquad (22)$$

$$t_I = (z_I \cdot z_Q \cdot y_I + z_I \cdot \overline{z_Q} \cdot y_Q + \overline{z_I} \cdot \overline{z_Q} \cdot \overline{y_I} + \overline{z_I} \cdot z_Q \cdot \overline{y_Q}) \cdot x_I \cdot x_Q + \qquad (23)$$
$$(z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q}) \cdot \overline{x_I} \cdot x_Q +$$
$$(z_I \cdot z_Q \cdot y_I + z_I \cdot \overline{z_Q} \cdot y_Q + \overline{z_I} \cdot \overline{z_Q} \cdot \overline{y_I} + \overline{z_I} \cdot z_Q \cdot \overline{y_Q}) \cdot \overline{x_I} \cdot \overline{x_Q} +$$
$$(z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q}) \cdot x_I \cdot \overline{x_Q} =$$
$$(z_I \cdot z_Q \cdot y_I + z_I \cdot \overline{z_Q} \cdot y_Q + \overline{z_I} \cdot \overline{z_Q} \cdot \overline{y_I} + \overline{z_I} \cdot z_Q \cdot \overline{y_Q}) \cdot x_I \cdot x_Q +$$
$$((\overline{z_I} + \overline{z_Q} + \overline{y_Q}) \cdot (z_I + \overline{z_Q} + \overline{y_I}) \cdot (\overline{z_I} + z_Q + y_I) \cdot (z_I + z_Q + y_Q)) \cdot$$
$$\overline{x_I} \cdot x_Q + ((z_I + \overline{z_Q} + \overline{y_I}) \cdot (\overline{z_I} + z_Q + \overline{y_Q}) \cdot$$
$$(z_I + z_Q + y_I) \cdot (z_I + \overline{z_Q} + y_Q)) \cdot \overline{x_I} \cdot \overline{x_Q} +$$
$$(z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q}) \cdot x_I \cdot \overline{x_Q} =$$
$$(z_I \cdot z_Q \cdot y_I + z_I \cdot \overline{z_Q} \cdot y_Q + \overline{z_I} \cdot \overline{z_Q} \cdot \overline{y_I} + \overline{z_I} \cdot z_Q \cdot \overline{y_Q}) \cdot x_I \cdot x_Q +$$
$$(\overline{z_I} \cdot \overline{z_Q} \cdot y_Q + \overline{z_I} \cdot z_Q \cdot \overline{y_I} + z_I \cdot \overline{z_Q} \cdot y_I + z_I \cdot z_Q \cdot \overline{y_Q}) \cdot \overline{x_I} \cdot x_Q +$$
$$(\overline{z_I} \cdot \overline{z_Q} \cdot y_I + \overline{z_I} \cdot z_Q \cdot y_Q + z_I \cdot \overline{z_Q} \cdot \overline{y_Q} + z_I \cdot z_Q \cdot \overline{y_I}) \cdot \overline{x_I} \cdot \overline{x_Q} +$$
$$(z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q}) \cdot x_I \cdot \overline{x_Q}$$

$$t_Q = (z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q}) \cdot x_I \cdot x_Q + \qquad (24)$$
$$(z_I \cdot z_Q \cdot y_I + z_I \cdot \overline{z_Q} \cdot y_Q + \overline{z_I} \cdot \overline{z_Q} \cdot \overline{y_I} + \overline{z_I} \cdot z_Q \cdot \overline{y_Q}) \cdot \overline{x_I} \cdot x_Q +$$
$$(z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q}) \cdot x_I \cdot \overline{x_Q} +$$
$$(z_I \cdot z_Q \cdot y_I + z_I \cdot \overline{z_Q} \cdot y_Q + \overline{z_I} \cdot \overline{z_Q} \cdot \overline{y_I} + \overline{z_I} \cdot z_Q \cdot \overline{y_Q}) \cdot \overline{x_I} \cdot \overline{x_Q} =$$
$$(z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q}) \cdot x_I \cdot x_Q +$$
$$(z_I \cdot z_Q \cdot y_I + z_I \cdot \overline{z_Q} \cdot y_Q + \overline{z_I} \cdot \overline{z_Q} \cdot \overline{y_I} + \overline{z_I} \cdot z_Q \cdot \overline{y_Q}) \cdot \overline{x_I} \cdot x_Q +$$
$$((\overline{z_I} + \overline{z_Q} + \overline{y_Q}) \cdot (z_I + \overline{z_Q} + \overline{y_I}) \cdot (\overline{z_I} + z_Q + y_I) \cdot (z_I + z_Q + y_Q)) \cdot$$
$$\overline{x_I} \cdot \overline{x_Q} + ((z_I + \overline{z_Q} + \overline{y_I}) \cdot (\overline{z_I} + z_Q + \overline{y_Q}) \cdot$$
$$(z_I + z_Q + y_I) \cdot (z_I + \overline{z_Q} + y_Q)) \cdot x_I \cdot \overline{x_Q} =$$
$$(z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q}) \cdot x_I \cdot x_Q +$$
$$(z_I \cdot z_Q \cdot y_I + z_I \cdot \overline{z_Q} \cdot y_Q + \overline{z_I} \cdot \overline{z_Q} \cdot \overline{y_I} + \overline{z_I} \cdot z_Q \cdot \overline{y_Q}) \cdot \overline{x_I} \cdot x_Q +$$
$$(\overline{z_I} \cdot \overline{z_Q} \cdot y_Q + \overline{z_I} \cdot z_Q \cdot \overline{y_I} + z_I \cdot \overline{z_Q} \cdot y_I + z_I \cdot z_Q \cdot \overline{y_Q}) \cdot \overline{x_I} \cdot \overline{x_Q} +$$
$$(\overline{z_I} \cdot \overline{z_Q} \cdot y_I + \overline{z_I} \cdot z_Q \cdot y_Q + z_I \cdot \overline{z_Q} \cdot \overline{y_Q} + z_I \cdot z_Q \cdot \overline{y_I}) \cdot x_I \cdot \overline{x_Q}$$

When "$X(X_I, X_Q)*(Y(Y_I, Y_Q))*Z(Z_I, Z_Q))$" as shown in FIG. 6 is expressed by Equation (25), Equation (25) can be given by Equation (26) based on Equation (17-1) and Equation (17-2).

$$\begin{pmatrix} s_I \\ s_Q \end{pmatrix} = \begin{pmatrix} z_I \\ z_Q \end{pmatrix} * \left( \begin{pmatrix} y_I \\ y_Q \end{pmatrix} * \begin{pmatrix} x_I \\ x_Q \end{pmatrix} \right) \qquad (25)$$

$$\begin{pmatrix} s_I \\ s_Q \end{pmatrix} = \begin{pmatrix} z_I \\ z_Q \end{pmatrix} * \begin{pmatrix} y_I \cdot x_I \cdot x_Q + \overline{y_Q} \cdot \overline{x_I} \cdot x_Q + \overline{y_I} \cdot \overline{x_I} \cdot \overline{x_Q} + y_Q \cdot x_I \cdot \overline{x_Q} \\ y_Q \cdot x_I \cdot x_Q + y_I \cdot \overline{x_I} \cdot x_Q + \overline{y_Q} \cdot \overline{x_I} \cdot \overline{x_Q} + \overline{y_I} \cdot x_I \cdot \overline{x_Q} \end{pmatrix} \qquad (26)$$

In Equation (26), $S_I$ is expressed by Equation (27) based on Equation (18-1) and Equation (18-2).

$$\begin{aligned}
s_I = &\ z_I \cdot z_Q \cdot (y_I \cdot x_I \cdot x_Q + \overline{y_Q} \cdot \overline{x_I} \cdot x_Q + \overline{y_I} \cdot \overline{x_I} \cdot \overline{x_Q} + y_Q \cdot x_I \cdot \overline{x_Q}) + \\
&\ z_I \cdot \overline{z_Q} \cdot (y_Q \cdot x_I \cdot x_Q + y_I \cdot \overline{x_I} \cdot x_Q + \overline{y_Q} \cdot \overline{x_I} \cdot \overline{x_Q} + \overline{y_I} \cdot x_I \cdot \overline{x_Q}) + \\
&\ \overline{z_I} \cdot \overline{z_Q} \cdot (\overline{y_I} \cdot x_I \cdot x_Q + \overline{y_Q} \cdot \overline{x_I} \cdot x_Q + \overline{y_I} \cdot \overline{x_I} \cdot \overline{x_Q} + y_Q \cdot x_I \cdot \overline{x_Q}) + \\
&\ \overline{z_I} \cdot z_Q \cdot (\overline{y_Q} \cdot x_I \cdot x_Q + y_I \cdot \overline{x_I} \cdot x_Q + \overline{y_Q} \cdot \overline{x_I} \cdot \overline{x_Q} + \overline{y_I} \cdot x_I \cdot \overline{x_Q}) = \\
&\ z_I \cdot z_Q \cdot (y_I \cdot x_I \cdot x_Q + \overline{y_Q} \cdot \overline{x_I} \cdot x_Q + \overline{y_I} \cdot \overline{x_I} \cdot \overline{x_Q} + y_Q \cdot x_I \cdot \overline{x_Q}) + \\
&\ z_I \cdot \overline{z_Q}(y_Q \cdot x_I \cdot x_Q + y_I \cdot \overline{x_I} \cdot x_Q + \overline{y_Q} \cdot \overline{x_I} \cdot \overline{x_Q} + \overline{y_I} \cdot x_I \cdot \overline{x_Q}) + \\
&\ \overline{z_I} \cdot \overline{z_Q} \cdot ((\overline{y_I} + \overline{x_I} + \overline{x_Q}) \cdot (y_Q + x_I + \overline{x_Q}) \cdot (y_I + x_I + x_Q) \cdot \\
&\ (\overline{y_Q} + \overline{x_I} + x_Q)) + \overline{z_I} \cdot z_Q \cdot ((\overline{y_Q} + \overline{x_I} + \overline{x_Q}) \cdot \\
&\ (\overline{y_I} + x_I + \overline{x_Q}) \cdot (y_Q + x_I + x_Q) \cdot (y_I + \overline{x_I} + x_Q)) = \\
&\ z_I \cdot z_Q \cdot (y_I \cdot x_I \cdot x_Q + \overline{y_Q} \cdot \overline{x_I} \cdot x_Q + \overline{y_I} \cdot \overline{x_I} \cdot \overline{x_Q} + y_Q \cdot x_I \cdot x_Q) + \\
&\ z_I \cdot \overline{z_Q} \cdot (y_Q \cdot x_I \cdot x_Q + y_I \cdot \overline{x_I} \cdot x_Q + \overline{y_Q} \cdot \overline{x_I} \cdot \overline{x_Q} + \overline{y_I} \cdot x_I \cdot \overline{x_Q}) + \\
&\ \overline{z_I} \cdot \overline{z_Q} \cdot (\overline{y_Q} \cdot \overline{x_I} \cdot x_Q + \overline{y_I} \cdot x_I \cdot x_Q + y_Q \cdot \overline{x_I} \cdot \overline{x_Q} + y_I \cdot \overline{x_I} \cdot \overline{x_Q}) + \\
&\ \overline{z_I} \cdot z_Q \cdot (\overline{y_I} \cdot \overline{x_I} \cdot x_Q + \overline{y_Q} \cdot x_I \cdot x_Q + y_Q \cdot \overline{x_I} \cdot \overline{x_Q} + y_I \cdot x_I \cdot \overline{x_Q}) = \\
&\ (z_I \cdot z_Q \cdot y_I + z_I \cdot \overline{z_Q} \cdot y_Q + \overline{z_I} \cdot \overline{z_Q} \cdot \overline{y_I} + \overline{z_I} \cdot z_Q \cdot \overline{y_Q}) \cdot x_I \cdot x_Q + \\
&\ (\overline{z_I} \cdot \overline{z_Q} \cdot y_Q + \overline{z_I} \cdot z_Q \cdot y_I + z_I \cdot \overline{z_Q} \cdot y_I + z_I \cdot z_Q \cdot \overline{y_Q}) \cdot \overline{x_I} \cdot x_Q + \\
&\ (\overline{z_I} \cdot \overline{z_Q} \cdot y_I + \overline{z_I} \cdot z_Q \cdot y_Q + z_I \cdot \overline{z_Q} \cdot \overline{y_Q} + z_I \cdot z_Q \cdot \overline{y_I}) \cdot \overline{x_I} \cdot \overline{x_Q} + \\
&\ (z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q}) \cdot x_I \cdot \overline{x_Q}
\end{aligned} \qquad (27)$$

In Equation (27), $S_Q$ is expressed by Equation (28) based on Equation (18-1) and Equation (18-2).

$$\begin{aligned}
s_Q = &\ z_I \cdot z_Q \cdot (y_Q \cdot x_I \cdot x_Q + y_I \cdot \overline{x_I} \cdot x_Q + \overline{y_Q} \cdot \overline{x_I} \cdot \overline{x_Q} + \overline{y_I} \cdot x_I \cdot \overline{x_Q}) + \\
&\ \overline{z_I} \cdot z_Q \cdot (y_I \cdot x_I \cdot x_Q + \overline{y_Q} \cdot \overline{x_I} \cdot x_Q + \overline{y_I} \cdot \overline{x_I} \cdot \overline{x_Q} + y_Q \cdot x_I \cdot \overline{x_Q}) + \\
&\ z_I \cdot \overline{z_Q} \cdot (\overline{y_I} \cdot x_I \cdot x_Q + \overline{y_Q} \cdot \overline{x_I} \cdot x_Q + \overline{y_I} \cdot \overline{x_I} \cdot \overline{x_Q} + y_Q \cdot x_I \cdot \overline{x_Q}) + \\
&\ \overline{z_I} \cdot \overline{z_Q} \cdot (\overline{y_Q} \cdot x_I \cdot x_Q + y_I \cdot \overline{x_I} \cdot x_Q + \overline{y_Q} \cdot \overline{x_I} \cdot \overline{x_Q} + \overline{y_I} \cdot x_I \cdot \overline{x_Q}) = \\
&\ z_I \cdot z_Q \cdot (y_Q \cdot x_I \cdot x_Q + y_I \cdot \overline{x_I} \cdot x_Q + \overline{y_Q} \cdot \overline{x_I} \cdot \overline{x_Q} + \overline{y_I} \cdot x_I \cdot \overline{x_Q}) + \\
&\ \overline{z_I} \cdot z_Q \cdot (y_I \cdot x_I \cdot x_Q + \overline{y_Q} \cdot \overline{x_I} \cdot x_Q + \overline{y_I} \cdot \overline{x_I} \cdot \overline{x_Q} + y_Q \cdot x_I \cdot \overline{x_Q}) + \\
&\ z_I \cdot \overline{z_Q} \cdot ((\overline{y_I} + \overline{x_I} + \overline{x_Q}) \cdot (y_Q + x_I + \overline{x_Q}) \cdot (y_I + x_I + x_Q) \cdot \\
&\ (\overline{y_Q} + \overline{x_I} + x_Q)) + \overline{z_I} \cdot \overline{z_Q} \cdot ((\overline{y_Q} + \overline{x_I} + \overline{x_Q}) \cdot \\
&\ (\overline{y_I} + x_I + \overline{x_Q}) \cdot (y_Q + x_I + x_Q) \cdot (y_I + \overline{x_I} + x_Q)) = \\
&\ z_I \cdot z_Q \cdot (y_Q \cdot x_I \cdot x_Q + y_I \cdot \overline{x_I} \cdot x_Q + \overline{y_Q} \cdot \overline{x_I} \cdot \overline{x_Q} + \overline{y_I} \cdot x_I \cdot \overline{x_Q}) + \\
&\ \overline{z_I} \cdot z_Q \cdot (y_I \cdot x_I \cdot x_Q + \overline{y_Q} \cdot \overline{x_I} \cdot x_Q + \overline{y_I} \cdot \overline{x_I} \cdot \overline{x_Q} + y_Q \cdot x_I \cdot \overline{x_Q}) + \\
&\ z_I \cdot \overline{z_Q} \cdot (\overline{y_Q} \cdot x_I \cdot x_Q + \overline{y_I} \cdot x_I \cdot x_Q + y_Q \cdot \overline{x_I} \cdot \overline{x_Q} + y_I \cdot \overline{x_I} \cdot \overline{x_Q}) + \\
&\ \overline{z_I} \cdot \overline{z_Q} \cdot (\overline{y_I} \cdot \overline{x_I} \cdot x_Q + \overline{y_Q} \cdot x_I \cdot x_Q + y_Q \cdot \overline{x_I} \cdot \overline{x_Q} + y_I \cdot x_I \cdot \overline{x_Q}) =
\end{aligned} \qquad (28)$$

-continued
$$\begin{aligned}
&\ (z_I \cdot z_Q \cdot y_Q + \overline{z_I} \cdot z_Q \cdot y_I + z_I \cdot \overline{z_Q} \cdot \overline{y_I} + \overline{z_I} \cdot \overline{z_Q} \cdot \overline{y_Q}) \cdot x_I \cdot x_Q + \\
&\ (z_I \cdot z_Q \cdot y_I + z_I \cdot \overline{z_Q} \cdot y_Q + \overline{z_I} \cdot \overline{z_Q} \cdot \overline{y_I} + z_I \cdot z_Q \cdot \overline{y_Q}) \cdot \overline{x_I} \cdot x_Q + \\
&\ (\overline{z_I} \cdot \overline{z_Q} \cdot y_Q + \overline{z_I} \cdot z_Q \cdot \overline{y_I} + z_I \cdot \overline{z_Q} \cdot y_I + z_I \cdot z_Q \cdot \overline{y_Q}) \cdot \overline{x_I} \cdot \overline{x_Q} + \\
&\ (\overline{z_I} \cdot \overline{z_Q} \cdot y_I + \overline{z_I} \cdot z_Q \cdot y_Q + z_I \cdot \overline{z_Q} \cdot \overline{y_Q} + z_I \cdot z_Q \cdot \overline{y_I}) \cdot x_I \cdot \overline{x_Q}
\end{aligned}$$

The logical Equations of the right side of Equation (23) and the right side of Equation (27) are equal, and the logical Equations of the right side of Equation (24) and the right side of Equation (28) are equal. Therefore, Equation (29) is obtained from Equations (23), (24), (27), and (28), and the associative law is established in the differential encoding operation.

$$\begin{pmatrix} s_I \\ s_Q \end{pmatrix} = \begin{pmatrix} t_I \\ t_Q \end{pmatrix} \qquad (29)$$

Because the associative law is established in the differential encoding operation, Equation (15-1) to Equation (15-8) can be given by $$DO_1 = B_1 * DOO \qquad (29\text{-}1)$$

$$DO_2 = B_2 * (B_1 * DOO) \qquad (29\text{-}2)$$

$$DO_3 = B_3 * (B_2 * (B_1 * DOO)) \qquad (29\text{-}3)$$

$$DO_4 = B_4 * (B_3 * (B_2 * (B_1 * DOO))) \qquad (29\text{-}4)$$

$$DO_5 = B_5 * (B_4 * (B_3 * (B_2 * (B_1 * DOO)))) \qquad (29\text{-}5)$$

$$DO_6 = B_6 * (B_5 * (B_4 * (B_3 * (B_2 * (B_1 * DOO))))) \qquad (29\text{-}6)$$

$$DO_7 = B_7 * (B_6 * (B_5 * (B_4 * (B_3 * (B_2 * (B_1 * DOO)))))) \qquad (29\text{-}7)$$

$$DO_8 = B_8 * (B_7 * (B_6 * (B_5 * (B_4 * (B_3 * (B_2 * (B_1 * DOO))))))) \qquad (29\text{-}8)$$

DOO in Equation (29-1) to Equation (29-8), and $DO_8$ in the right side of Equation (6-1) to Equation (6-8) show the output information series before $B_1$. Therefore, Equation (29-1) to Equation (29-8) becomes equal to Equation (6-1) to Equation (6-8). Consequently, the parallel precoder circuit shown in FIG. 1 is equivalent to the parallel precoder circuit shown in FIG. 4.

While n=8 in the input information series of the parallel precoder circuit explained above, when the operator of the differential encoding operation is expressed as "*", the output information series DOi of the i-th set of the input information series can be given by $$DO_i = B_i * (B_{i-1} * (B_{i-2} * \ldots * (B_2 * ((B_1 * DOO) \ldots ) \qquad (30)$$

When the parallel precoder circuit is designed to satisfy Equation (30), a precoder circuit of the parallelized DPQSK transmission and reception system can be obtained.

Figure 14:
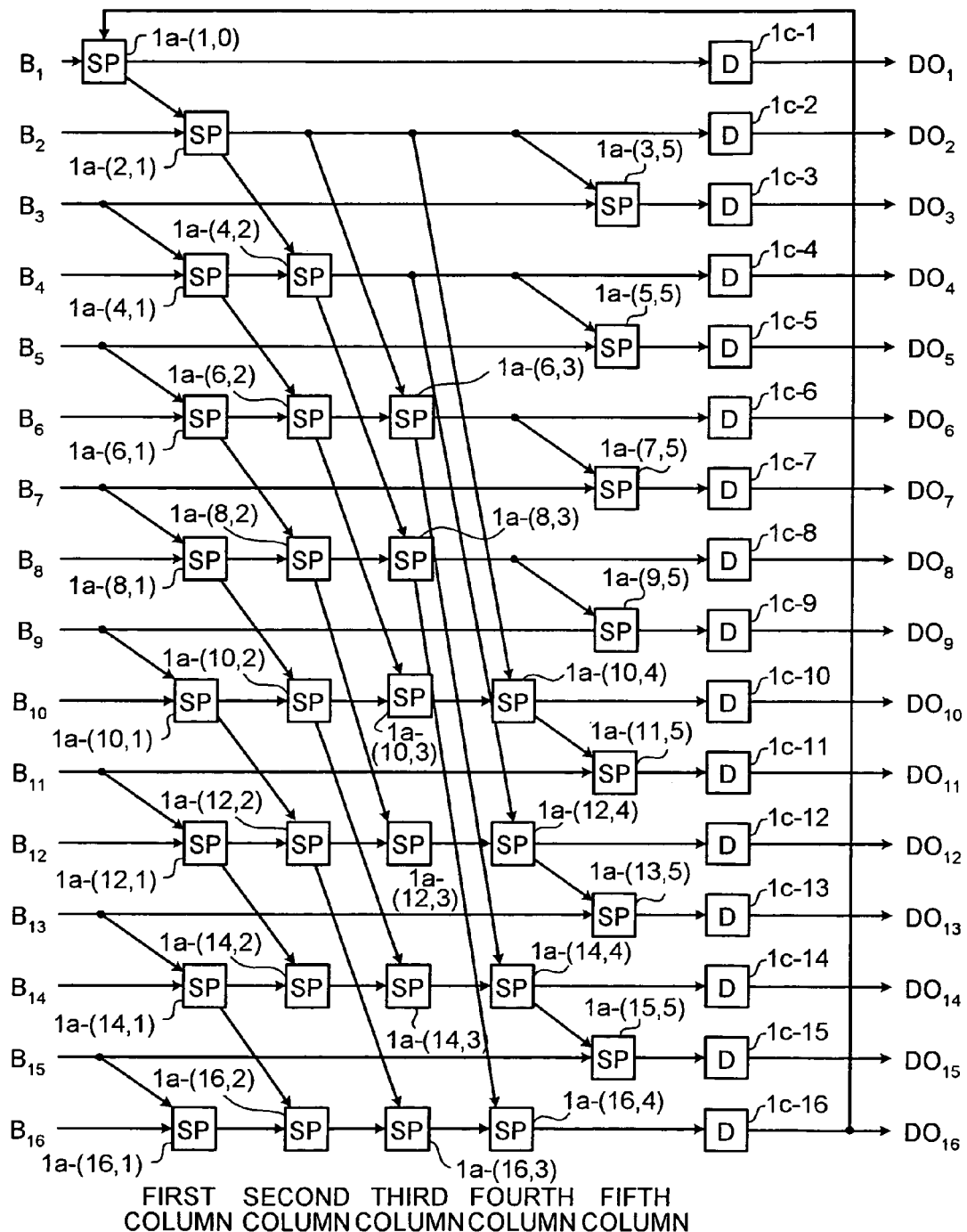
FIG. 14 is a configuration example of a parallel precoder circuit according to a first embodiment of the present invention.

While the configuration when n=8 is shown in FIG. 1, a parallel precoder circuit developed in parallel in a larger multiple value can be obtained by inductively configuring the SP circuit as shown in the first embodiment. FIG. 14 is a configuration diagram of a parallel precoder circuit when n=16.

The input set n developed in parallel is not particularly limited to the power of two. For example, a parallel precoder circuit that satisfies Equation (30) can be obtained when the SP circuits 1a-(8,1), 1a-(8,2), and 1a-(8,3), and the delay circuit 1c-8 are deleted and also when the output set of the delay circuit 1c-7 is fed back to the SP circuit 1a-(1,0).

As explained above, according to the first embodiment, the following operation is performed. The differential encoding operation circuits in the zeroth column performs differential encoding operation by using the output set of the delay circuit in the nth row as one input set, and using the parallel input information series in the first row as the other input set. The differential encoding operation circuit in the (2k)th ($1 \leq k \leq n/2$, where k is an integer) row and the first column performs differential encoding operations by using the parallel input information series in the kth row as one input set, and using the output set of the differential encoding operation circuit in the zeroth column as the other input set when the value of k is 1, or using the parallel information series in the (2k−1)th row as the other input set when the value of k is larger than 1. The differential encoding operation circuit in the (2k)th row and the m-th ($2 \leq m \leq h-1$, where m is an integer, and h is a smallest integer equal to or larger than ($\log_2 n$)+1) column performs differential encoding operations by using the output set of the differential encoding operation circuit in the (2k)th row and the (m−1)th column as one input set when 2k−2^(m−1) is equal to or larger than 1, and using the output set of the differential encoding operation circuit in the (2k−2^(m−1))th row and the (m−1)th column as the other input set when a differential encoding operation circuit is disposed in the (2k−2^(m−1))th row and the (m−1)th column. When no differential encoding operation circuit is disposed in the (2k−2^(m−1))th row and the (m−1)th column, the differential encoding operation circuit in the (2k)th row and the mth column performs differential encoding operations by using the output set of the differential encoding operation circuit having a largest column number among differential encoding operation circuits disposed in the (2k−2^(m−1))th row as the other input set. The differential encoding operation circuit in the (2k−1)th row and the hth column performs differential encoding operations by using parallel input information series in the (2k−1)th row as one input set, and using the output set of the differential encoding operation circuit having a largest column number among differential encoding operation circuits disposed in the (2k−2)th row as the other input set. The delay circuit in the nth row delays the output of the differential encoding operation circuit having a largest column number among differential encoding operation circuits disposed in the nth row. The delay circuit in the nth row produces the output set of the differential encoding operation circuit having a largest column number among differential encoding operation circuits disposed in the first to the (n−1)th rows respectively as the parallel output information series in the first to the (n−1)th rows respectively, and produces the output set of the nth row delay circuit as the nth row parallel output information series.

In other words, the parallel precoder circuit according to the first embodiment performs differential encoding operations by dividing data into plural groups, and further performs differential encoding operations at separated stages. Therefore, a parallel precoder circuit having a small delay in the circuit can be obtained.

Specifically, the parallel precoder circuit obtained by simply developing the serial precoder in parallel as shown in FIG. 4 generates a delay of n stages when the serial input information series are developed in n sets and when a delay is at one stage of the SP circuit. However, in the parallel precoder circuit according to the first embodiment of the present invention, a maximum delay path can be restricted to ($\log_2 n$)+1 stages. For example, when n=8, delay occurs at four stages, and when n=16, delay occurs at five stages.

In the case of ultra-high speed optical communications having a transmission path clock of 40 Gbit/sec, parallel development is often performed in a large multiple value of n=256 in the circuit operation clock of 160 MHz. In this case, in the parallel precoder circuit shown in FIG. 4, SP circuits at 256 stages need to operate in one clock. On the other hand, in the parallel precoder circuit according to the first embodiment of the present invention, the number of SP circuits that operate in one clock can be decreased to ($\log_2 256$)+1=9 stages. Accordingly, requirement for the operation speed of the SP circuits can be minimized.

According to the first embodiment, SP circuits are disposed in a lattice shape of n rows times $\log_2 n$ columns. Therefore, the total number of SP circuits that configure the parallel precoder circuit becomes smaller than n×($\log_2 n$). Consequently, the circuit scale can be accommodated within the size of n×($\log_2 n$). In other words, the parallel precoder circuit according to the first embodiment can have a smaller circuit scale than that of the parallel precoder circuit shown in FIG. 4 that generates output signals from parallel-developed input signals.

A parallel precoder circuit according to a second embodiment of the present invention is explained below with reference to FIG. 15. The parallel precoder circuit according to the second embodiment of the present invention is applied to the DQPSK system. The parallel precoder circuit calculates n-set ($2 \leq n$, where n is an integer) parallel output information series $DO_1$ ($d_I, d_Q$) to $DO_n$ ($d_I, d_Q$) using 2-bit information series including the signal $d_I$ of the in-phase component (the I system) and the signal $d_Q$ of the quadrature-phase component (the Q system) as one set, from the n-set parallel input information series $B_I$ ($b_I, b_Q$) to $B_n$ ($b_I, b_Q$) using 2-bit information series including the signal $b_I$ of the I system and the signal $b_Q$ of the Q system as one set.

The parallel precoder circuit according to the second embodiment includes SP circuits 10a ((10a-(i,j)) that perform a differential encoding operation derived from two sets of input signals, and delay circuits 10c (10c-1 to 10c-n) that are configured by flip-flops and output one set of input signals by delaying the signals by a unit time.

In the parallel precoder circuit according to the second embodiment, the SP circuits 10a and the delay circuits 10c are connected in a net configuration described later, in a manner similar to that according to the first embodiment. The SP circuit in the ith row is an SP circuit disposed in a signal route that connects between the parallel input information series $B_i$ and a delay circuit 7c-i. An SP circuit that is input with an output of the delay circuit 10c-n and parallel input information series $B_1$ is defined as an SP circuit in the zeroth column. A j-th SP circuit from the parallel input information series $B_1$ is defined as the SP circuit in the jth column. When the last column in which the SP circuit is disposed is defined as the hth column, the last column h becomes a smallest integer equal to or above $\log_2 n$.

Figure 15:
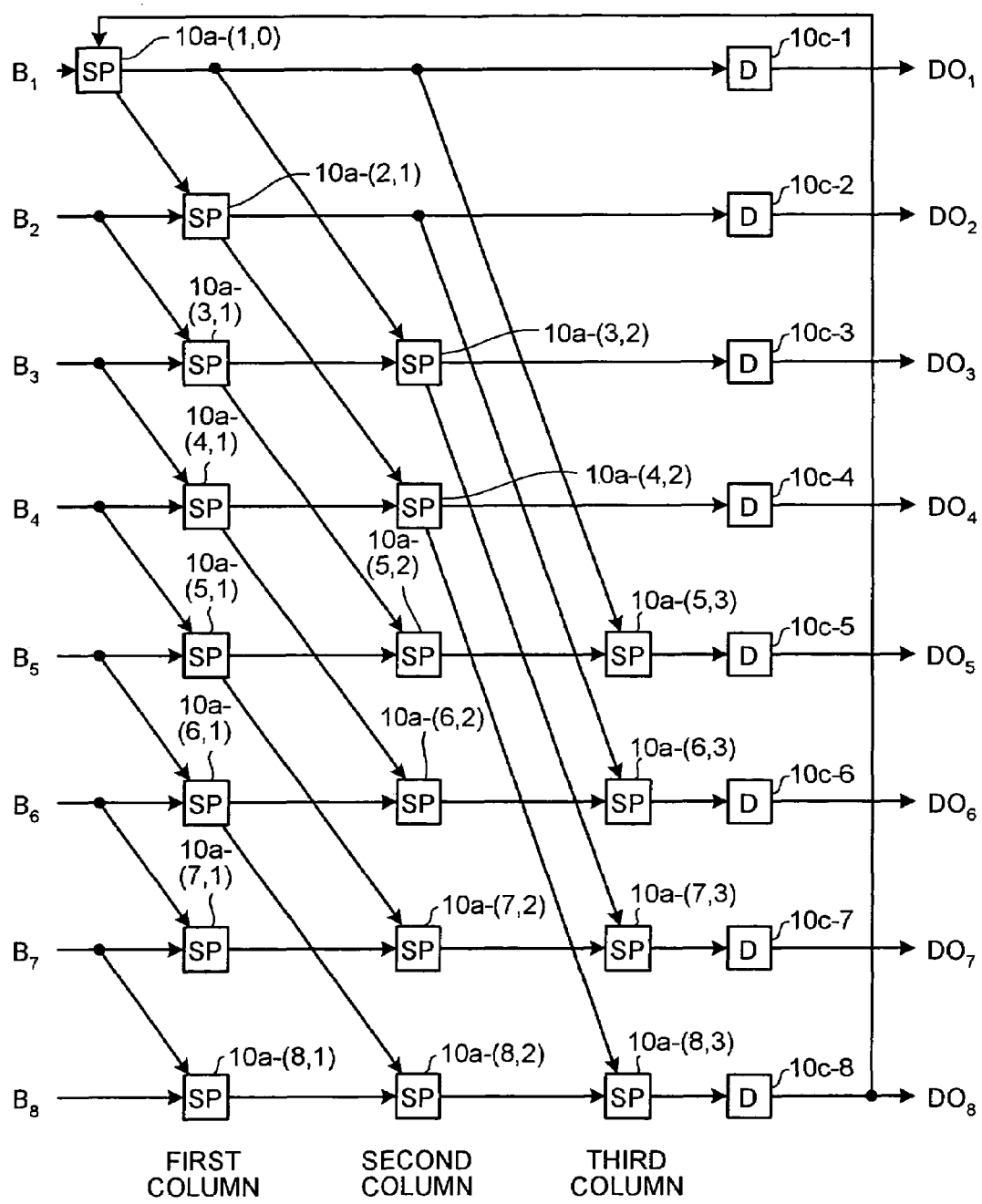
FIG. 15 is a configuration example of a parallel precoder circuit according to a second embodiment of the present invention.

FIG. 15 is a configuration diagram of the parallel precoder circuit according to the second embodiment when "n=8". In FIG. 1 zero the parallel precoder circuit includes the SP circuits 10a (10a-(1,0), 10a-(2,1), 10a-(3,1), 10a-(4,1), 10a-(5,1), 10a-(6,1), 10a-(7,1), 10a-(8,1), 10a-(3,2), 10a-(4,2), 10a-(5,2), 10a-(6,2) 10a-(7,2), 10a-(8,2) 10a-(5,3), 10a-(6,3) 10a-(7,3), 10a-(8,3)), and delay circuits (D in FIG. 15) 10c (10c-1 to 10c-8).

In FIG. 1 zero the SP circuit 10a-(1,0) is disposed in the first row and the zeroth column, the SP circuit 10a-(2,1) is disposed in the second row and the first column, the SP circuit 10a-(3,1) is disposed in the third row and the first column, the SP circuit 10a-(3,2) is disposed in the third row and the second column, the SP circuit 10a-(4,1) is disposed in the fourth row and the first column, the SP circuit 10a-(4,2) is disposed in the fourth row and the second column, the SP circuit 10a-(5,1) is disposed in the fifth row and the first column, the SP circuit 10a-(5,2) is disposed in the fifth row and the second column, the SP circuit 10a-(5,3) is disposed in the fifth row and the third column, the SP circuit 10a-(6,1) is disposed in the sixth row and the first column, the SP circuit 10a-(6,2) is disposed in the sixth row and the second column, the SP circuit 10a-(6,3) is disposed in the sixth row and the third column, the SP circuit 10a-(7,1) is disposed in the seventh row and the first column, the SP circuit 10a-(7,2) is disposed in the seventh row and the second column, the SP circuit 10a-(7,3) is disposed in the seventh row and the third column, the SP circuit 10a-(8,1) is disposed in the eight row and the first column, the SP circuit 10a-(8,2) is disposed in the eighth row and the first column, and the SP circuit 10a-(8,3) is disposed in the eighth row and the third column. The third column is the last column.

A net configuration for connecting between the SP circuits 10a and the delay circuits 10c is explained next. Parallel input information series $B_k$ are connected to one input set and parallel input information series $B_{k-1}$ are connected to the other input set respectively of the SP circuit 10a-(k,1) in the kth row and the first column. However, instead of the parallel input information series $B_1$, the output set of the SP circuit 10a-(1,0) are connected to the other input set of the SP circuit 10a-(2,1) in the second row and the first column. In the above, k is an integer that satisfies "$2 \leq k \leq n$".

The output set of the SP circuit 10a-(k-2^(m-1),m-1) is connected to one input set, and the output set of the SP circuit 10a-(k,m-1) is connected to the other input set respectively of the SP circuit 10a-(k,m) in the kth row and the mth column. However, when no SP circuit is disposed in the (k-2^(m-1))th row and the (m-1)th column, the output set of the SP circuit in the jth column having a largest column number j among SP circuits disposed in the (k-2^(m-1))th row is connected to the other input set of the SP circuit 10a-(2k,m). When k-2^(m-1) is smaller than 1, no SP circuit is disposed. In the above, m is an integer that satisfies "$2 \leq m \leq h$".

The output set of the SP circuit in the jth column having a largest column number j among SP circuits disposed in the ith row is connected to the input set of the delay circuit 10c-i in the ith row. However, the output set of the SP circuit 10a-(1,0) is connected to the input set of the delay circuit 10c-1 in the first row. The output of the delay circuit 10c-i becomes the parallel output DOi.

It is explained next that the parallel precoder circuit according to the second embodiment satisfies Equation (30) and is equivalent to the precoder circuit of the DQPSK system.

The SP circuit 10-(k,1) in the first column outputs a result of the differential encoding operation of the parallel input information series $B_k$ and $B_{k-1}$. The SP circuit 10a-(k,2) in the second column outputs a result of the differential encoding operation of the output sets of the SP circuit 10a-(k-2,1) and the SP circuit 10a-(k,1). In other words, the output set of the SP circuit 10a-(k,2) is equivalent to the result of the differential encoding operation of the parallel inputs $B_k$ to $B_{k-3}$.

In the 8-bit parallel precoder circuit shown in FIG. 15, when the output of the SP circuit 10a-(1,0) in the first row and the zeroth column is $BB_1$ and when the operator of a differential encoding operation is "*", an output SPO10a-(2,1) of the SP circuit 10a-(2,1) in the second row and the first column can be given by $$SPO10a\text{-}(2,1)=BB_1{}^*B_2 \tag{31-1}$$

An output SPO10a-(3,1) of the SP circuit 10a-(3,1) in the third row and the first column can be given by $$SPO10a\text{-}(3,1)=B_2{}^*B_3 \tag{31-2}$$

An output SPO10a-(4,1) of the SP circuit 10a-(4,1) in the fourth row and the first column can be given by $$SPO10a\text{-}(4,1)=B_3{}^*B_4 \tag{31-3}$$

An output SPO10a-(5,1) of the SP circuit 10a-(5,1) in the fifth row and the first column can be given by $$SPO10a\text{-}(5,1)=B_4{}^*B_5 \tag{31-4}$$

An output SPO10a-(6,1) of the SP circuit 10a-(6,1) in the sixth row and the first column can be given by $$SPO10a\text{-}(6,1)=B_5{}^*B_6 \tag{31-5}$$

An output SPO10a-(7,1) of the SP circuit 10a-(7,1) in the seventh row and the first column can be given by $$SPO10a\text{-}(7,1)=B_6{}^*B_7 \tag{31-6}$$

An output SPO10a-(8,1) of the SP circuit 10a-(8,1) in the eighth row and the first column can be given by $$SPO1a\text{-}(8,1)=B_7{}^*B_8 \tag{31-7}$$

Equation (31-1) to Equation (31-7) is hereinafter also referred to as Equations (31).

An output SPO10a-(3,2) of the SP circuit 10a-(3,2) in the third row and the second column can be given by $$SPO10a\text{-}(3,2)=SPO10a\text{-}(1,0)*SPO10a\text{-}(3,1) \tag{32-1}$$

An output SPO10a-(4,2) of the SP circuit 10a-(4,2) in the fourth row and the second column can be given by $$SPO10a\text{-}(4,2)=SPO10a\text{-}(2,1)*SPO10a\text{-}(4,1) \tag{32-2}$$

An output SPO10a-(5,2) of the SP circuit 10a-(5,2) in the fifth row and the second column can be given by $$SPO10a\text{-}(5,2)=SPO10a\text{-}(3,1)*SPO10a\text{-}(5,1) \tag{32-3}$$

An output SPO10a-(6,2) of the SP circuit 10a-(6,2) in the sixth row and the second column can be given by $$SPO10a\text{-}(6,2)=SPO10a\text{-}(4,1)*SPO10a\text{-}(6,1) \tag{32-4}$$

An output SPO10a-(7,2) of the SP circuit 10a-(7,2) in the seventh row and the second column can be given by $$SPO10a\text{-}(7,2)=SPO10a\text{-}(5,1)*SPO10a\text{-}(7,1) \tag{32-5}$$

An output SPO10a-(8,2) of the SP circuit 10a-(8,2) in the eighth row and the second column can be given by $$SPO10a\text{-}(8,2)=SPO10a\text{-}(6,1)*SPO10a\text{-}(8,1) \tag{32-6}$$

Based on Equation (14), Equation (32-1) to Equation (32-6) become $$SPO10a\text{-}(3,2)=BB_1{}^*(B_2{}^*B_3) \tag{33-1}$$

$$SPO10a\text{-}(4,2)=(BB_1{}^*B_2)*(B_3{}^*B_4) \tag{33-2}$$

$$SPO10a\text{-}(5,2)=(B_2{}^*B_3)*(B_4{}^*B_5) \tag{33-3}$$

$$SPO10a\text{-}(6,2)=(B_3{}^*B_4)*(B_5{}^*B_6) \tag{33-4}$$

$$SPO10a\text{-}(7,2)=(B_4{}^*B_5)*(B_6{}^*B_7) \tag{33-5}$$

$$SPO10a\text{-}(8,2)=(B_5{}^*B_6)*(B_7{}^*B_8) \tag{33-6)}$$

Equation (33-1) to Equation (33-6) is hereinafter also referred to as Equations (33).

The SP circuit 10a-(k,3) in the third column outputs a result of differentially encoding the output set of the SP circuit, 10a-(k,2) and the output set of the SP circuit 10a-(k-4,2). The output set of the SP circuit 10a-(k,3) is equal to a result of differentially encoding the parallel input information series $B_k$ to $B_{k-7}$ (corresponding to the output of the SP circuit 10a-(8,3) in FIG. 15). When k-7 is equal to or smaller than 0

(corresponding to the outputs of the SP circuit s $10a\text{-}(5,3)$ to $10a\text{-}(7,3)$ in FIG. 15), the output of the SP circuit $10a\text{-}(k,3)$ is equal to a result of the differential encoding operation of the parallel input information series $B_k$ to $B_1$.

In FIG. 15, an output $SPO10a\text{-}(5,3)$ of the SP circuit $10a\text{-}(5,3)$ in the fifth row and the third column can be given by $$SPO10a\text{-}(5,3)=BB_1*SPO10a\text{-}(5,2) \quad (34\text{-}1)$$

An output $SPO10a\text{-}(6,3)$ of the SP circuit $10a\text{-}(6,3)$ in the sixth row and the third column can be given by $$SPO10a\text{-}(6,3)=SPO10a\text{-}(2,1)*SPO10a\text{-}(6,2) \quad (34\text{-}2)$$

An output $SPO10a\text{-}(7,3)$ of the SP circuit $10a\text{-}(7,3)$ in the seventh row and the third column can be given by $$SPO10a\text{-}(7,3)=SPO10a\text{-}(3,2)*SPO10a\text{-}(7,2) \quad (34\text{-}3)$$

An output $SPO10a\text{-}(8,3)$ of the SP circuit $10a\text{-}(8,3)$ in the eighth row and the third column can be given by $$SPO10a\text{-}(8,3)=SPO10a\text{-}(4,2)*SPO10a\text{-}(8,2) \quad (34\text{-}4)$$

Based on Equations (31) and Equations (33), Equation (34-1) to Equation (34-4) become $$SPO10a\text{-}(5,3)=BB_1*((B_2*B_3)*(B_4*B_5)) \quad (35\text{-}1)$$

$$SPO10a\text{-}(6,3)=(BB_1*B_2)*((B_3*B_4)*(B_5*B_6)) \quad (35\text{-}2)$$

$$SPO10a\text{-}(7,3)=(BB_1*(B_2*B_3))*((B_4*B_5)*(B_6*B_7)) \quad (35\text{-}3)$$

$$SPO10a\text{-}(8,3)=((BB_1*B_2)*(B_3*B_4))*((B_5*B_6)*(B_7*B_8)) \quad (35\text{-}4)$$

Equation (35-1) to Equation (35-4) is hereinafter also referred to as Equations (35).

The outputs $SPO10a\text{-}(1,0)$, $10a\text{-}(2,1)$, $10a\text{-}(3,2)$, $10a\text{-}(4,2)$, $10a\text{-}(5,3)$, $10a\text{-}(6,3)$, $10a\text{-}(7,3)$, and $10a\text{-}(8,3)$ of the SP circuits $10a\text{-}(1,0)$, $10a\text{-}(2,1)$, $10a\text{-}(3,2)$, $10a\text{-}(4,2)$, $10a\text{-}(5,3)$, $10a\text{-}(6,3)$, $10a\text{-}(7,3)$, and $10a\text{-}(8,3)$, respectively, are input to the delay circuits $1c\text{-}i$ to $1c\text{-}8$, respectively, are delayed by one clock, and are output as the parallel output information series $DO_1$ to $DO_8$. The output $BB_1$ of the SP circuit $1a\text{-}(1,0)$ is a result of the differential encoding operation of the parallel output information series DDO before the parallel output information series $B_1$ and the parallel output information series $B_1$. The output $BB_1$ can be expressed as $$BB_1 = B_1*DDO \quad (36)$$

Therefore, the parallel output information series $DO_1$ of the parallel precoder circuit shown in FIG. 15 can be given by $$DO_1 = B_1*DDO \quad (37\text{-}1)$$

From Equation (31-1) and Equation (36), the parallel output information series $DO_2$ can be given by $$DO_2 = (B_1*DDO)*B_2 \quad (37\text{-}2)$$

From Equation (33-1) and Equation (36), the parallel output information series $DO_3$ can be given by $$DO_2 = (B_1*DDO)*(B_2*B_3) \quad (37\text{-}3)$$

From Equation (33-2) and Equation (36), the parallel output information series $DO_4$ can be given by $$DO_4 = ((B_1*DDO)*B_2)*(B_3*B_4) \quad (37\text{-}4)$$

From Equation (35-1) and Equation (36), the parallel output information series $DO_5$ can be given by $$DO_5 = (B_1*DDO)*((B_2*B_3)*(B_4*B_5)) \quad (37\text{-}5)$$

From Equation (35-2) and Equation (36), the parallel output information series $DO_6$ can be given by $$DO_6 = ((B_1*DDO)*B_2)*((B_3*B_4)*(B_5*B_6)) \quad (37\text{-}6)$$

From Equation (35-3) and Equation (36), the parallel output information series $DO_7$ can be given by $$DO_7 = ((B_1*DDO)*(B_2*B_3))*((B_4*B_5)*(B_6*B_7)) \quad (37\text{-}7)$$

From Equation (35-4) and Equation (36), the parallel output information series $DO_8$ can be given by $$DO_7 = ((B_1*DDO)*B_2)*(B_3*B_4))*((B_5*B_6)*(B_7*B_8)) \quad (37\text{-}8)$$

According to the first embodiment, the associative law is established in the differential encoding operation. Therefore, Equation (37-1) to Equation (37-8) can be given as follows, and these Equations satisfy Equation (30).

$$DO_1 = B_1*DDO$$

$$DO_2 = B_2*(B_1*DDO)$$

$$DO_3 = B_3*(B_2*(B_1*DDO))$$

$$DO_4 = B_4*(B_3*(B_2*(B_1*DDO))$$

$$DO_5 = B_5*(B_4*(B_3*(B_2*(B_1*DDO))))$$

$$DO_6 = B_6*(B_5*(B_4*(B_3*(B_2*(B_1*DDO)))))$$

$$DO_7 = B_7*(B_6*(B_5*(B_4*(B_3*(B_2*(B_1*DDO))))))$$

$$DO_8 = B_8*(B_7*(B_6*(B_5*(B_4*(B_3*(B_2*(B_1*DDO)))))))$$

In other words, the parallel precoder circuit according to the second embodiment of the present invention is equivalent to the serial precoder circuit. The parallel-developed input set n is not particularly required to be the power of two.

As explained above, according to the second embodiment, the differential encoding operation circuit in the zeroth column performs differential encoding operations by using the output set of the delay circuit in the nth row as one input set, and using the parallel input information series in the first row as the other input set. The differential encoding operation circuit in the kth row and the first column performs differential encoding operations by using the parallel input information series in the k ($2 \leq k \leq n$, where k is an integer)-th row as one input set, and using the output set of the differential encoding operation circuit in the zeroth column as the other input set when the value of k is 2, or using the parallel signal information series in the (k−1)-th row as the other input set when the value of k is larger than 2. The differential encoding operation circuit in the kth row and the mth column performs differential encoding operations by using the output set of the differential encoding operation circuit in the kth row and the (m−1)th column, and the output set of the differential encoding operation circuit in the (k−2^(m−1))th row and the (m−1) th column as input set, when k−2^(m−1) ($2 \leq m \leq h$, where m is an integer, and h is a smallest integer equal to or above $\log_2 n$) is equal to or larger than 1. When no differential encoding operation circuit is disposed in the (k−2^(m−1))th row and the (m−1)th column, the differential encoding operation circuit in the kth row and the mth column performs differential encoding operations by using as input sets the output set of the differential encoding operation circuit in the kth row and the (m−1)th column, and the output set of the differential encoding operation circuit having a largest column number among differential encoding operation circuits disposed in the (k−2^(m−1))th row. The delay circuits in the first to the nth rows delay the output of the differential encoding operation circuit having a largest column number among differential encoding operation circuits disposed in the first to the nth rows respectively, and use the delayed results as the parallel output information series in the first to the nth rows.

In other words, the parallel precoder circuit according to the second embodiment is configured to perform differential encoding operations by dividing data into plural groups, and to obtain a result by further performing differential encoding operations at separated stages. Therefore, a parallel precoder having a small circuit delay can be obtained. Specifically, in the second embodiment, when a delay is at one stage of the SP circuit, maximum delay can be decreased to $(\log_2 n)+1$ stages. Furthermore, a circuit scale can be decreased to within $n \times (\log_2 n)$.

A parallel precoder circuit according to a third embodiment of the present invention is explained below with reference to FIG. 16. The parallel precoder circuit according to the third embodiment is applied to the DQPSK system. The parallel precoder circuit calculates n-set ($2 \leq n$, where n is an integer) parallel output information series $DO_1$ ($d_I, d_Q$) to $DO_1$ ($d_I, d_Q$) using 2-bit information series including the signal $d_I$ of the in-phase component (the I system) and the signal $d_Q$ of the quadrature-phase component (the Q system) as one set, from the n-set parallel input information series $B_I$ ($b_I, b_Q$) to $B_n$ ($b_I, b_Q$) using 2-bit information series including the signal $b_I$ of the I system and the signal $b_Q$ of the Q system as one set.

The parallel precoder circuit according to the third embodiment includes SP circuits 10a (($12a$-(i,j)) that perform differential encoding operations based on two sets of input signals, and delay circuits 12c (12c-1 to 12c-n) that are configured by flip-flops and the like, and output one set of input signals by delaying the signals by a unit time.

In the parallel precoder circuit according to the third embodiment, the SP circuits 12a and the delay circuits 12c are connected together in a net configuration as described later, in a similar manner to that according to the first embodiment. The SP circuit in the ith row is an SP circuit disposed in a signal route that connects between parallel input information series $B_i$ and a delay circuit 12c-i. The SP circuit that is input with the output of the delay circuit 12c-n and the parallel input information series $B_1$ is defined as the SP circuit in the zeroth column. The j-th SP circuit from the parallel input information series $B_i$ is the SP circuit in the jth column. A last column in which the SP circuit is disposed is defined as the hth column. When hh is a smallest integer equal to or above $\log_2 n$, the last column h becomes an integer that satisfies "$h=2 \times hh-1$".

Figure 16:
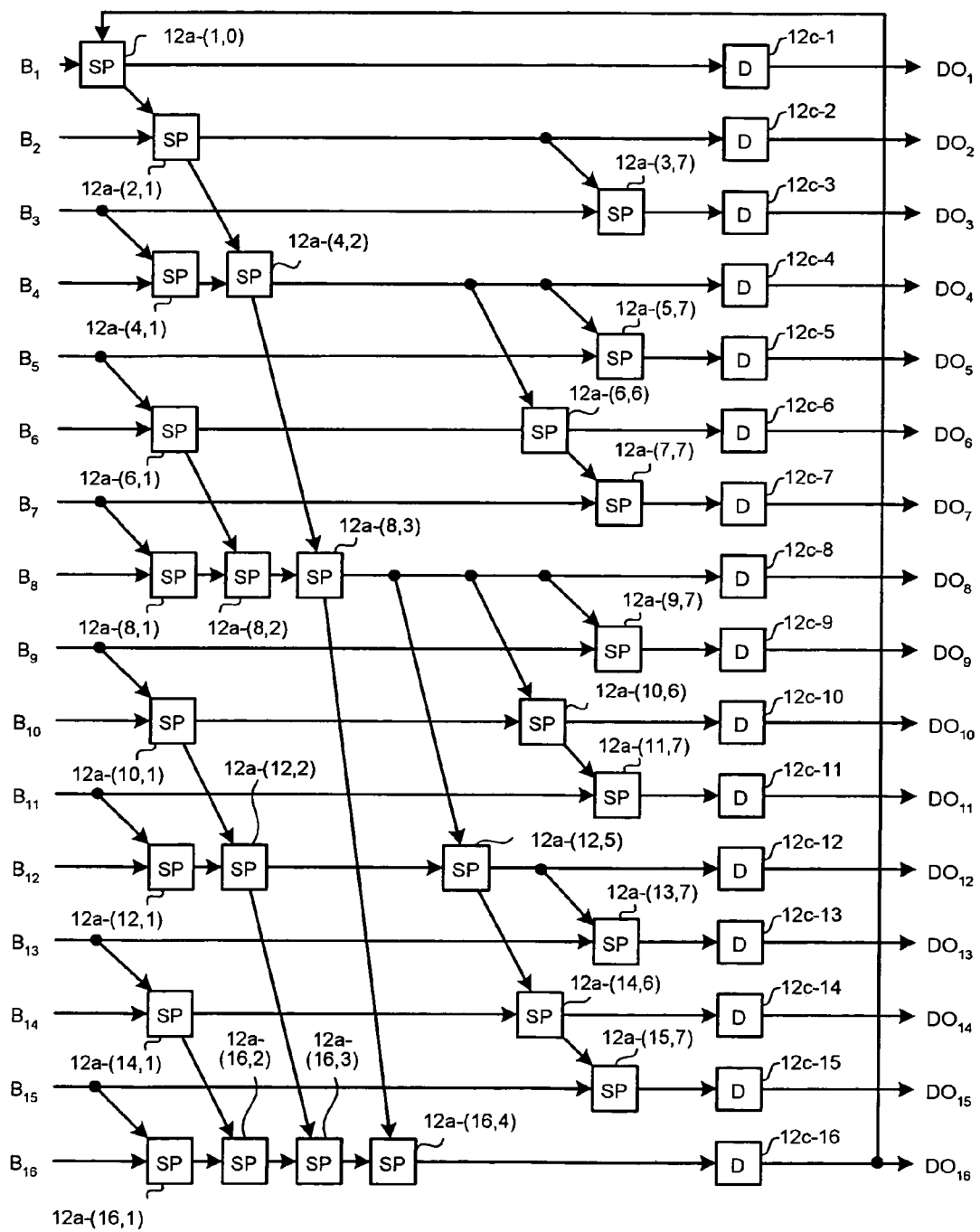
FIG. 16 is a configuration example of a parallel precoder circuit according to a third embodiment of the present invention.

FIG. 16 is a configuration diagram of the parallel precoder circuit according to the third embodiment when "n=16". In FIG. 16, the parallel precoder circuit includes SP circuits 12a (12a-(1,0), 12a-(2,1), 12a-(4,1), 12a-(6,1), 12a-(8,1), 12a-(10,1), 12a-(12,1), 12a-(14,1), 12a-(16,1), 12a-(4,2), 12a-(8,2), 12a-(12,2), 12a-(16,2), 12a-(8,3), 12a-(16,3), 12a-(16,4), 12a-(12,5), 12a-(6,6), 12a-(10,6), 12a-(14,6), 12a-(3,7), 12a-(5,7), 12a-(7,7), 12a-(9,7), 12a-(11,7), 12a-(13,7), and 12a-(15,7)), and delay circuits (D in FIG. 16) 12c (12c-1 to 12c-16).

In FIG. 16, the SP circuit 12a-(1,0) is disposed in the first row and the zeroth column, the SP circuit 12a-(2,1) is disposed in the second row and the first column, the SP circuit 12a-(3,7) is disposed in the third row and the seventh column, the SP circuit 12a-(4,1) is disposed in the fourth row and the first column, the SP circuit 12a-(4,2) is disposed in the fourth row and the second column, the SP circuit 12a-(5,7) is disposed in the fifth row and the seventh column, the SP circuit 12a-(6,1) is disposed in the sixth row and the first column, the SP circuit 12a-(6,6) is disposed in the sixth row and the sixth column, the SP circuit 12a-(7,7) is disposed in the seventh row and the seventh column, the SP circuit 12a-(8,1) is disposed in the eighth row and the first column, the SP circuit 12a-(8,2) is disposed in the eighth row and the second column, the SP circuit 12a-(8,3) is disposed in the eighth row and the third column, the SP circuit 12a-(9,7) is disposed in the ninth row and the seventh column, the SP circuit 12a-(10,1) is disposed in the tenth row and the first column, the SP circuit 12a-(10,6) is disposed in the tenth row and the sixth column, the SP circuit 12a-(11,7) is disposed in the eleventh row and the seventh column, the SP circuit 12a-(12,1) is disposed in the twelfth row and the first column, the SP circuit 12a-(12,2) is disposed in the twelfth row and the second column, the SP circuit 12a-(12,2) is disposed in the twelfth row and the second column, the SP circuit 12a-(12,5) is disposed in the twelfth row and the fifth column, the SP circuit 12a-(13,7) is disposed in the thirteenth row and the seventh column, the SP circuit 12a-(14,1) is disposed in the fourteenth row and the first column, the SP circuit 12a-(14,6) is disposed in the fourteenth row and the sixth column, the SP circuit 12a-(15,7) is disposed in the fifteenth row and the seventh column, the SP circuit 12a-(16,1) is disposed in the sixteenth row and the first column, the SP circuit 12a-(16,2) is disposed in the sixteenth row and the second column, the SP circuit 12a-(16,3) is disposed in the sixteenth row and the third column, and the SP circuit 12a-(16,4) is disposed in the sixteenth row and the fourth column. The seventh column is the last column.

Parallel input information series $B_{2k}$ are connected to one input set and parallel input series $B_{2k-1}$ are connected to the other input set respectively of the SP circuit 12a-(2k,1) in the second row and the first column. However, instead of the parallel input series $B_1$, the output of the SP circuit 12a-(1,0) is connected to the other input set of the SP circuit 12a-(2,1) in the second-row and the first column. In the above, k is an integer that satisfies "$1 \leq k \leq n/2$".

The output set of the SP circuit 12a-(($2m) \times k - 2^{(m-1)}, m-1$) is connected to one input set, and the output set of the SP circuit 12a-(($2^m) \times k, m-1$) is connected to the other input set respectively of the SP circuit 12a-(($2^m) \times k, m$) in the (($2^m) \times k$)-th row and the mth column. However, when no SP circuit is disposed in the (($2^m) \times k - 2^{(m-1)}$)th row and the (m-1)th column, no SP circuit is disposed. For example, in FIG. 16, the output set of the SP circuit 12a-(4,2) is connected to one input set, and the output set of the SP circuit 12a-(8,2) is connected to the other input set respectively of the SP circuit 12a-(8,3) when k=1 and m=3. In the above, m is an integer that satisfies "$2 \leq m \leq hh$". In FIG. 16, hh is "4".

Outputs are connected to the SP circuit in the mth column when m is in the relationship of $hh+1 \leq m \leq 2 \times hh-1$. The output set of the SP circuit in the jth column having a largest column number j among SP circuits disposed in the ($2^{hh}-(2kk-1) \times 2^{(2hh-m-1)}, m)$)-th row is connected to one input set of the SP circuit 12a-($2^{hh}-(2kk-1) \times 2^{(2hh-m-1)}, m$) in the 12a-($2^{hh}-(2kk-1) \times 2^{(2hh-m-1)}, m$))th row and the mth column. The output set of the SP circuit in the jth column having a largest column number j among SP circuits disposed in the ($2^{hh}-(2kk-1) \times 2^{(2hh-m-1)}$))th row is connected to the other input set of the SP circuit 12a-($2^{hh}-(2kk-1) \times 2^{(2hh-m-1)}, m$) in the 12a-($2^{hh}-(2kk-1) \times 2^{(2hh-m-1)}, m$)) th row and the mth column. In the above, kk is an integer that satisfies "$1 \leq kk \leq 2^{(m-hh)}-1$". For example, in FIG. 16, the output set of the SP circuit 12a-(12,5) is connected to one input set, and the output set of the SP circuit 12a-(14,1) is connected to the other input set respectively of the SP circuit 12a-(14,6) when kk=1 and m=6.

The output set of the SP circuit in the jth column having a largest column number j among SP circuits disposed in the ith row is connected to the input set of the delay circuit 12c-i in the ith row. However, the output set of the SP circuit 12a-(1,0) is connected to the input set of the delay circuit 12c-1 in the first row. The output set of the delay circuit 12c-i becomes the parallel output $O_i$.

It is explained next that the parallel precoder circuit according to the third embodiment satisfies Equation (30) and is equivalent to the precoder circuit of the DQPSK system.

First, in FIG. 16, the outputs of the SP circuits disposed in each row up to the hhth column are explained. When the output of the SP circuit $12a\text{-}(1,0)$ in the first row and the zeroth column is $BB_1$ and when the operator of a differential encoding operation is "*", an output SPO $12a\text{-}(2,1)$ of the SP circuit $12a\text{-}(2,1)$ in the second row and the first column can be given by $$SPO12a\text{-}(2,1)=BB_1{}^*B_2 \qquad (38\text{-}1)$$

An output SPO $12a\text{-}(4,1)$ of the SP circuit $12a\text{-}(4,1)$ in the fourth row and the first column can be given by $$SPO12a\text{-}(4,1)=B_3{}^*B_4 \qquad (38\text{-}2)$$

An output SPO $12a\text{-}(6,1)$ of the SP circuit $12a\text{-}(6,1)$ in the sixth row and the first column can be given by $$SPF12a\text{-}(6,1)=B_5{}^*B_6 \qquad (38\text{-}3)$$

An output SPO $12a\text{-}(8,1)$ of the SP circuit $12a\text{-}(8,1)$ in the eighth row and the first column can be given by $$SPO12a\text{-}(8,1)=B_7{}^*B_8 \qquad (38\text{-}4)$$

An output SPO $12a\text{-}(10,1)$ of the SP circuit $12a\text{-}(10,1)$ in the tenth row and the first column can be given by $$SPO12a\text{-}(10,1)=B_9{}^*B_{10} \qquad (38\text{-}5)$$

An output SPO $12a\text{-}(12,1)$ of the SP circuit $12a\text{-}(12,1)$ in the twelfth row and the first column can be given by $$SPO12a\text{-}(12,1)=B_{11}{}^*B_{12} \qquad (38\text{-}6)$$

An output SPO $12a\text{-}(14,1)$ of the SP circuit $12a\text{-}(14,1)$ in the fourteenth row and the first column can be given by $$SPO12a\text{-}(14,1)=B_{13}{}^*B_{14} \qquad (38\text{-}7)$$

An output SPO $12a\text{-}(16,1)$ of the SP circuit $12a\text{-}(16,1)$ in the sixteenth row and the first column can be given by $$SPO12a\text{-}(16,1)=B_{15}{}^*B_{16} \qquad (38\text{-}8)$$

Equation (38-1) to Equation (38-8) is hereinafter also referred to as Equations (38).

An output SPO $12a\text{-}(4,2)$ of the SP circuit $12a\text{-}(4,2)$ in the fourth row and the second column can be given by $$SPO12a\text{-}(4,2)=SPO12a\text{-}(2,1){}^*SPO12a\text{-}(4,1) \qquad (39\text{-}1)$$

An output SPO $12a\text{-}(8,2)$ of the SP circuit $12a\text{-}(8,2)$ in the eighth row and the second column can be given by $$SPO12a\text{-}(8,2)=SPO12a\text{-}(6,1){}^*SPO12a\text{-}(8,1) \qquad (39\text{-}2)$$

An output SPO $12a\text{-}(12,2)$ of the SP circuit $12a\text{-}(12,2)$ in the twelfth row and the second column can be given by $$SPO12a\text{-}(12,2)=SPO12a\text{-}(10,1){}^*SPO12a\text{-}(12,1) \qquad (39\text{-}3)$$

An output SPO $12a\text{-}(16,2)$ of the SP circuit $12a\text{-}(16,2)$ in the sixteenth row and the second column can be given by $$SPO12a\text{-}(16,2)=SPO12a\text{-}(14,1){}^*SPO12a\text{-}(16,1) \qquad (39\text{-}4)$$

Based on Equations (38), Equation (39-1) to Equation (39-4) become $$SPO12a\text{-}(4,2)=(BB_1{}^*B_2){}^*(B_3{}^*B_4) \qquad (40\text{-}1)$$

$$SPO12a\text{-}(8,2)=(B_5{}^*B_6){}^*(B_7{}^*B_8) \qquad (40\text{-}2)$$

$$SPO12a\text{-}(12,2)=(B_9{}^*B_{10}){}^*(B_{11}{}^*B_{12}) \qquad (40\text{-}3)$$

$$SPO12a\text{-}(16,2)=(B_{13}{}^*B_{14}){}^*(B_{15}{}^*B_{16}) \qquad (40\text{-}4)$$

Equation (40-1) to Equation (40-4) is hereinafter also referred to as Equations (40).

An output SPO $12a\text{-}(8,3)$ of the SP circuit $12a\text{-}(8,3)$ in the eighth row and the third column can be given by $$SPO12a\text{-}(8,3)=SPO12a\text{-}(4,2){}^*SPO12a\text{-}(8,2) \qquad (41\text{-}1)$$

An output SPO $12a\text{-}(16,3)$ of the SP circuit $12a\text{-}(16,3)$ in the sixteenth row and the third column can be given by $$SPO12a\text{-}(16,3)=SPO12a\text{-}(12,2){}^*SPO12a\text{-}(16,2) \qquad (41\text{-}2)$$

Based on Equations (40), Equation (41-1) and Equation (41-2) become $$SPO12a\text{-}(8,3)=((BB_1{}^*B_2){}^*(B_3{}^*B_4)){}^*((B_5{}^*B_6){}^*(B_7{}^*B_8)) \qquad (42\text{-}1)$$

$$SPO12a\text{-}(16,3)=((B_9{}^*B_{10}){}^*(B_{11}{}^*B_{12})){}^*((B_{13}{}^*B_{14}){}^*(B_{15}{}^*B_{16})) \qquad (42\text{-}2)$$

Equation (42-1) and Equation (42-2) are hereinafter also referred to as Equations (42).

An output SPO $12a\text{-}(16,4)$ of the SP circuit $12a\text{-}(16,4)$ in the sixteenth row and the fourth column can be expressed as $$SPO12a\text{-}(16,4)=SPO12a\text{-}(8,3){}^*SPO\,12a\text{-}(16,3),$$

and this Equation becomes $$SPO12a\text{-}(16,4)=(((BB_1{}^*B_2){}^*(B_3{}^*B_4)){}^*((B_5{}^*B_6){}^*(B_7{}^*B_8))){}^*(((B_9{}^*B_{10}){}^*(B_{11}{}^*B_{12})){}^*((B_{13}{}^*B_{14}){}^*(B_{15}{}^*B_{16}))) \qquad (43),$$

based on Equations (42).

The outputs of the SP circuits disposed in the hhth column and after are explained next. An output SPO $12a\text{-}(12,5)$ of the SP circuit $12a\text{-}(12,5)$ in the twelfth row and the fifth column can be expressed as SPO $12a\text{-}(12,5)=$SPO $12a\text{-}(8,3){}^*SPO12a\text{-}(12,2)$, and this Equation becomes $$SPO12a\text{-}(12,5)=(((BB_1{}^*B_2){}^*(B_3{}^*B_4)){}^*((B_5{}^*B_6){}^*(B_7{}^*B_8))){}^*((B_9{}^*B_{10}){}^*(B_{11}{}^*B_{12})) \qquad (44)$$

based on Equations (40) and Equations (42).

An output SPO $12a\text{-}(6,6)$ of the SP circuit $12a\text{-}(6,6)$ in the sixth row and the sixth column can be given by $$SPO12a\text{-}(6,6)=SPO12a\text{-}(4,2){}^*SPO12a\text{-}(6,1) \qquad (45\text{-}1)$$

An output SPO $12a\text{-}(16,6)$ of the SP circuit $12a\text{-}(16,6)$ in the sixteenth row and the sixth column can be given by $$SPO12a\text{-}(10,6)=SPO12a\text{-}(8,3){}^*SPO12a\text{-}(10,1) \qquad (45\text{-}2)$$

An output SPO $12a\text{-}(14,6)$ of the SP circuit $12a\text{-}(14,6)$ in the fourteenth row and the sixth column can be given by $$SPO12a\text{-}(14,6)=SPO12a\text{-}(12,5){}^*SPO12a\text{-}(14,1) \qquad (45\text{-}3)$$

Based on Equations (38), Equations (40), and Equations (42), Equation (45-1) to Equation (45-3) become $$SPO12a\text{-}(6,6)=((BB_1{}^*B_2){}^*(B_3{}^*B_4)){}^*(B_5{}^*B_6) \qquad (46\text{-}1)$$

$$SPO12a\text{-}(10,6)=(BB_1{}^*B_2){}^*(B_3{}^*B_4)){}^*((B_5{}^*B_6){}^*(B_7{}^*B_8))){}^*(B_9{}^*B_{10}) \qquad (46\text{-}2)$$

$$SPO12a\text{-}(14,6)=((((BB_1{}^*B_2){}^*(B_3{}^*B_4)){}^*((B_5{}^*B_6){}^*(B_7{}^*B_8))){}^*((B_9{}^*B_{10}){}^*(B_{11}{}^*B_{12}))){}^*(B_{13}{}^*B_{14}) \qquad (46\text{-}3)$$

Equation (46-1) to Equation (46-3) is hereinafter also referred to as Equations (46).

An output SPO 12a-(3,7) of the SP circuit 12a-(3,7) in the third row and the seventh column can be given by $$SPO12a\text{-}(3,7)=SPO12a\text{-}(2,1)*B_3 \tag{47-1}$$

An output SPO 12a-(5,7) of the SP circuit 12a-(5,7) in the fifth row and the seventh column can be given by $$SPO12a\text{-}(5,7)=SPO12a\text{-}(4,2)*B_5 \tag{47-2}$$

An output SPO 12a-(7,7) of the SP circuit 12a-(7,7) in the seventh row and the seventh column can be given by $$SPO12a\text{-}(7,7)=SPO12a\text{-}(6,6)*B_7 \tag{47-3}$$

An output SPO 12a-(9,7) of the SP circuit 12a-(9,7) in the ninth row and the seventh column can be given by $$SPO12a\text{-}(9,7)=SPO12a\text{-}(8,3)*B_9 \tag{47-4}$$

An output SPO 12a-(11,7) of the SP circuit 12a-(11,7) in the eleventh row and the seventh column can be given by $$SPO12a\text{-}(11,7)=SPO12a\text{-}(10,6)*B_{11} \tag{47-5}$$

An output SPO 12a-(13,7) of the SP circuit 12a-(13,7) in the thirteenth row and the seventh column can be given by $$SPO12a\text{-}(13,7)=SPO12a\text{-}(12,5)*B_{13} \tag{47-6}$$

An output SPO 12a-(15,7) of the SP circuit 12a-(15,7) in the fifteenth row and the seventh column can be given by $$SPO12a\text{-}(15,7)=SPO12a\text{-}(14,6)*B_{15} \tag{47-7}$$

Based on Equations (38), Equations (40), Equations (42), Equation (44), and Equations (46), Equation (47-1) to Equation (47-7) become $$SPO12a\text{-}(3,7)=(BB_1*B_2)*B_3 \tag{48-1}$$

$$SPO12a\text{-}(5,7)=((BB_1*B_2)*(B_3*B_4))*B_5 \tag{48-2}$$

$$SPO12a\text{-}(7,7)=(((BB_1*B_2)*(B_3*B_4))*(B_5*B_6))*B_7 \tag{48-3}$$

$$SPO12a\text{-}(9,7)=(((BB_1*B_2)*(B_3*B_4))*((B_5*B_6)*(B_7*B_8)))*B_9 \tag{48-4}$$

$$SPO12a\text{-}(11,7)=((((BB_1*B_2)*(B_3*B_4))*((B_5*B_6)*(B_7*B_8)))*(B_9*B_{10}))*B_{11} \tag{48-5}$$

$$SPO12a\text{-}(13,7)=((((BB_1*B_2)*(B_3*B_4))*((B_5*B_6)*(B_7*B_8))*((B_9*B_{10})*(B_{11}*B_{12})))*B_{13} \tag{48-6}$$

$$SPO12a\text{-}(15,7)=((((BB_1*B_2)*(B_3*B_4))*((B_5*B_6)*(B_7*B_8))*((B_9*B_{10})*(B_{11}*B_{12}))*(B_{13}*B_{14}))*B_{15} \tag{48-7}$$

Equation (48-1) to Equation (48-7) is hereinafter also referred to as Equations (48).

The outputs SPO 12a-(1,0), 12a-(2,1), 12a-(3,7), 12a-(4,2), 12a-(5,7), 12a-(6,6), 12a-(7,7), SPO 12a-(8,3), 12a-(9,7), 12a-(10,6), 12a-(11,7), 12a-(12,5), 12a-(13,7), 12a-(14,6), 12a-(15,7), and 12a-(16,4) of the SP circuits 12a-(1,0), 12a-(2,1), 12a-(3,7), 12a-(4,2), 12a-(5,7), 12a-(6,6), 12a-(7,7), SPO 12a-(8,3), 12a-(9,7), 12a-(10,6), 12a-(11,7), 12a-(12,5), 12a-(13,7), 12a-(14,6), 12a-(15,7), and 12a-(16,4), respectively, are input to the delay circuits 1c-i to 1c-16, respectively, are delayed by one clock, and are output as the parallel output information series $DO_1$ to $DO_{16}$. The output $BB_1$ of the SP circuit 10a-(1,0) is a result of the differential encoding operation of the parallel output information series DDO before the parallel output information series $B_1$ and the parallel output information series $B_1$. The output $BB_1$ can be expressed as $$BB_1=B_1*DDO \tag{49}$$

Therefore, the parallel output information series $DO_1$ of the parallel precoder circuit shown in FIG. 16 can be given by $$DO_1=B_1*DDO \tag{50-1}$$

From Equation (38-1) and Equation (49), the parallel output information series $DO_2$ can be given by $$DO_2=(B_1*DDO)*B_2 \tag{50-2}$$

From Equation (48-1) and Equation (49), the parallel output information series $DO_3$ can be given by $$DO_3=((B_1*DDO)*B_2)*B_3 \tag{50-3}$$

From Equation (48-1) and Equation (49), the parallel output information series $DO_4$ can be given by $$DO_4=((B_1*DDO)*B_2)*(B_3*B_4) \tag{50-4}$$

From Equation (48-1) and Equation (49), the parallel output information series $DO_5$ can be given by $$DO_5=((B_1*DDO)*B_2)*(B_3*B_4))*B_5 \tag{50-5}$$

From Equation (46-1) and Equation (49), the parallel output information series $DO_6$ can be given by $$DO_6=(((B_1*DDO)*B_2)*(B_3*B_4))*((B_5*B_6)*(B_7*B_8)))*(B_9*B_{10}) \tag{50-6}$$

From Equation (48-3) and Equation (49), the parallel output information series $DO_7$ can be given by $$DO_7=(((B_1*DDO)*B_2)*(B_3*B_4))*(B_5*B_6))*B_7 \tag{50-7}$$

From Equation (42-3) and Equation (49), the parallel output information series $DO_8$ can be given by $$DO_8=(((B_1*DDO)*B_2)*(B_3*B_4))*((B_5*B_6)*(B_7*B_8)) \tag{50-8}$$

From Equation (48-4) and Equation (49), the parallel output information series $DO_9$ can be given by $$DO_9=(((B_1*DDO)*B_2)*(B_3*B_4)*((B_5*B_6)*(B_7*B_8)))*B_9 \tag{50-9}$$

From Equation (46-2) and Equation (49), the parallel output information series $DO_{10}$ can be given by $$DO_{10}=((((B_1*DDO)*B_2)*(B_3*B_4))*((B_5*B_6)*(B_7*B_8)))*(B_9*B_{10}) \tag{50-10}$$

From Equation (48-5) and Equation (49), the parallel output information series $DO_{11}$ can be given by $$DO_{11}=(((((B_1*DDO)*B_2)*(B_3*B_4))*((B_5*B_6)*(B_7*B_8)))*(B_9*B_{10}))*B_{11} \tag{50-11}$$

From Equation (44) and Equation (49), the parallel output information series $DO_{12}$ can be given by $$DO_{12}=((((B_1*DDO)*B_2)*B_2)*(B_3*B_4)*((B_5*B_6)*(B_7*B_8)))*((B_9*B_{10})*(B_{11}*B_{12})) \tag{50-12}$$

From Equation (48-6) and Equation (49), the parallel output information series $DO_{13}$ can be given by $$DO_{13}=((((B_1*DDO)*B_2)*(B_3*B_4))*((B_5*B_6)*(B_7*B_8))*((B_9*B_{10})*(B_{11}*B_{12})))*B_{13} \tag{50-13}$$

From Equation (46-3) and Equation (49), the parallel output information series $DO_{14}$ can be given by $$DO_{13}=(((((B_1*DDO)*B_2)*(B_3*B_4))*((B_5*B_6)*(B_7*B_8))*((B_9*B_{10})*(B_{11}*B_{12})))*(B_{13}*B_{14}) \quad (50\text{-}14)$$

From Equation (48-7) and Equation (49), the parallel output information series $DO_{15}$ can be given by $$DO_{15}=(((((B_1*DDO)*B_2)*(B_3*B_4))*((B_5*B_6)*(B_7*B_8))*((B_9*B_{10})*(B_{11}*B_{12})))*(B_{13}*B_{14}))*B_{15} \quad (50\text{-}15)$$

From Equation (43) and Equation (49), the parallel output information series $DO_{16}$ can be given by $$DO_{16}=((((B_1*DDO)*B_2)*(B_3*B_4))*((B_5*B_6)*(B_7*B_8))*(((B_9*B_{10})*(B_{11}*B_{12}))*((B_{13}*B_{14})*(B_{15}*B_{16}))) \quad (50\text{-}16)$$

According to the first embodiment, the associative law is established in the differential encoding operation. Therefore, Equation (50-1) to Equation (50-16) can be given as follows, and these Equations satisfy Equation (30).

$$DO_1=B_1*DDO$$

$$DO_2=B_2*(B_1*DDO)$$

$$DO_3=B_3*(B_2*(B_1*DDO))$$

$$DO_4=B_4*(B_3*(B_2*(B_1*DDO)))$$

$$DO_5=B_5*(B_4*(B_3*(B_2*(B_1*DDO))))$$

$$DO_6=B_6*(B_5*(B_4*(B_3*(B_2*(B_1*DDO)))))$$

$$DO_7=B_7*(B_6*(B_5*(B_4*(B_3*(B_2*(B_1*DDO))))))$$

$$DO_8=B_8*(B_7*(B_6*(B_5*(B_4*(B_3*(B_2*(B_1*DDO)))))))$$

$$DO_9=B_9*(B_8*(B_7*(B_6*(B_5*(B_4*(B_3*(B_2*(B_1*DDO))))))))$$

$$DO_{10}=B_{10}*(B_9*(B_8*(B_7*(B_6*(B_5*(B_4*(B_3*(B_2*(B_1*DDO)))))))))$$

$$B_{11}*(B_{10}*(B_9*(B_8*(B_7*(B_6*(B_5*(B_4*(B_3*(B_2*(B_1*DDO))))))))))$$

$$DO_{12}=B_{12}*$$
$$(B_{11}*(B_{10}*(B_9*(B_8*(B_7*(B_6*(B_5*(B_4*(B_3*(B_2*(B_1*DDO)))))))))))$$

$$DO_{13}=B_{13}*(B_{12}*(B_{11}*(B_{10}*(B_9*(B_8*(B_7*(B_6*(B_5*(B_4*(B_3*(B_2*(B_1*DDO))))))))))))$$

$$DO_{14}=B_{14}*(B_{13}*(B_{12}*(B_{11}*(B_{10}*(B_9*(B_8*(B_7*(B_6*(B_5*(B_4*(B_3*(B_2*(B_1*DDO)))))))))))))$$

$$DO_{15}=B_{15}*(B_{14}*(B_{13}*(B_{12}*(B_{11}*(B_{10}*(B_9*(B_8*(B_7*(B_6*(B_5*(B_4*(B_3*(B_2*(B_1*DDO))))))))))))))$$

$$DO_{16}=B_{16}*(B_{15}*(B_{14}*(B_{13}*(B_{12}*(B_{11}*(B_{10}*(B_9*(B_8*(B_7*(B_6*(B_5*(B_4*(B_3*(B_2*(B_1*DDO)))))))))))))))$$

In other words, the parallel precoder circuit according to the third embodiment of the present invention is equivalent to the serial precoder circuit.

As explained above, according to the third embodiment, the differential encoding operation circuit in the zeroth column performs differential encoding operations by using the output set of the delay circuit in the nth row as one input set, and using the parallel input information series in the first row as the other input. The differential encoding operation circuit in the (2k)th row ($1 \leq k \leq n/2$, where k is an integer) row and the first column performs differential encoding operations by using the parallel input information series in the (2k)th row as one input set, and using the output set of the differential encoding operation circuit in the zeroth column as the other input set when the value of k is 1, or using the parallel signal in the (2k−1)th row as the other input set when the value of k is larger than 1. The differential encoding operation circuit in the (($2^m$)×k)th row and the mth column performs differential encoding operations by using as input sets the output set of the differential encoding operation circuit in the (($2^m$)×k−$2^{(m-1)}$)th row ($2 \leq m \leq hh$, where m is an integer, and hh is a smallest integer equal to or larger than $\log_2 n$ that satisfies a last column h=2×hh−1) and the (m−1)th column, and the output set of the differential encoding operation circuit in the (($2^m$)×k−$2^{(m-1)}$)th row and the (m−1)th column, when ($2^m$)×k−$2^{(m-1)}$ is equal to or larger than 1 and also when ($2^m$)×k is equal to or smaller than n. When the value of m is equal to or larger than hh and equal to or smaller than 2×hh−1, the differential encoding operation circuit in the (($2^{hh}$−(2kk−1)×$2^{(2hh-m-1)}$)th row and the mth column performs differential encoding operations by using as input sets the output set of the differential encoding operation circuit having a largest column number among differential encoding operation circuits disposed in the ($2^{hh}$−(2kk−1)×$2^{(2hh-m-1)}$)th row ($1 \leq kk$, where kk is an integer), and the output set of the differential encoding operation circuit having a largest column number among differential encoding operation circuits disposed in the ($2^{hh}$−2kk×$2^{(2hh-m-1)}$)th row. The delay circuits in the first to the nth rows delay the output of the differential encoding operation circuit having a largest column number among differential encoding operation circuits disposed in the first to the nth rows respectively, and use the delayed results as the parallel output information series in the first to the nth rows.

In other words, the parallel precoder circuit according to the third embodiment performs differential encoding operations by dividing data into plural groups, and obtains a result by further performing differential encoding operations at separated stages. Therefore, a parallel precoder having a small circuit delay can be obtained. Specifically, in the third embodiment, a maximum delay can be decreased to 2×(log2n)−1 stages when a delay is at one stage of the SP circuit. Furthermore, a circuit scale can be decreased to within n×($\log_2 n$).

A parallel precoder circuit according to a fourth embodiment of the present invention is explained below with reference to FIG. 17. In the above first to the third embodiments, delay circuits are disposed before the parallel output information series that the parallel precoder circuit calculates. The parallel precoder circuit according to the fourth embodiment continuously deletes the oldest data in time series during a serial transmission, in the delay circuits other than the nth row delay circuit that is performing a feedback from the parallel output information series to the pre-stage SP circuit.

Figure 17:
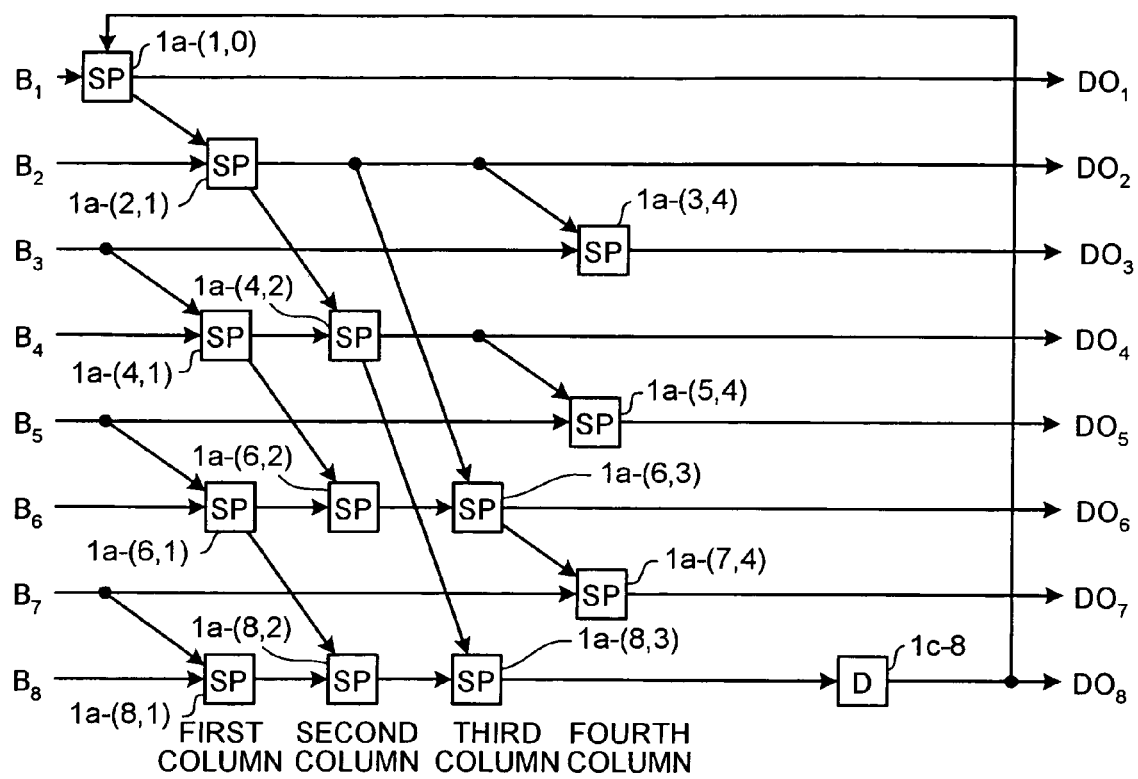
FIG. 17 is a configuration example of a parallel precoder circuit according to a fourth embodiment of the present invention.

FIG. 17 is a configuration diagram of the parallel precoder circuit according to the fourth embodiment. The parallel precoder circuit shown in FIG. 17 has deleted the 7-bit continuous delay circuits 1c-1 to 1c-7, starting from the delay circuit 1c-1 that outputs the oldest data in time series during a serial transmission connected to the parallel output information series $DO_1$, from the parallel precoder circuit according to the first embodiment shown in FIG. 1. Constituent elements having like functions as those of the precoder circuit according to the first embodiment shown in FIG. 1 are designated with like reference numerals, and redundant explanations are omitted.

In the parallel precoder circuits according to the first to the third embodiments, data that are output from the feedback-applied delay circuits are the latest data in the parallel output information series, that is, the data transmitted last in the serial transmission after the multiplexing. An output from other delay circuit corresponds to the n−1 set before the data. The operation clock within the parallel precoder circuit based on the n-set inputs is n/F [Hz]. When the delay circuits are excluded, data at the pre-stage of one-clock delay circuit becomes data new by n bits.

In FIG. 17, when the delay circuits 1c-1 to 1c-7 shown in FIG. 1 are excluded, the parallel output information series $DO_1$ to $DO_7$ become 2-bit seven-set data that follow the data output from the delay circuit 1c-8 during the serial transmission. Therefore, in the multiplexing circuits disposed at the post-stage of the parallel precoder circuit, the parallel output concessive data $DO_8$ from the delay circuit 1c-8 of the parallel precoder circuit is transmitted first during the serial transmission. The parallel output information series $DO_1$, the parallel output information series $DO_2$, . . . , and the parallel output information series $DO_7$ are then output sequentially. Based on the above arrangement, data is transmitted faster by n−1 clocks in one-clock unit time at the transmission speed F [Hz], as compared with the data when the parallel precoder circuit shown in FIG. 1 is used.

As explained above, in the parallel precoder circuit according to the fourth embodiment, the differential encoding operation circuit in the zeroth column performs differential encoding operations by using the output set of the delay circuit in the nth row as one input set, and using the parallel input information series in the first row as the other input set. The differential encoding operation circuit in the (2k)th ($1 \leq k \leq n/2$, where k is an integer) row and the first column performs differential encoding operations by using the parallel input information series in the kth row as one input set, and using the output set of the differential encoding operation circuit in the zeroth column as the other input set when the value of k is 1, or using the parallel information series in the (2k−1)th row as the other input set when the value of k is larger than 1. The differential encoding operation circuit in the (2k)th row and the m-th ($2 \leq m \leq h-1$, where m is an integer, and h is a smallest integer equal to or larger than ($\log_2 n$)+1) column performs differential encoding operations by using the output set of the differential encoding operation circuit in the (2k)th row and the (m−1)th column as one input set when 2k−2^(m−1) is equal to or larger than 1, and using the output set of the differential encoding operation circuit in the (2k−2^(m−1))th row and the(m−1)th column as the other input set when an differential encoding operation circuit is disposed in the (2k−2^(m−1))th row and the(m−1)th column. When no differential encoding operation circuit is disposed in the (2k−2^(m−1))th row and the (m−1)th column, the differential encoding operation circuit in the (2k)th row and the mth column performs differential encoding operations by using the output set of the differential encoding operation circuit having a largest column number among differential encoding operation circuits disposed in the (2k−2^(m−1))th row as the other input set. The differential encoding operation circuit in the (2k−1)th row and the hth column performs differential encoding operations by using parallel input information series in the (2k−1)th row as one input set, and using the output set of the differential encoding operation circuit having a largest column number among differential encoding operation circuits disposed in the (2k−2)th row as the other input set. The delay circuit in the nth row delays the output of the differential encoding operation circuit having a largest column number among differential encoding operation circuits disposed in the nth row. The delay circuit in the nth row produces the output set of the differential encoding operation circuit having a largest column number among differential encoding operation circuits disposed in the first to the (n−1)th rows respectively as the parallel output information series in the first to the (n−1)th rows respectively, and produces the output set of the nth row delay circuit as the nth row parallel output information series.

In other words, the parallel precoder circuit according to the fourth embodiment performs EXOR operations by dividing data into plural groups, and obtains a result by further performing EXOR operations at separated stages. At the same time, the parallel precoder circuit delays only the parallel output in the nth row that is fed back to an EXOR circuit in the first row and the zeroth column. Therefore, a parallel precoder having a small circuit delay and a small circuit scale can be obtained.

Specifically, the n−1 delay circuits are decreased from the precoder circuit according to the first embodiment. A large circuit scale can be decreased when the number of bits of parallel input and out increases.

According to the fourth embodiment, an example of decreasing the delay circuits 1c-1 to 1c-7 from the parallel precoder circuit in the first embodiment is explained. It is needless to mention that a similar effect is also obtained by decreasing the delay circuits disposed in the first to the (n−1)th bits from the precoder circuits in the second and the third embodiments. While in the fourth embodiment, the delay circuit is disposed in only the nth bit, a similar effect can be also obtained by disposing delay circuits in the continuous sets of the ith ($1 \leq i \leq n-1$) to nth sets.

A parallel precoder circuit according to a fifth embodiment of the present invention is explained below with reference to FIG. 18 and FIG. 19. In the first to the fourth embodiments, the parallel precoder circuit feedbacks the output of the delay circuit that holds the latest data among parallel output information series one clock before, and performs differential encoding operations using the feedback data and the oldest parallel input information series among the parallel input information series. The parallel precoder circuit according to the fifth embodiment forms a feedback loop by performing differential encoding operations using all parallel input information series and the outputs of the delay circuits.

Figure 18:
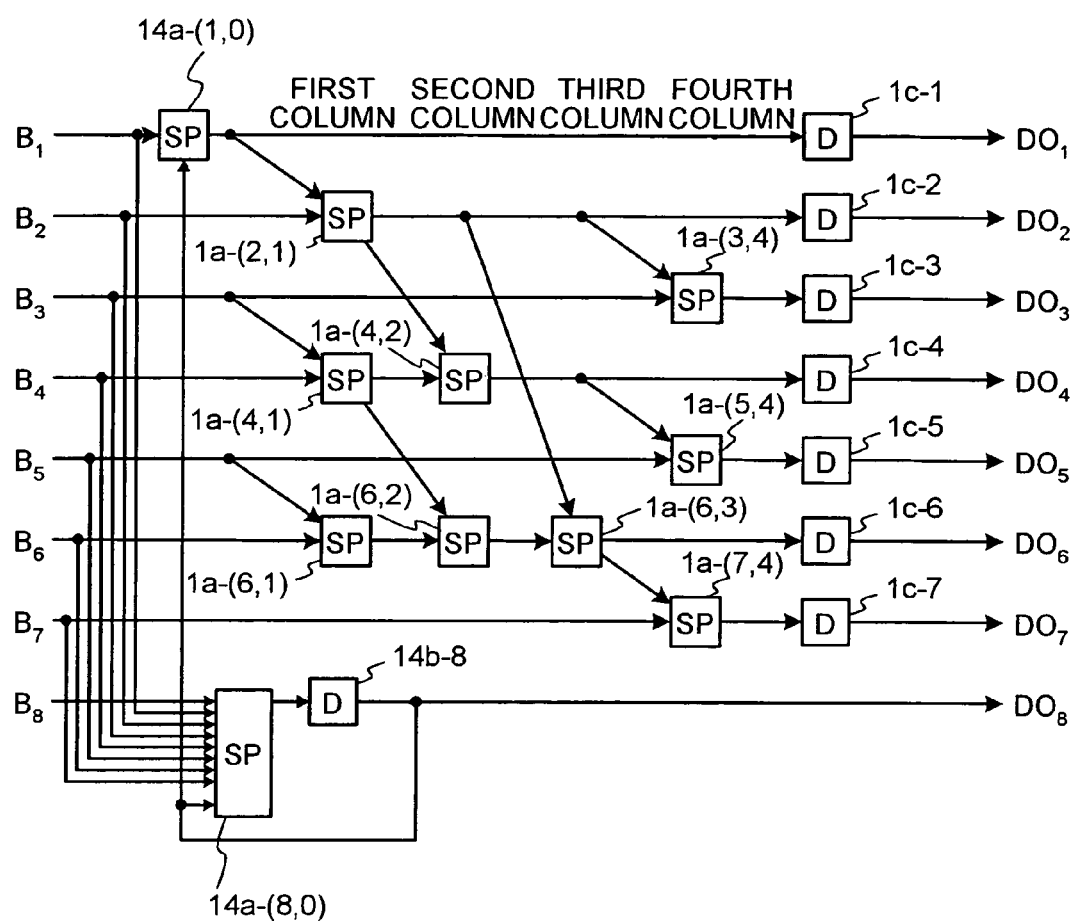
FIG. 18 is a configuration example of a parallel precoder circuit according to a fifth embodiment of the present invention.

FIG. 18 is a configuration diagram of the parallel precoder circuit according to the fifth embodiment when "n=8". The parallel precoder circuit shown in FIG. 18 includes (n+1)-input set SP circuits 14a-(8,0) and a delay circuit 14c-8, instead of the SP circuits 1a-(8,1), 1a-(8,2), and 1a-(8,3) and the delay circuit 1c-8 of the parallel precoder circuit shown in FIG. 1. In other words, the parallel precoder circuit according to the fifth embodiment is different from the parallel precoder circuit according to the first embodiment in only the configuration of the SP circuit disposed in the eighth set (eighth row). Constituent elements having like functions as those of the precoder circuit according to the first embodiment shown in FIG. 1 are designated with like reference numerals, and redundant explanations are omitted.

The SP circuits in the first row to the (n−1)th row and the delay circuits are connected to each other in a similar manner to that according to the first embodiment. The parallel input information series $B_1$ to $B_8$ and the output set of the delay circuit 14c-8 are connected to the n+1 input set SP circuit in the nth row, that is, the input set of the nine-input set SP circuit 14a-(8,0) in FIG. 18. The output set of the delay circuit 14c-8 is the parallel output information series $DO_8$. The output set of the SP circuit 14a-(8,0) is connected to the input set of the delay circuit 14c-8. The parallel input information series $B_1$ is connected to one input set of the SP circuit 14a-(1,0) in the first row and the zeroth column, and the output set of the delay circuit 14c-8 is connected to the other input set of the SP circuit 14a-(1,0).

Figure 19:
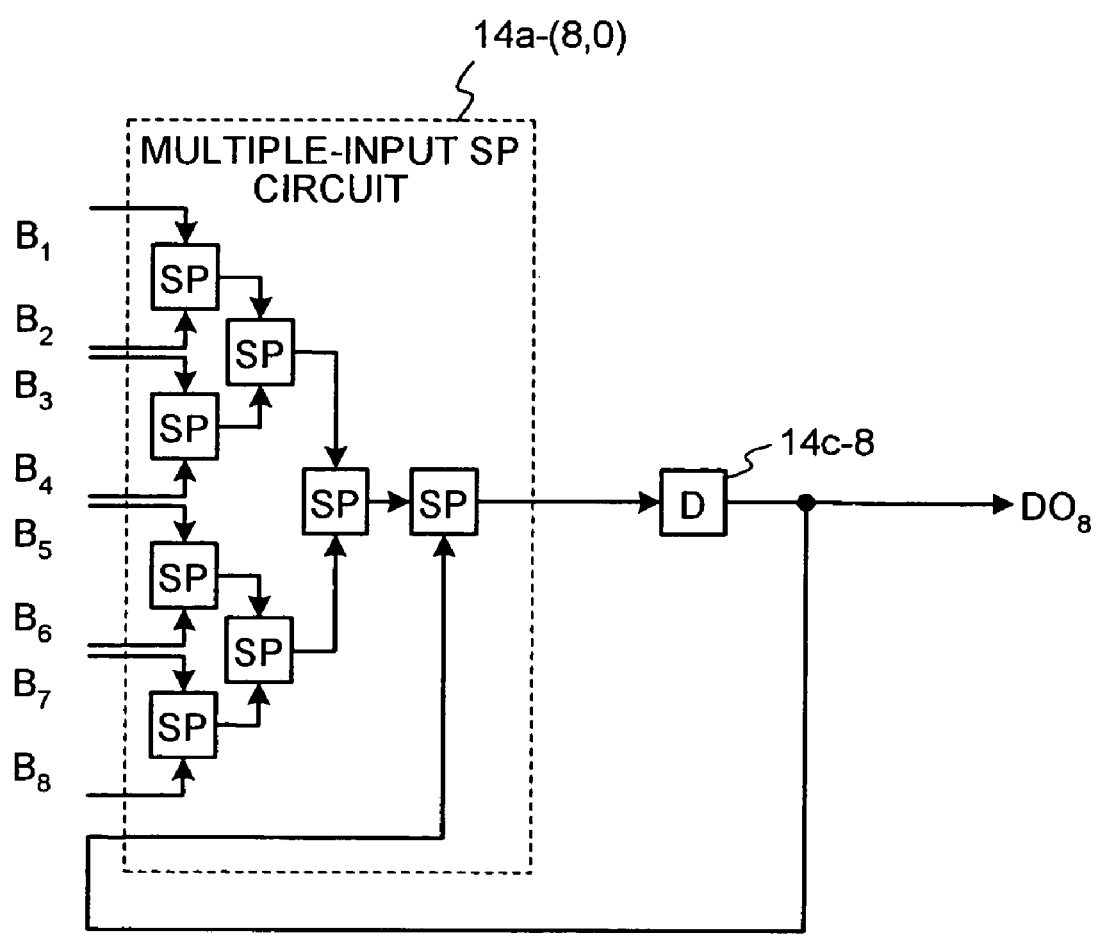
FIG. 19 is a configuration diagram of a multiple-input differential encoding operation circuit and a delay circuit shown in FIG. 18.

FIG. 19 is a configuration diagram of the SP circuit 14a-(8,0) and the delay circuit 14c-8 shown in FIG. 18. The multiple-input set (nine-input set, in this case) SP circuit 14a-(8,0) performs differential encoding operations of the parallel input information series $B_1$ to $B_8$ by combining two-input set SP circuits, as shown in FIG. 19.

In FIG. 19, the n+1 (nine, in this case) input set SP circuit 14a-(8,0) differentially encodes the output set obtained by inputting the parallel input information series $B_1$ to $B_8$ to the two-input set SP circuit structured in a tree shape, and the output set of the delay circuit 14c-8. In this case, the parallel output information series $DO_8$ satisfies the parallel output information series $O_n$ shown in Equation (30).

The parallel precoder circuits according to the first to the fourth embodiments perform differential encoding operations by dividing data into plural groups, and obtain a result by further performing differential encoding operations at separated stages. All the SP circuits use the outputs of the SP circuits that are in rows of later row numbers than the rows in which the own SP circuits are disposed. The output of the delay circuit in the nth row is fed back, and is input to the SP circuit in the first row and the zeroth column. However, the output set of the SP circuit disposed in the nth row is not directly used to generate other parallel output information series $DO_1$ to $DO_{n-1}$. Therefore, when the parallel output information series $DO_n$ is generated as described above, the parallel output information series $DO_1$ to $DO_{n-1}$ can satisfy the parallel output information series $DO_1$ to $DO_{n-1}$ in the logical Equations of the parallel precoder circuit shown in Equation (30) by using the same configurations as those in the first to the fourth embodiments.

As explained above, according to the fifth embodiment, the parallel precoder circuit includes (n+1)-input set SP circuits that perform differential encoding operations of all parallel input information series in the n-th set and the parallel output information series in the n-th set. The output set of this SP circuit is delayed by one clock, and this delayed output is connected to the SP circuit in the first set. Therefore, a parallel precoder circuit having a small circuit delay can be obtained.

A feedback route in which data is output from the n-th set delay circuit and the same data is input again to the delay circuit is separated, thereby decreasing the number of SP circuits on the feedback route. With this arrangement, the required operation speed of the SP circuits can be decreased.

A parallel precoder circuit according to a sixth embodiment of the present invention is explained below with reference to FIG. 20. In the fifth embodiment, a feedback route is separated using multiple-input SP circuits, thereby decreasing the required operation speed of the SP circuits. In the sixth embodiment, the required operation speed of the SP circuits is decreased using a pipeline method.

Pipeline delay circuits (for example, flip-flops) are inserted into the parallel precoder circuit according to the fifth embodiment shown in FIG. 18 as follows. In this case, flip-flops of the same number of stages as that of the flip-flops inserted in the net configuration part of the SP circuits are inserted into the post-stage of the delay circuit 14c-8. At the same time, flip-flops of the same number as that of the flip-flops inserted in the nine-input set SP circuit 14a-(8,0) are inserted into the route after the parallel input information series $B_1$ to $B_{n-1}$ are branched to the input set of the nine-input set SP circuit 14a-(8,0), and are connected to the post-stage of the remaining parallel input information series $B_1$ to $B_{n-1}$.

Figure 20:
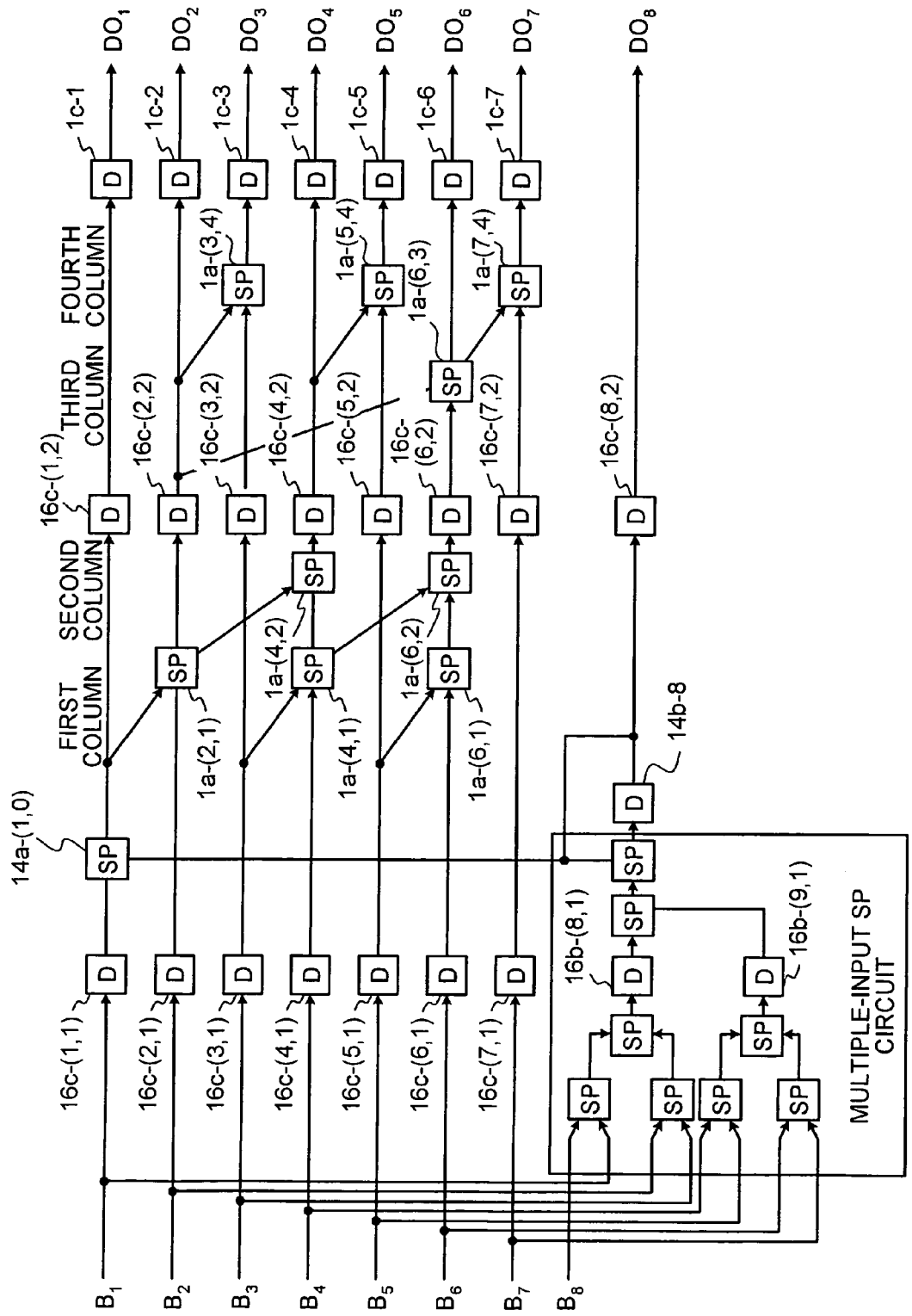
FIG. 20 is a configuration example of a parallel precoder circuit according to a sixth embodiment of the present invention.

FIG. 20 is a configuration diagram of the parallel precoder circuit according to the sixth embodiment when n=8. The parallel precoder circuit shown in FIG. 20 has the following pipeline delay circuits 16c (D in FIG. 20) added to the parallel precoder circuit according to the fifth embodiment shown in FIG. 18, i.e., 16c-(1,1), 16c-(2,1), 16c-(3,1), 16c-(4,1), 16c-(5,1), 16c-(6,1), 16c-(7,1), 16c-(1,2), 16c-(2,2), 16c-(3,2), 16c-(4,2), 16c-(5,2), 16c-(6,2), 16c-(7,2), and 16c-(8,2). Furthermore, the parallel precoder circuit shown in FIG. 20 has a nine-input set SP circuit 16a-(8,0), in place of the multiple-input (nine, in this case) SP circuit 14a-(8,0).

In FIG. 20, first-stage pipeline delay circuits (D in FIG. 20) 16c-(8,1) and 16c-(9,1) consisting of flip-flops or the like are inserted into between a second-stage SP circuit and a third-stage SP circuit from the parallel input information series $B_1$ to $B_8$ side, within the nine-input set SP circuit 16a-(8,0). After the parallel input information series $B_1$ to $B_7$ are branched to the input of the SP circuit 16a-(8,0), the first-stage delay circuits 16c-(1,1), 16c-(2,1), 16c-(3,1), 16c-(4,1), 16c-(5,1), 16c-(6,1), and 16c-(7,1) are inserted.

The first-stage pipeline delay circuits 16c-(1,2), 16c-(2,2), 16c-(3,2), 16c-(4,2), 16c-(5,2), 16c-(6,2), and 16c-(7,2) are inserted into between the first to the (n−1)th sets, that is, between the second column and the third column in the first to the seventh rows. At the same time, the delay circuit 16c-(8,2) is inserted into the post-stage of the eighth set or the eighth-row delay circuit 14c-8.

With the above arrangement, delay circuits of an equal number of stages are inserted into all signal routes. Therefore, delays added to the parallel output information series $DO_1$ to $DO_n$ respectively within the parallel precoder circuit become equal. A maximum delay route can be separated without changing a mutual relationship between the parallel output information series $DO_1$ to $DO_n$. In FIG. 20, SP circuits on the maximum delay route can be decreased from four stages to two stages, by inserting the pipeline delay circuits. In this way, the number of stages of the SP circuits that should operate in one clock can be decreased. Consequently, the required operation speed of the SP circuits can be decreased.

As explained above, according to the sixth embodiment, pipeline delay circuits are inserted at each number of stages of the SP circuits that are directly connected so as to be able to operate at the operation speed F/n [Hz] of the circuits. Therefore, the maximum delay route of the SP circuits at the net configuration part can be decreased from n stages to $\log_2 n$ stages. The number of flip-flops that are inserted into the pipeline also becomes $(\log_2 n)/n$, thereby making the circuit scale small.

A circuit configuration of a system using the SP circuit 21-1 according to a seventh embodiment of the present invention is explained with reference to FIG. 21. In the above first to the sixth embodiments, a parallel precoder circuit applied to a quadrature modulation encoder that modulates the in-phase component (I system) and the quadrature component (Q system) based on 2-bit information series is explained. On the other hand, the parallel precoder circuit according to the seventh embodiment is applied to the encoder that executes a n-phase shift (H system) and a n/2 phase shift (Q system) based on the 2-bit information series.

Figure 21:
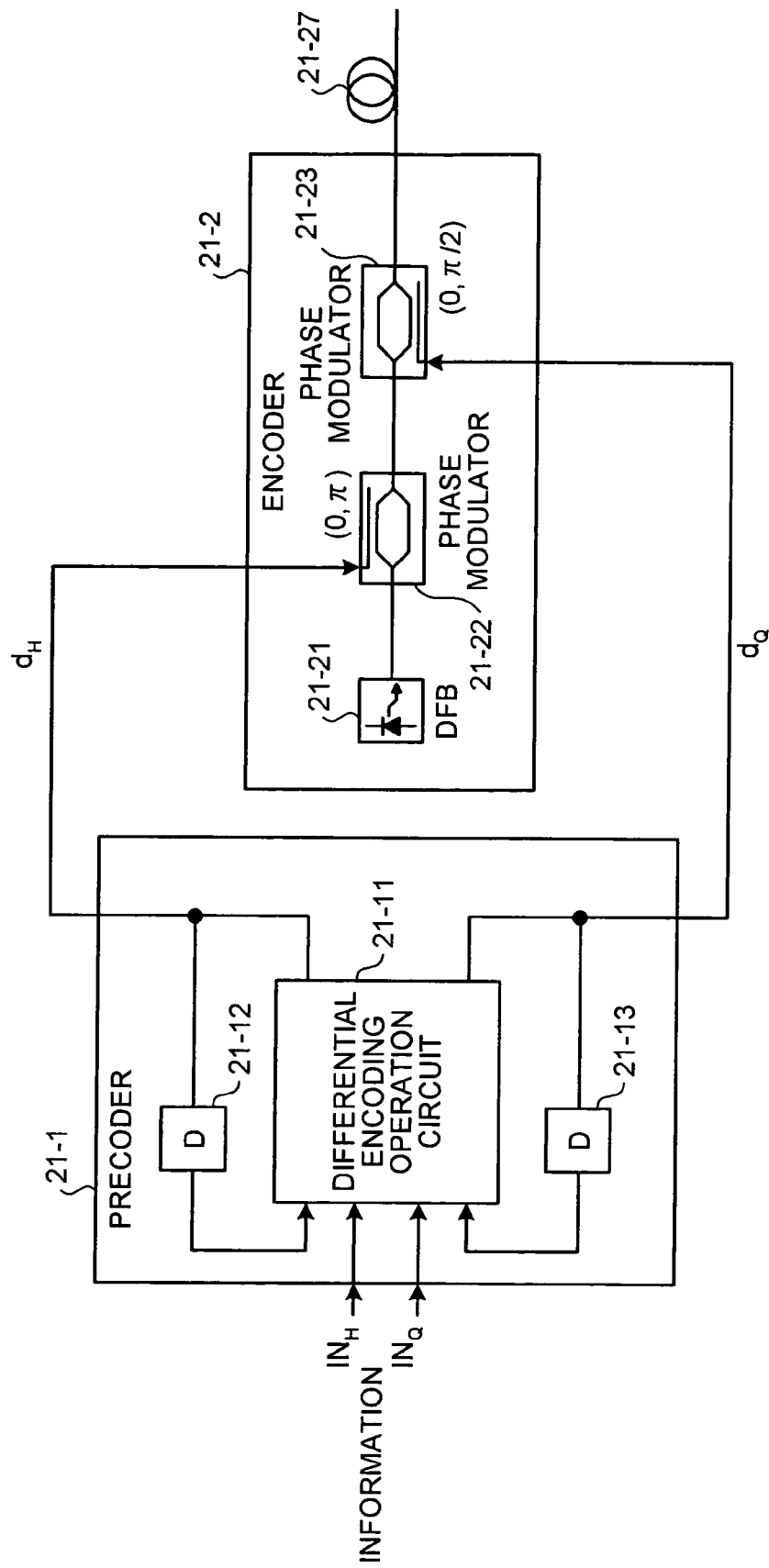
FIG. 21 is a block diagram of a configuration of a circuit of a DQPSK transmission system according to one system that is used in the optical communication system.

FIG. 21 is a block diagram of a configuration of a circuit of a DQPSK transmission system according to one system that is used in the optical communication system. In FIG. 21, the circuit of the DQPSK transmission-system according to one system includes a precoder 21-1 and an encoder 21-2.

The encoder 21-2 includes a distribution feedback (DFB) laser 21-21 and phase modulators 2-22 and 2-23. Light emitted by the DFB laser 21-21 is input to the phase modulators 21-23 and 21-24, and are modulated based on the output of the precoder 21-1, that is, outputs $d_H$ and $d_Q$ of the SP circuit 21-11. The phase modulator 21-22 either zero shifts the light, that is, applies no modulation to the light, or shifts the light by n. The phase modulator 21-23 either zero shifts the light, that is, applies no modulation to the light, or shifts the light by $(½)\pi$. The light is output to a transmission path 21-27.

Figure 22:
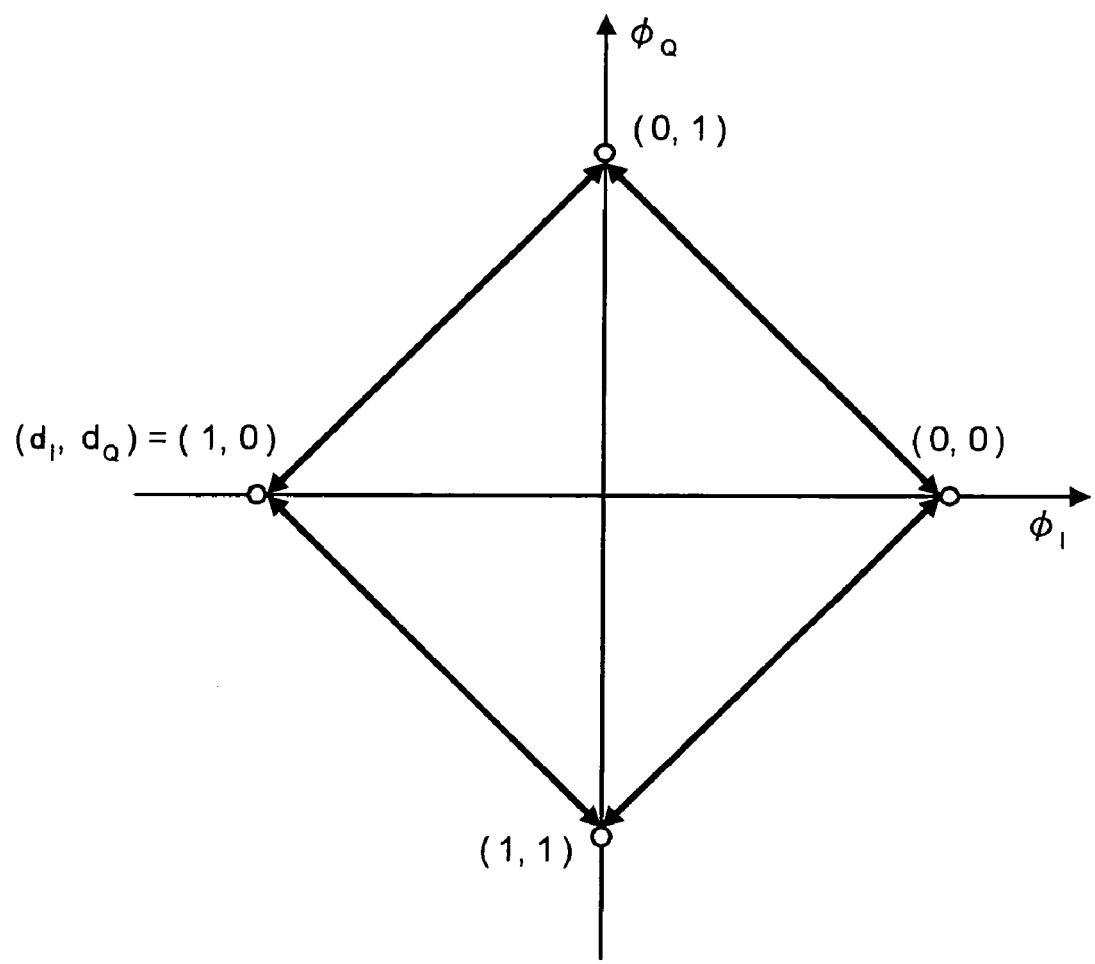
FIG. 22 is a signal space diagram based on $(0, \pi)$ and $(0, \pi/2)$ modulations.

When the effects of the phase shifting by the phase modulators 21-22 and 21-23 are combined together, a signal phase shifted by $(½)\pi$ can be obtained, like the signal space diagram shown in FIG. 7 that is given by the encoder 22 shown in FIG. 2. FIG. 22 is a signal space diagram according to the encoder 21-2 that modules the signal by $(0, \pi)$ and $(0, \pi/2)$.

In FIG. 21, the precoder 21-1 is input with input information series ($IN_H$, $IN_Q$), and outputs output information series ($d_H$, $d_Q$). While logical Equations of a differential encoding operation are derived from Equation (17) like in the first embodiment, the logical Equations are different depending on the information series and phases allocated to four signal points (0,0), (0,1), (1,0), and (1,1) in the signal space diagram shown in FIG. 22.

FIG. 23 is an example of input and output relationships of the differential encoding operation based on a phase difference. In FIG. 22, a phase 0 is allocated to the signal point (0,0), a phase $(½)\pi$ is allocated to the signal point (0,1), a phase n is allocated to the signal point (1,0), and a phase $(3/2)\pi$ is allocated to the signal point (1,1), in the signal space diagram shown in FIG. 22.

In FIG. 23, when the transmission phase information $\Phi_{n-1}$ one T before is "0" and also when the information source $\theta_n$ is "0", the transmission phase information $\Phi_n$ becomes "0". When the information source $\theta_n$ is "$(½)\pi$", the transmission phase information $\Phi_n$ becomes "$(½)\pi$". When the information source $\theta_n$ is "$\pi$", the transmission phase information $\Phi_n$ becomes "$\pi$". When the information source $\theta_n$ is "$(3/2)\pi$", the transmission phase information $\Phi_n$ becomes "$(3/2)\pi$".

When the transmission phase information $\Phi_{n-1}$ one T before is "$(½)\pi$" and also when the information source $\theta_n$ is "0", the transmission phase information $\Phi_n$ becomes "$(½)$". When the information source $\theta_n$ is "$(½)\pi$", the transmission phase information $\Phi_n$ becomes "$\pi$". When the information source $\theta_n$ is "$\pi$", the transmission phase information $\Phi_n$ becomes "$(3/2)\pi$". When the information source $\theta_n$ is "$(3/2)\pi$", the transmission phase information $\Phi_n$ becomes "0".

When the transmission phase information $\Phi_{n-1}$ one T before is "$\pi$" and also when the information source $\theta_n$ is "0", the transmission phase information $\Phi_n$ becomes "$\pi$". When the information source $\theta_n$ is "$(½)\pi$", the transmission phase information $\Phi_n$ becomes "$(3/2)\pi$". When the information source $\theta_n$ is "$\pi$", the transmission phase information $\Phi_n$ becomes "0". When the information source $\theta_n$ is "$(3/2)\pi$", the transmission phase information $\Phi_n$ becomes "$(½)\pi$".

When the transmission phase information $\Phi_{n-1}$ one T before is "$(3/2)\pi$" and also when the information source $\theta_n$ is "0", the transmission phase information $\Phi_n$ becomes "$(3/2)\pi$". When the information source $\theta_n$ is "$(½)\pi$", the transmission phase information $\Phi_n$ becomes "0". When the information source $\theta_n$ is "$\pi$", the transmission phase information $\Phi_n$ becomes "$(½)\pi$". When the information source $\theta_n$ is "$(3/2)\pi$", the transmission phase information $\Phi_n$ becomes "$\pi$".

FIG. 24 depicts binary data of the phases shown in FIG. 23, that is, information series of the phases. In FIG. 24, (0,0) is allocated to 0 of the transmission phase information $\Phi_n$ and $\Phi_{n-1}$; (0,1) is allocated to $(½)$ of the transmission phase information $\Phi_n$ and $\Phi_{n-1}$; (1,0) is allocated to $\pi$ of the transmission phase information $\Phi_n$ and $\Phi_{n-1}$; (1,1) is allocated to $(3/2)\pi$ of the transmission phase information $\Phi_n$ and $\Phi_{n-1}$; (0,0) is allocated to (0) of the information source $\theta_n$; (0,1) is allocated to $(½)\pi$ of the information source $\theta_n$; (1,0) is allocated to n of the information source $\theta_n$; and (1,1) is allocated to $(3/2)\pi$ of the information source $\theta_n$. The transmission phase information $\Phi_n$ corresponds to the information series DO ($d_H$, $d_Q$). The transmission phase information $\Phi_{n-1}$ corresponds to the information series DO $(d_H, d_Q)_{n-1}$. The information source $\theta_n$ corresponds to the information series B ($b_H$, $b_Q$).

The associative law is also established in the logical Equation of differential encoding that satisfies the input and output relationships shown in FIG. 24. Therefore, a parallel precoder circuit having effect similar to that of the parallel precoder circuit applied to the quadrature modulation encoder explained in the first to the sixth embodiments can be obtained.

A parallel precoder circuit according to a fifth embodiment of the present invention is explained with reference to the parallel precoder circuit 41 shown in FIG. 25. In the above first to the sixth embodiments, a parallel precoder circuit applied to a quadrature modulation encoder that modulates the in-phase component (I system) and the quadrature component (Q system) based on 2-bit information series is explained. In the seventh embodiment, a parallel precoder circuit that is applied to (0,7) and (0, $\pi/2$) modulation encoders is explained. On the other hand, according to an eighth embodiment, 2-bit conversion circuits 25-11 to 25-1n are added to the parallel precoder circuit that is applied to the quadrature modulation encoder. With this arrangement, the parallel precoder circuit is applied to (0, $\pi$) and (0, $\pi/2$) modulation encoders.

Figure 25:
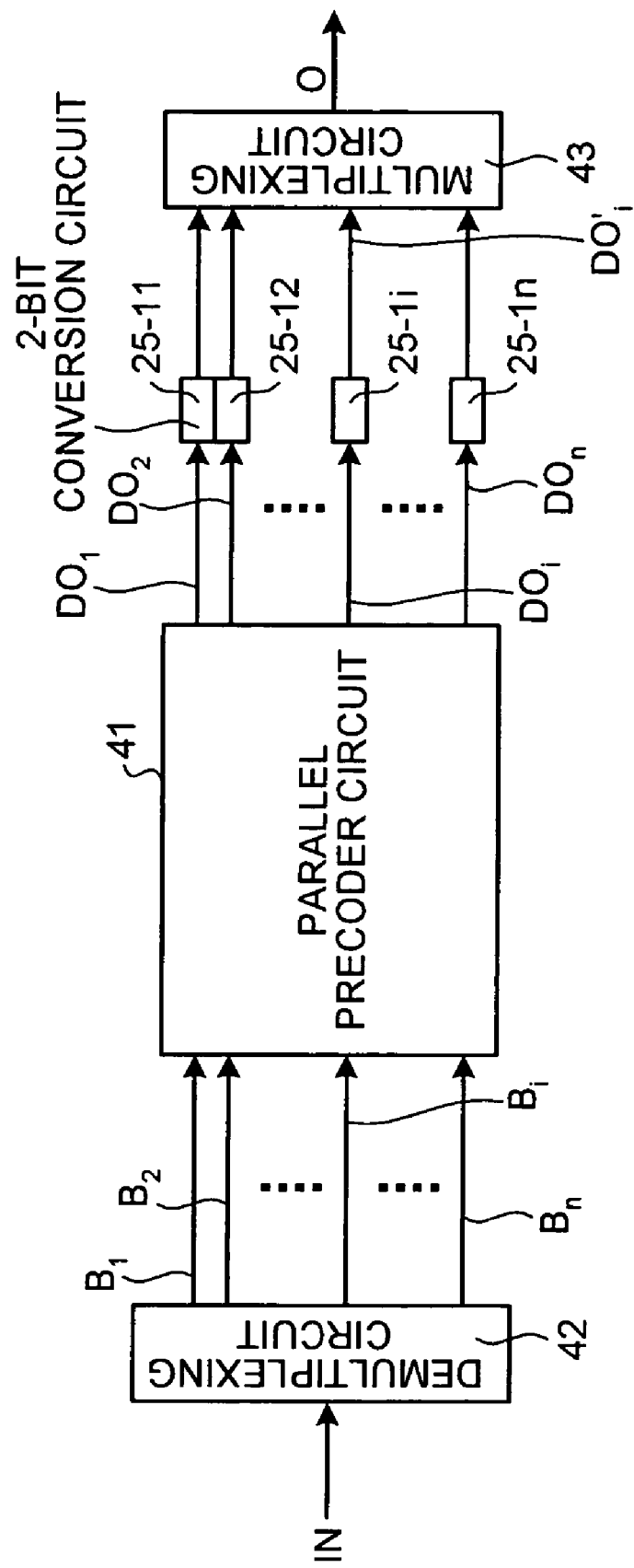
FIG. 25 is an explanatory diagram of a parallel precoder circuit according to an eighth embodiment of the present invention.

In FIG. 25, the parallel precoder circuit 41 is the parallel precoder circuit explained in the first to the sixth embodiment. A 2-bit logical conversion circuit 25-1i logically converts the parallel output information series DO consisting of ($d_I$, $d_Q$), and outputs parallel output information series DO' consisting of ($d_I'$, $d_Q'$) that satisfies the following Equation.

$$d_I' = \overline{d_Q}$$

$$d_Q' = d_I \oplus d_Q \quad (51)$$

The 2-bit logical conversion circuits 25-11 to 25-1n can convert Out that indicates the input signal to the quadrature modulation encoder shown in FIG. 9 into the input signal to the (0, $\pi$) and (0, $\pi/2$) modulation encoders shown in FIG. 24. By adding a slight circuit to the parallel precoder circuit for the quadrature modulation encoder, the parallel precoder circuit can be used as the parallel precoder for the (0, $\pi$) and (0, $\pi/2$) modulation encoders.

In FIG. 25, to simplify the explanation, the 2-bit logical conversion circuits 25-11 to 25-1n are disposed between the parallel precoder circuit 41 and the demultiplexing circuit 43. Alternatively, the 2-bit logical conversion circuits 25-11 to 25-1n can be provided within the parallel precoder circuit 41.

According to the present invention, the differential encoding operation circuit in the zeroth column performs differential encoding operations by using the output set of the delay circuit in the nth row as one input set, and using the parallel input information series in the first row as the other input set. The differential encoding operation circuit in the (2k)th ($1 \leq k \leq n/2$, where k is an integer) row and the first column performs differential encoding operations by using the parallel input information series in the kth row as one input set, and using the output set of the differential encoding operation circuit in the zeroth column as the other input set when the value of k is 1, or using the parallel information series in the (2k-1)th row as the other input set when the value of k is larger than 1. The differential encoding operation circuit in the (2k)th row and the mth ($2 \leq m \leq h-1$, where m is an integer, and h is a smallest integer equal to or larger than ($\log_2 n$)+1) column performs differential encoding operations by using the output set of the differential encoding operation circuit in the (2k)th row and the (m-1)th column as one input set when $2k-2^{(m-1)}$ is equal to or larger than 1, and using the output set of the differential encoding operation circuit in the ($2k-2^{(m-1)}$)th row and the (m-1)th column as the other input set when a differential encoding operation circuit is disposed in the ($2k-2^{(m-1)}$)th row and the (m-1)th column. When no differential encoding operation circuit is disposed in the ($2k-2^{(m-1)}$)th row and the (m-1)th column, the differential encoding operation circuit in the (2k)th row and the mth column performs differential encoding operations by using the output set of the differential encoding operation circuit having a largest column number among differential encoding operation circuits disposed in the ($2k-2^{(m-1)}$)th row as the other input set. The differential encoding operation circuit in the (2k−1)th row and the hth column performs differential encoding operations by using parallel input information series in the (2k−1)th row as one input set, and using the output set of the differential encoding operation circuit having a largest column number among differential encoding operation circuits disposed in the (2k−2)th row as the other input set. The delay circuit in the nth row delays the output of the differential encoding operation circuit having a largest column number among differential encoding operation circuits disposed in the nth row. The delay circuit in the nth row produces the output set of the differential encoding operation circuit having a largest column number among differential encoding operation circuits disposed in the first to the (n−1)th rows respectively as the parallel output information series in the first to the (n−1)th rows respectively, and produces the output set of the nth row delay circuit as the nth row parallel output information series.

In other words, the parallel precoder circuit performs differential encoding operations by dividing data into plural groups, and obtains a result by further performing differential encoding operations at separated stages. Therefore, a parallel precoder circuit capable of mitigating the required operation speed of the differential encoding operation circuits while minimizing the circuit scale can be obtained.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A parallel precoder circuit that executes a differential encoding operation on n-row parallel input information series having 2-bit information series as one set, and outputs n-row parallel output information series, where n is an integer equal to or larger than 2, the parallel precoder circuit comprising:

an nth-row delay circuit that delays an output set of a differential encoding operation circuit having a largest column number from among differential encoding operation circuits disposed in nth row;

a zeroth-column differential encoding operation circuit that executes a differential encoding operation with an output set of the nth-row delay circuit as one input set and a first-row parallel input information series as other input set;

a (2k)th-row first-column differential encoding operation circuit that executes a differential encoding operation with (2k)th-row parallel input information series as one input set, and an output set of the zeroth-column differential encoding operation circuit as other input set when k is 1, or (2k−1)th-row parallel input information series as the other input set when k is larger than 1, where k is an integer equal to or larger than 1 and equal to or smaller than n/2;

(2k)th-row mth-column differential encoding operation circuit that executes a differential encoding operation with an output set of a (2k)th-row (m−1)th-column differential encoding operation circuit as one input set when 2k−2^(m−1) is equal to or larger than 1, and an output set of a (2k−2^(m−1))th-row (m−1)th-column differential encoding operation circuit as other input set when a differential encoding operation circuit is disposed in (2k−2^(m−1))th-row (m−1)th-column, or an output set of a differential encoding operation circuit having a largest column number from among differential encoding operation circuits disposed in (2k−2^(m−1))th row as the other input set when no differential encoding operation circuit is disposed in the (2k−2^(m−1))th-row (m−1)th-column, where m is an integer equal to or larger than 2 and equal to or smaller than h−1, and h is a smallest integer equal to or larger than (log$_2$n)+1; and a (2k−1)th-row hth-column differential encoding operation circuit that executes a differential encoding operation with (2k−1)th-row parallel input information series as one input set, and an output set of a differential encoding operation circuit having a largest column number from among differential encoding operation circuits disposed in (2k−2)th row as other input set, wherein output sets of differential encoding operation circuits each of which having a largest column number from among differential encoding operation circuits disposed in first row to (n−1)th row become first-row to (n−1)th-row parallel outputs information series, respectively, and the output set of the nth-row delay circuit becomes nth-row parallel output information series.

2. The parallel precoder circuit according to claim 1, further comprising:

ith-row to (n−1)th-row delay circuits that delay output sets of differential encoding operation circuits each of which having a largest column number from among differential encoding operation circuits disposed in ith to (n−1)th rows, where i is an integer equal to or larger than 1 and equal to or smaller than n−1, wherein output sets of the ith-row to (n−1)th-row delay circuits become ith-row to (n−1)th-row parallel output information series.

3. The parallel precoder circuit according to claim 1, further comprising:

a multiple-input differential encoding operation circuit that executes a differential encoding operation with first-row to nth-row parallel input information series and the output set of the nth-row delay circuit as input sets, and outputs a result of the differential encoding to the nth-row delay circuit and one input set of the zeroth-column differential encoding operation circuit, wherein the zeroth-column differential encoding operation circuit executes the differential encoding operation using the output set of the multiple-input differential encoding operation circuit instead of the output of the nth-row delay circuit.

4. The parallel precoder circuit according to claim 3, wherein when the multiple-input differential encoding operation circuit includes a delay circuit that delays an output set of a local circuit by a predetermined number of stages, the parallel precoder circuit further comprises a delay circuit that delays first-row to (n−1)th-row parallel input information series by a delay amount equal to a delay of the predetermined number of stages.

5. The parallel precoder circuit according to claim 1, further comprising:

a first delay circuit that is disposed between first-row to (n−1)th-row jth-column differential encoding operation circuits from among all differential encoding operation circuits disposed in first to (n−1)th rows and differential encoding operation circuits disposed after first-row to (n−1)th-row (j+1)th-column, to delay a signal by an optional number of stages, where j is an integer equal to or larger than 1 and equal to or smaller than h, and h is a largest row number from among all of the differential encoding operation circuits disposed in the first to (n−1)th rows; and a second delay circuit that is disposed at a post-stage of the nth row delay circuit to delay a signal by a delay amount equal to the delay of the optional number of stages.

6. The parallel precoder circuit according to claim 1, wherein
the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) =$$
$$d_I(n-1) \cdot d_Q(n-1) \cdot b_I(n) \cdot b_Q(n) + d_I(n-1) \cdot d_Q(n-1) \cdot b_I(n) \cdot \overline{b_Q(n)} +$$
$$\overline{d_I(n-1)} \cdot d_Q(n-1) \cdot \overline{b_I(n)} \cdot b_Q(n) + \overline{d_I(n-1)} \cdot d_Q(n-1) \cdot b_I(n) \cdot \overline{b_Q(n)} +$$
$$\overline{d_I(n-1)} \cdot \overline{d_Q(n-1)} \cdot \overline{b_I(n)} \cdot b_Q(n) + \overline{d_I(n-1)} \cdot \overline{d_Q(n-1)} \cdot b_I(n) \cdot \overline{b_Q(n)} +$$
$$d_I(n-1) \cdot \overline{d_Q(n-1)} \cdot b_I(n) \cdot b_Q(n) + d_I(n-1) \cdot \overline{d_Q(n-1)} \cdot \overline{b_I(n)} \cdot b_Q(n)$$
$$d_Q(n) = d_I(n-1) \cdot d_Q(n-1) \cdot b_I(n) \cdot b_Q(n) +$$
$$d_I(n-1) \cdot d_Q(n-1) \cdot \overline{b_I(n)} \cdot b_Q(n) +$$
$$\overline{d_I(n-1)} \cdot d_Q(n-1) \cdot b_I(n) \cdot b_Q(n) + \overline{d_I(n-1)} \cdot d_Q(n-1) \cdot b_I(n) \cdot \overline{b_Q(n)} +$$
$$\overline{d_I(n-1)} \cdot \overline{d_Q(n-1)} \cdot \overline{b_I(n)} \cdot b_Q(n) + \overline{d_I(n-1)} \cdot \overline{d_Q(n-1)} \cdot b_I(n) \cdot \overline{b_Q(n)} +$$
$$d_I(n-1) \cdot \overline{d_Q(n-1)} \cdot \overline{b_I(n)} \cdot b_Q(n) + d_I(n-1) \cdot \overline{d_Q(n-1)} \cdot b_I(n) \cdot \overline{b_Q(n)}.$$

7. The parallel precoder circuit according to claim 1, wherein
the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = b_I(n) \cdot d_I(n-1) \cdot d_Q(n-1) + \overline{b_Q(n)} \cdot \overline{d_I(n-1)} \cdot d_Q(n-1) +$$
$$\overline{b_I(n)} \cdot \overline{d_I(n-1)} \cdot \overline{d_Q(n-1)} + b_Q(n) \cdot d_I(n-1) \cdot \overline{d_Q(n-1)}$$
$$d_Q(n) = b_Q(n) \cdot d_I(n-1) \cdot d_Q(n-1) + b_I(n) \cdot \overline{d_I(n-1)} \cdot d_Q(n-1) +$$
$$\overline{b_Q(n)} \cdot \overline{d_I(n-1)} \cdot \overline{d_Q(n-1)} + \overline{b_I(n)} \cdot d_I(n-1) \cdot \overline{d_Q(n-1)}.$$

8. The parallel precoder circuit according to claim 1, wherein
the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = b_I(n) \cdot b_Q(n) \cdot d_I(n-1) + b_I(n) \cdot \overline{b_Q(n)} \cdot d_Q(n-1) +$$
$$\overline{b_I(n)} \cdot \overline{b_Q(n)} \cdot \overline{d_I(n-1)} + \overline{b_I(n)} \cdot b_Q(n) \cdot \overline{d_Q(n-1)}$$
$$d_Q(n) = b_I(n) \cdot b_Q(n) \cdot d_I(n-1) + b_I(n) \cdot \overline{b_Q(n)} \cdot d_Q(n-1) +$$
$$\overline{b_I(n)} \cdot \overline{b_Q(n)} \cdot \overline{d_I(n-1)} + \overline{b_I(n)} \cdot b_Q(n) \cdot \overline{d_Q(n-1)}.$$

9. The parallel precoder circuit according to claim 1, wherein
the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = \overline{(d_I(n-1) \oplus b_I(n)) \cdot (\overline{d_I(n-1)} \oplus b_Q(n))} +$$
$$\overline{(d_Q(n-1) \oplus b_I(n)) \cdot (d_Q(n-1) \oplus b_Q(n))}$$
$$d_Q(n) = \overline{(d_Q(n-1) \oplus b_I(n)) \cdot (\overline{d_Q(n-1)} \oplus b_Q(n))} +$$
$$(d_I(n-1) \oplus b_I(n)) \cdot (\overline{d_I(n-1)} \oplus b_Q(n)).$$

10. The parallel precoder circuit according to claim 1, wherein
the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = (d_I(n-1) \oplus \overline{b_I(n)}) \cdot (d_Q(n-1) \oplus \overline{b_I(n)}) +$$
$$(d_I(n-1) \oplus \overline{b_Q(n)}) \cdot (d_Q(n-1) \oplus b_Q(n))$$
$$d_Q(n) = (d_I(n-1) \oplus \overline{b_Q(n)}) \cdot (d_Q(n-1) \oplus \overline{b_Q(n)}) +$$
$$(d_I(n-1) \oplus b_I(n)) \cdot (\overline{d_Q(n-1)} \oplus b_I(n)).$$

11. The parallel precoder circuit according to claim 1, further comprising:
a 2-bit logic converting circuit that converts a logic of 2-bit output information series, wherein
the 2-bit logic converting circuit is disposed for each of the whole output information series.

12. The parallel precoder circuit according to claim 11, wherein
the 2-bit logic converting circuit executes an operation to obtain an output set $(d_I', (d_Q')$ that satisfies following equations using $(d_I, d_Q)$ as input 2-bit output information series $$d_I' = \overline{d_Q}$$

$$d_Q' = d_I \oplus d_Q.$$

13. A parallel precoder circuit that executes a differential encoding operation on n-row parallel input information series having 2-bit information series as one set, and outputs n-row parallel output information series, where n is an integer equal to or larger than 2, the parallel precoder circuit comprising:
an nth-row delay circuit that delays an output set of a differential encoding operation circuit having a largest column number from among differential encoding operation circuits disposed in nth row;
a zeroth-column differential encoding operation circuit that executes a differential encoding operation with an output set of the nth-row delay circuit as one input set and a first-row parallel input information series as other input set;
a kth-row first-column differential encoding operation circuit that executes a differential encoding operation with kth-row parallel input information series as one input set, and an output set of the zeroth-column differential encoding operation circuit as other input set when k is 2, or (k−1)th-row parallel input information series as the other input set when k is larger than 2, where k is an integer equal to or larger than 2 and equal to or smaller than n; and
a kth-row mth-column differential encoding operation circuit that executes a differential encoding operation with an output set of a kth-row (m−1)th-column differential encoding operation circuit and an output set of a (k−2^(m−1))th-row (m−1)th-column differential encoding operation circuit as input sets when k−2^(m−1) is equal to or larger than 1, and executes the differential encoding operation with an output set of a kth-row (m−1)th-column differential encoding operation circuit and an output set of a differential encoding operation circuit having a largest column number from-among differential encoding operation circuits disposed in (k−2^(m−1))th row as the input sets when no differential encoding operation circuit is disposed in (k−2^(m−1))th-row (m−1)th-column, where m is an integer equal to or larger than 2 and equal to or smaller than h, and h is a smallest integer equal to or larger than $\log_2 n$, wherein output sets of differential encoding operation circuits each of which having a largest column number from among differential encoding operation circuits disposed in first row to (n−1)th row become first-row to (n−1)th-row parallel outputs information series, respectively, and the output set of the nth-row delay circuit becomes nth-row parallel output information series.

14. The parallel precoder circuit according to claim 13, further comprising:

ith-row to (n−1)th-row delay circuits that delay output sets of differential encoding operation circuits each of which having a largest column number from among differential encoding operation circuits disposed in ith to (n−1)th rows, where i is an integer equal to or larger than 1 and equal to or smaller than n-1, wherein output sets of the ith-row to (n−1)th-row delay circuits become ith-row to (n−1)th-row parallel output information series.

15. The parallel precoder circuit according to claim 13, further comprising:

a multiple-input differential encoding operation circuit that executes a differential encoding operation with first-row to nth-row parallel input information series and the output set of the nth-row delay circuit as input sets, and outputs a result of the differential encoding to the nth-row delay circuit and one input set of the zeroth-column differential encoding operation circuit, wherein the zeroth-column differential encoding operation circuit executes the differential encoding operation using the output set of the multiple-input differential encoding operation circuit instead of the output of the nth-row delay circuit.

16. The parallel precoder circuit according to claim 15, wherein when the multiple-input differential encoding operation circuit includes a delay circuit that delays an output set of a local circuit by a predetermined number of stages, the parallel precoder circuit further comprises a delay circuit that delays first-row to (n−1)th-row parallel input information series by a delay amount equal to a delay of the predetermined number of stages.

17. The parallel precoder circuit according to claim 13, further comprising:

a first delay circuit that is disposed between first-row to (n−1)th-row jth-column differential encoding operation circuits from among all differential encoding operation circuits disposed in first to (n−1)th rows and differential encoding operation circuits disposed after first-row to (n−1)th-row (j+1)th-column, to delay a signal by an optional number of stages, where j is an integer equal to or larger than 1 and equal to or smaller than h, and h is a largest row number from among all of the differential encoding operation circuits disposed in the first to (n−1)th rows; and a second delay circuit that is disposed at a post-stage of the nth row delay circuit to delay a signal by a delay amount equal to the delay of the optional number of stages.

18. The parallel precoder circuit according to claim 13, wherein the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = d_I(n-1) \cdot d_Q(n-1) \cdot b_I(n) \cdot b_Q(n) + d_I(n-1) \cdot d_Q(n-1) \cdot b_I(n) \cdot \overline{b_Q(n)} +$$
$$\overline{d_I(n-1)} \cdot d_Q(n-1) \cdot \overline{b_I(n)} \cdot b_Q(n) + \overline{d_I(n-1)} \cdot d_Q(n-1) \cdot b_I(n) \cdot \overline{b_Q(n)} +$$
$$\overline{d_I(n-1)} \cdot \overline{d_Q(n-1)} \cdot \overline{b_I(n)} \cdot b_Q(n) + \overline{d_I(n-1)} \cdot \overline{d_Q(n-1)} \cdot \overline{b_I(n)} \cdot b_Q(n) +$$
$$d_I(n-1) \cdot \overline{d_Q(n-1)} \cdot b_I(n) \cdot b_Q(n) + d_I(n-1) \cdot \overline{d_Q(n-1)} \cdot \overline{b_I(n)} \cdot b_Q(n)$$

$$d_Q(n) = d_I(n-1) \cdot d_Q(n-1) \cdot b_I(n) \cdot b_Q(n) +$$
$$d_I(n-1) \cdot d_Q(n-1) \cdot \overline{b_I(n)} \cdot b_Q(n) +$$
$$\overline{d_I(n-1)} \cdot d_Q(n-1) \cdot b_I(n) \cdot b_Q(n) + \overline{d_I(n-1)} \cdot d_Q(n-1) \cdot b_I(n) \cdot \overline{b_Q(n)} +$$
$$\overline{d_I(n-1)} \cdot \overline{d_Q(n-1)} \cdot \overline{b_I(n)} \cdot b_Q(n) + \overline{d_I(n-1)} \cdot \overline{d_Q(n-1)} \cdot b_I(n) \cdot \overline{b_Q(n)} +$$
$$d_I(n-1) \cdot \overline{d_Q(n-1)} \cdot \overline{b_I(n)} \cdot b_Q(n) + d_I(n-1) \cdot \overline{d_Q(n-1)} \cdot b_I(n) \cdot \overline{b_Q(n)}.$$

19. The parallel precoder circuit according to claim 13, wherein the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = b_I(n) \cdot d_I(n-1) \cdot d_Q(n-1) + \overline{b_Q(n)} \cdot \overline{d_I(n-1)} \cdot d_Q(n-1) +$$
$$\overline{b_I(n)} \cdot d_I(n-1) \cdot \overline{d_Q(n-1)} + b_Q(n) \cdot d_I(n-1) \cdot \overline{d_Q(n-1)}$$

$$d_Q(n) = b_Q(n) \cdot d_I(n-1) \cdot d_Q(n-1) + b_I(n) \cdot \overline{d_I(n-1)} \cdot d_Q(n-1) +$$
$$\overline{b_Q(n)} \cdot \overline{d_I(n-1)} \cdot \overline{d_Q(n-1)} + \overline{b_I(n)} \cdot d_I(n-1) \cdot \overline{d_Q(n-1)}.$$

20. The parallel precoder circuit according to claim 13, wherein the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = b_I(n) \cdot b_Q(n) \cdot d_I(n-1) +$$
$$b_I(n) \cdot \overline{b_Q(n)} \cdot d_Q(n-1) + \cdot \overline{d_I(n-1)} + \overline{b_I(n)} \cdot b_Q(n) \cdot \overline{d_Q(n-1)}$$

$$d_Q(n) = b_I(n) \cdot b_Q(n) \cdot d_Q(n-1) \cdot \overline{b_I(n)} \cdot b_Q(n) \cdot d_I(n-1) ++$$
$$\overline{b_I(n)} \cdot \overline{b_Q(n)} \cdot \overline{d_Q(n-1)}.$$

21. The parallel precoder circuit according to claim 13, wherein the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = (\overline{d_I(n-1)} \oplus b_I(n)) \cdot (\overline{d_I(n-1)} \oplus b_Q(n)) +$$
$$(\overline{d_Q(n-1)} \oplus b_I(n)) \cdot (d_Q(n-1) \oplus b_Q(n))$$
$$d_Q(n) = (\overline{d_Q(n-1)} \oplus b_I(n)) \cdot (\overline{d_Q(n-1)} \oplus b_Q(n)) +$$
$$(d_I(n-1) \oplus b_I(n)) \cdot (\overline{d_I(n-1)} \oplus b_Q(n)).$$

22. The parallel precoder circuit according to claim 13, wherein
the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = (d_I(n-1) \oplus \overline{b_I(n)}) \cdot (d_Q(n-1) \oplus \overline{b_I(n)}) +$$
$$(d_I(n-1) \oplus \overline{b_Q(n)}) \cdot (d_Q(n-1) \oplus b_Q(n))$$
$$d_Q(n) = (d_I(n-1) \oplus \overline{b_Q(n)}) \cdot (d_Q(n-1) \oplus \overline{b_Q(n)}) +$$
$$(d_I(n-1) \oplus b_I(n)) \cdot (\overline{d_Q(n-1)} \oplus b_I(n)).$$

23. The parallel precoder circuit according to claim 13, further comprising:
a 2-bit logic converting circuit that converts a logic of 2-bit output information series, wherein
the 2-bit logic converting circuit is disposed for each of the whole output information series.

24. The parallel precoder circuit according to claim 23, wherein
the 2-bit logic converting circuit executes an operation to obtain an output set $(d_I', (d_Q')$ that satisfies following equations using $(d_I, d_Q)$ as input 2-bit output information series $$d_I' = \overline{d_Q}$$

$$d_Q' = d_I \oplus d.$$

25. A parallel precoder circuit that executes a differential encoding operation on n-row parallel input information series having 2-bit information series as one set, and outputs n-row parallel output information series, where n is an integer equal to or larger than 2, the parallel precoder circuit comprising:
an nth-row delay circuit that delays an output set of a differential encoding operation circuit having a largest column number from among differential encoding operation circuits disposed in nth row;
a zeroth-column differential encoding operation circuit that executes a differential encoding operation with an output set of the nth-row delay circuit as one input set and a first-row parallel input information series as other input set;
a (2k)th-row first-column differential encoding operation circuit that executes a differential encoding operation with (2k)th-row parallel input information series as one input set, and an output set of the zeroth-column differential encoding operation circuit as other input set when k is 1, or (2k–1)th-row parallel input information series as the other input set when k is larger than 1, where k is an integer equal to or larger than 1 and equal to or smaller than n/2;
a $((2^m) \times k)$th-row mth-column differential encoding operation circuit in a that executes a differential encoding operation with an output set of a $((2^m) \times k)$th-row (m–1)th-column differential encoding operation circuit and an output set of a $((2^m) \times k - 2^{(m-1)})$th-row (m–1)th-column differential encoding operation circuit as input sets when $(2^m) \times k - 2^{(m-1)}$ is equal to or larger than 1 and when $(2^m) \times k$ is equal to or smaller than n, where m is an integer equal to or larger than 2 and equal to or smaller than hh, and hh is a smallest integer equal to or larger than $\log_2 n$ satisfying $h = 2 \times hh - 1$, where h indicates a last column where a differential encoding operation circuit is disposed; and
a $((2^{hh} - (2kk-1) \times 2^{(2hh-m-1)}))$th-row mth-column differential encoding operation circuit that executes a differential encoding operation with an output set of a differential encoding operation circuit having a largest column number from among differential encoding operation circuits disposed in $((2^{hh} - (2kk-1) \times 2^{(2hh-m-1)}))$th row and an output set of a differential encoding operation circuit having a largest column number from among differential encoding operation circuits disposed in $((2^{hh} - 2kk \times 2^{(2hh-m-1)}))$th when m is equal to or larger than hh and equal to or smaller than $2 \times hh - 1$, where kk is an integer equal to or larger than 1, wherein
output sets of differential encoding operation circuits each of which having a largest column number from among differential encoding operation circuits disposed in first row to (n–1)th row become first-row to (n–1)th-row parallel outputs information series, respectively, and
the output set of the nth-row delay circuit becomes nth-row parallel output information series.

26. The parallel precoder circuit according to claim 25, further comprising:
ith-row to (n–1)th-row delay circuits that delay output sets of differential encoding operation circuits each of which having a largest column number from among differential encoding operation circuits disposed in ith to (n–1)th rows, where i is an integer equal to or larger than 1 and equal to or smaller than n–1, wherein
output sets of the ith-row to (n–1)th-row delay circuits become ith-row to (n–1)th-row parallel output information series.

27. The parallel precoder circuit according to claim 25, further comprising:
a multiple-input differential encoding operation circuit that executes a differential encoding operation with first-row to nth-row parallel input information series and the output set of the nth-row delay circuit as input sets, and outputs a result of the differential encoding to the nth-row delay circuit and one input set of the zeroth-column differential encoding operation circuit, wherein
the zeroth-column differential encoding operation circuit executes the differential encoding operation using the output set of the multiple-input differential encoding operation circuit instead of the output of the nth-row delay circuit.

28. The parallel precoder circuit according to claim 27, wherein
when the multiple-input differential encoding operation circuit includes a delay circuit that delays an output set of a local circuit by a predetermined number of stages, the parallel precoder circuit further comprises a delay circuit that delays first-row to (n–1)th-row parallel input information series by a delay amount equal to a delay of the-predetermined number of stages.

29. The parallel precoder circuit according to claim 25, further comprising:
a first delay circuit that is disposed between first-row to (n–1)th-row jth-column differential encoding operation circuits from among all differential encoding operation circuits disposed in first to (n−1)th rows and differential encoding operation circuits disposed after first-row to (n−1)th-row (j+1)th-column, to delay a signal by an optional number of stages, where j is an integer equal to or larger than 1 and equal to or smaller than h, and h is a largest row number from among all of the differential encoding operation circuits disposed in the first to (n−1)th rows; and a second delay circuit that is disposed at a post-stage of the nth row delay circuit to delay a signal by a delay amount equal to the delay of the optional number of stages.

30. The parallel precoder circuit according to claim 25, wherein the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) =$$
$$d_I(n-1) \cdot d_Q(n-1) \cdot b_I(n) \cdot b_Q(n) + d_I(n-1) \cdot d_Q(n-1) \cdot b_I(n) \cdot \overline{b_Q(n)} +$$
$$\overline{d_I(n-1)} \cdot d_Q(n-1) \cdot \overline{b_I(n)} \cdot \overline{b_Q(n)} + \overline{d_I(n-1)} \cdot d_Q(n-1) \cdot b_I(n) \cdot \overline{b_Q(n)} +$$
$$\overline{d_I(n-1)} \cdot d_Q(n-1) \cdot \overline{b_I(n)} \cdot b_Q(n) + \overline{d_I(n-1)} \cdot \overline{d_Q(n-1)} \cdot \overline{b_I(n)} \cdot \overline{b_Q(n)} +$$
$$d_I(n-1) \cdot \overline{d_Q(n-1)} \cdot b_I(n) \cdot b_Q(n) + d_I(n-1) \cdot \overline{d_Q(n-1)} \cdot \overline{b_I(n)} \cdot b_Q(n)$$

$$d_Q(n) = d_I(n-1) \cdot d_Q(n-1) \cdot b_I(n) \cdot b_Q(n) +$$
$$d_I(n-1) \cdot d_Q(n-1) \cdot \overline{b_I(n)} \cdot b_Q(n) + \overline{d_I(n-1)} \cdot d_Q(n-1) \cdot b_I(n) \cdot b_Q(n) +$$
$$\overline{d_I(n-1)} \cdot d_Q(n-1) \cdot b_I(n) \cdot \overline{b_Q(n)} +$$
$$\overline{d_I(n-1)} \cdot d_Q(n-1) \cdot \overline{b_I(n)} \cdot \overline{b_Q(n)} + \overline{d_I(n-1)} \cdot \overline{d_Q(n-1)} \cdot b_I(n) \cdot \overline{b_Q(n)} +$$
$$d_I(n-1) \cdot \overline{d_Q(n-1)} \cdot \overline{b_I(n)} \cdot b_Q(n) + d_I(n-1) \cdot \overline{d_Q(n-1)} \cdot \overline{b_I(n)} \cdot b_Q(n).$$

31. The parallel precoder circuit according to claim 25, wherein the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = b_I(n) \cdot d_I(n-1) \cdot d_Q(n-1) + \overline{b_Q(n)} \cdot \overline{d_I(n-1)} \cdot d_Q(n-1) +$$
$$\overline{b_I(n)} \cdot \overline{d_I(n-1)} \cdot \overline{d_Q(n-1)} + b_Q(n) \cdot d_I(n-1) \cdot \overline{d_Q(n-1)}$$

$$d_Q(n) = b_Q(n) \cdot d_I(n-1) \cdot d_Q(n-1) + b_I(n) \cdot \overline{d_I(n-1)} \cdot d_Q(n-1) +$$
$$\overline{b_Q(n)} \cdot \overline{d_I(n-1)} \cdot \overline{d_Q(n-1)} + \overline{b_I(n)} \cdot d_I(n-1) \cdot \overline{d_Q(n-1)}.$$

32. The parallel precoder circuit according to claim 25, wherein the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = b_I(n) \cdot b_Q(n) \cdot d_I(n-1) \cdot d_Q(n-1) + \overline{b_Q(n)} \cdot \overline{d_I(n-1)} \cdot d_Q(n-1) +$$
$$\overline{b_I(n)} \cdot \overline{b_Q(n)} \cdot \overline{d_I(n-1)} + \overline{b_I(n)} \cdot b_Q(n) \cdot \overline{d_Q(n-1)}$$

$$d_Q(n) = b_I(n) \cdot b_Q(n) \cdot d_Q(n-1) \cdot \overline{b_I(n)} \cdot b_Q(n) \cdot d_I(n-1) +$$
$$\overline{b_I(n)} \cdot \overline{b_Q(n)} \cdot \overline{d_I(n-1)} + \overline{b_I(n)} \cdot b_Q(n) \cdot \overline{d_Q(n-1)}.$$

33. The parallel precoder circuit according to claim 25, wherein the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = (\overline{d_I(n-1)} \oplus b_I(n)) \cdot (\overline{d_I(n-1)} \oplus b_Q(n)) +$$
$$(\overline{d_Q(n-1)} \oplus b_I(n)) \cdot (d_Q(n-1) \oplus b_Q(n))$$

$$d_Q(n) = (\overline{d_Q(n-1)} \oplus b_I(n)) \cdot (\overline{d_Q(n-1)} \oplus b_Q(n)) +$$
$$(d_I(n-1) \oplus b_I(n)) \cdot (\overline{d_I(n-1)} \oplus b_Q(n)).$$

34. The parallel precoder circuit according to claim 25, wherein the differential encoding operation circuit executes an operation to obtain an output set $(d_I(n), (d_Q(n))$ that satisfies following equations using $(b_I, b_Q)$ as the one input set, and $(d_I(n-1), d_Q(n-1))$ as the other input set $$d_I(n) = (d_I(n-1) \oplus \overline{b_I(n)}) \cdot (d_Q(n-1) \oplus \overline{b_I(n)}) +$$
$$(d_I(n-1) \oplus \overline{b_Q(n)}) \cdot (d_Q(n-1) \oplus b_Q(n))$$

$$d_Q(n) = (d_I(n-1) \oplus \overline{b_Q(n)}) \cdot (d_Q(n-1) \oplus \overline{b_Q(n)}) +$$
$$(d_I(n-1) \oplus b_I(n)) \cdot (\overline{d_Q(n-1)} \oplus b_I(n)).$$

35. The parallel precoder circuit according to claim 25, further comprising:

a 2-bit logic converting circuit that converts a logic of 2-bit output information series, wherein the 2-bit logic converting circuit is disposed for each of the whole output information series.

36. The parallel precoder circuit according to claim 35, wherein the 2-bit logic converting circuit executes an operation to obtain an output set $(d_I', (d_Q')$ that satisfies following equations using $(d_I, d_Q)$ as input 2-bit output information series $$d_I' = \overline{d_Q}$$

$$d_Q' = d_I \oplus d$$.

* * * * *